US011284740B2

(12) United States Patent
Buerger

(10) Patent No.: US 11,284,740 B2
(45) Date of Patent: Mar. 29, 2022

(54) COLD BREW COFFEE BREWING SYSTEM AND METHOD

(71) Applicant: Gunga, Inc., Centennial, CO (US)

(72) Inventor: Raymond K. Buerger, Centennial, CO (US)

(73) Assignee: Gunga, Inc., Centennial, CO (US)

( * ) Notice: Subject to any disclaimer, the term of this patent is extended or adjusted under 35 U.S.C. 154(b) by 0 days.

(21) Appl. No.: 17/318,859

(22) Filed: May 12, 2021

(65) Prior Publication Data
US 2021/0267410 A1    Sep. 2, 2021

Related U.S. Application Data

(63) Continuation of application No. PCT/US2021/015760, filed on Jan. 29, 2021.

(60) Provisional application No. 62/968,037, filed on Jan. 30, 2020.

(51) Int. Cl.
| A47J 31/00 | (2006.01) |
| A47J 31/52 | (2006.01) |
| A47J 31/40 | (2006.01) |
| A47J 31/44 | (2006.01) |
| A47J 31/02 | (2006.01) |
| A23F 5/26 | (2006.01) |

(52) U.S. Cl.
CPC .......... *A47J 31/5255* (2018.08); *A23F 5/262* (2013.01); *A47J 31/002* (2013.01); *A47J 31/02* (2013.01); *A47J 31/405* (2013.01); *A47J 31/4425* (2013.01)

(58) Field of Classification Search
CPC ......... A47J 31/02; A47J 31/002; A23F 5/262; A23F 5/26

USPC .................................................. 99/306, 304
See application file for complete search history.

(56) References Cited

U.S. PATENT DOCUMENTS

| 1,193,334 A | 8/1916 | Acheson |
| 2,331,705 A | 10/1943 | Lehmann |
| 2,878,746 A | 3/1959 | Schwinger |

(Continued)

FOREIGN PATENT DOCUMENTS

| KR | 20160133710 A | 11/2016 |
| KR | 101711850 B1 | 3/2017 |

(Continued)

*Primary Examiner* — Reginald Alexander
(74) *Attorney, Agent, or Firm* — Snell & Wilmer L.L.P.

(57) ABSTRACT

A cold brew coffee brewing system to prepare cold brew coffee by extraction of coffee grounds with brew water in a single-past, non-immersion extraction operation uses a tower unit with first and second receiving locations to receive a pre-infusion container for preparation of a pre-infusion mixture of coffee grounds during a pre-infusion operation and to receive an extraction vessel containing the transferred pre-infusion mixture for extraction processing to prepare cold brew coffee product, which is collected in a collection container received in the second receiving location of the tower unit. A brew control system controls operation of the water dispensing system during a cold brewing process cycle, and including a controller unit having stored therein multiple profiles for different cold-brew coffee product that may be prepared at the direction of the controller unit. A network may include multiple such cold brew coffee brewing systems connected with a central server.

30 Claims, 16 Drawing Sheets

(56) References Cited

U.S. PATENT DOCUMENTS

| | | | |
|---|---|---|---|
| 3,641,918 A | | 2/1972 | Schellgell et al. |
| 4,112,830 A | | 9/1978 | Saito |
| 4,231,876 A | | 11/1980 | Zimmermann et al. |
| 4,682,537 A | * | 7/1987 | Snowball ............ A47J 31/0573 |
| | | | 99/282 |
| 6,399,136 B1 | | 6/2002 | Watkins, Jr. et al. |
| 6,405,637 B1 | | 6/2002 | Cai |
| 8,387,516 B1 | | 3/2013 | Reynolds |
| 9,119,505 B2 | | 9/2015 | Guard et al. |
| 9,218,704 B2 | | 12/2015 | Lim et al. |
| 9,606,522 B2 | | 3/2017 | Hoffman |
| 9,924,827 B2 | * | 3/2018 | Simpson ............ A47J 31/0615 |
| 2004/0094039 A1 | | 5/2004 | Brizio |
| 2004/0226452 A1 | | 11/2004 | Lyall, III |
| 2006/0016345 A1 | | 1/2006 | Paloheimo |
| 2013/0295244 A1 | | 11/2013 | Reyhanloo |
| 2014/0072690 A1 | | 3/2014 | Ha |
| 2014/0076168 A1 | | 3/2014 | Lin |
| 2016/0007796 A1 | | 1/2016 | de Graaff et al. |
| 2016/0338522 A1 | | 11/2016 | van Schyndel et al. |
| 2017/0086473 A1 | | 3/2017 | Ingold |
| 2019/0261643 A1 | | 8/2019 | Buerger |
| 2019/0387920 A1 | * | 12/2019 | Anthony ............ A47J 31/0615 |
| 2020/0093315 A1 | * | 3/2020 | Burrows ................ A23F 5/262 |
| 2020/0093320 A1 | * | 3/2020 | Thomas ................ A47J 31/525 |
| 2020/0345169 A1 | * | 11/2020 | Lai ........................ A47J 31/002 |
| 2021/0007536 A1 | * | 1/2021 | Nicastro ............... A47J 31/002 |

FOREIGN PATENT DOCUMENTS

| | | |
|---|---|---|
| KR | 101845629 B1 | 5/2018 |
| WO | 2016191360 A1 | 12/2016 |

\* cited by examiner

COLD BREW COFFEE BREWING SYSTEM AND METHOD

REFERENCE TO OTHER APPLICATIONS

This application is a continuation of international patent application no. PCT/US2021/015760 entitled "COLD BREW COFFEE BREWING SYSTEM AND METHOD" filed Jan. 29, 2021, which claims the benefit of U.S. provisional patent application No. 62/968,037 entitled "COLD BREW COFFEE BREWING SYSTEM AND METHOD" filed Jan. 30, 2020, the entire contents of each of which are incorporated by reference herein for all purposes.

FIELD

This application relates to preparation of cold brew coffee, including in relation to a cold brew coffee brewing system and network and a method for preparing cold brew coffee products.

BACKGROUND

Cold-brew coffee is coffee brewed using cooler water to extract flavors from coffee grounds, compared to hot water extraction methods in which the coffee flavors are with extracted very hot water that may be near or even above the boiling temperature of the water. Such hot water-extracted coffee includes, for example coffee prepared by steeping with hot water in a French press, percolated coffee, hot-drip coffee and espresso. In contrast to brew water temperatures near boiling temperature for hot water extraction processes, feed water temperature for making cold-brew coffee may often be 40° C. or lower, and often much lower. The temperature of the feed water may often be at ambient temperature (e.g., room temperature), or may be at a reduced temperature to ambient temperature (e.g., chilled temperature). Cold-brew coffee is often made from water either at ambient room temperature or water that has been chilled, for example by adding ice to the water or refrigerating the water prior to the brewing operation. Because of the lower water temperature, there may be a significantly different mixture of components extracted from the coffee grounds during the brewing process than for hot water extraction brewing methods, and as a result cold-brew coffee may have a significantly different flavor and feel.

Hot brewing cycles for preparing hot water-extracted coffee tend to be relatively short, on the order of several minutes for hot-drip coffee and even shorter for espresso. As a result in commercial retail coffee establishments such as coffee shops and restaurants, hot water-extracted coffee is normally made as needed during the business day largely in response to customer demand. In contrast, cold-brewing cycles tend to be quite long, often on the order of several hours, and require significantly more planning and lead-time for such a commercial coffee establishment.

One type of brewing technique for cold-brewing coffee involves steeping the coffee grounds in a bath of the cool water for many hours, followed by separation of the cold-brew coffee from the used coffee grounds using a screen or filter. Such a cold-steeping technique may be performed for example in a French press-type system or in a so-called "Toddy" system. Such cold brewing techniques may be referred to as immersion brewing techniques. Another type of brewing technique for cold-brewing coffee involves dripping the cool water over a bed of coffee grounds for several hours and collecting the cold-brew coffee exiting the coffee grounds over that long brewing cycle. Such a slow-drip technique is sometimes referred to as a Kyoto-style brewing technique. Such slow-drip techniques are non-immersion cold brewing techniques, and typically involve only a single-pass extraction of the coffee grounds with applied water. Both of these types of techniques (immersion and non-immersion cold brewing) may be used to prepare high-quality cold-brew coffee, although the brewing systems in both cases tend to be of limited size designed to brew only small quantities of cold-brew coffee. Commercial establishments therefore may need to operate several of these brewing systems to produce larger quantities of cold-brew coffee. This problem is compounded if a retail establishment wants to provide a menu of cold brew coffee product options to customers, because equipment must be provided to provide for preparation several batches of significant volume of the different cold brew coffee products. In addition to problems of high equipment requirements and long lead times, such a scenario also presents a problem of being labor intensive to prepare the different cold brew coffee product batches in sufficient quantity. With respect to the cold-steep brewing technique, the cold-steep brewing systems tend to be relatively more convenient to use and relatively easier to clean in preparation for the next cold-brewing cycle. However one problem with such cold-steep immersion brewing systems is that a significant amount of the coffee brewing potential of the coffee grounds may be effectively lost due to residual cold-brew coffee that remains with the used coffee grounds. With respect to cold-drip non-immersion brewing methods, the cold-drip brewing systems tend to be cumbersome and not easy to use and not easy to clean in preparation for the next brewing cycle.

One non-immersion cold brew coffee brewing system designed for making very large batches of cold brew coffee is described in U.S. Pat. No. 10,517,314 B2, the contents of which are incorporated herein in entirety. Although the cold brew coffee brewing system described in that patent is significantly easier to use to prepare very large batches of cold brew coffee, it takes up a lot of space that is often not available in retail coffee outlet, prepares batches of coffee that are too large for many retail coffee outlets and is not set up to prepare a number of different cold brew coffee products in a manner that would satisfy demands of many specialty retail coffee outlets. There is a significant need for cold brew coffee brewing systems and methods better suited for the space and product preparation requirements of specialty retail coffee outlets.

SUMMARY

The first aspect of this disclosure is directed to a cold brew coffee brewing system to prepare cold brew coffee by extraction of coffee grounds with brew water in a single-pass, non-immersion extraction operation following a pre-infusion operation to pre-infuse the coffee grounds with pre-infusion water, the system comprising a base configuration. The extraction operation may also be referred to as the brew operation or the brewing operation. The base configuration for the cold brew coffee brewing system comprises:

a flow-through extraction vessel to retain coffee grounds for single-pass, non-immersion extraction of the coffee grounds with water to prepare cold brew coffee, the extraction vessel comprising a fluid-permeable support to support coffee grounds in an extraction bed volume in the extraction vessel during the extraction operation;

a tower unit, comprising a plurality of receiving locations to receive fluid containers or process vessels, the plurality of receiving locations comprising:

a first receiving location configured to selectively receive the extraction vessel in a brewing orientation in an elevated position for the extraction operation, wherein in the brewing orientation the extraction vessel is fluidly open at a fluid exit end adjacent a bottom of the extraction vessel for flow of cold brew coffee out of the fluid exit end for single-pass, non-immersion extraction of coffee grounds to prepare the cold brew coffee; and a second receiving location, at a lower elevation than the first receiving location, configured to selectively receive a collection container in a collection orientation to receive and collect the cold brew coffee from the extraction vessel during the extraction operation for preparation of a cold brew coffee product comprising the collected cold brew coffee in the collection container; and a water dispensing system configured to dispense the brew water into the extraction vessel above the coffee grounds in the extraction vessel in the brewing orientation at the first receiving location during the extraction operation.

A number of feature refinements and additional features are applicable to this first aspect of the disclosure. These feature refinements and additional features may be used individually or in any combination with subject matter of this aspect or any other aspect of this disclosure. As such, each of the following features may, but are not required to be, used with any other feature or combination of features of this aspect or any other aspect of this disclosure.

The water dispensing system may be configured to provide the pre-infusion water to a receiving location of the tower unit during the pre-infusion operation, which may be the first receiving location or the second receiving location. In one implementation, the water dispensing system may be configured both to provide the pre-infusion water to the first receiving location during the pre-infusion operation to mix with coffee grounds for preparation of a pre-infusion mixture and to provide the brew water to the first receiving location for the extraction operation. In another implementation, the water dispensing system may be configured to provide the pre-infusion water to the second receiving location during the pre-infusion operation and to provide the brew water to the first receiving location during the extraction operation. In one preferred configuration, the water dispensing system includes separate water dispensers for dispensing the pre-infusion water and the brew water, and in some implementations to dispense the pre-infusion water at a much higher flow rate than dispensation of the brew water. Separate water dispensers advantageously permits the pre-infusion water to be quickly dispensed to prepare the pre-infusion mixture and the brew water to be dispensed at a much lower flow rate conducive to preparation of cold brew coffee product. The water dispenser for the brew water will typically be disposed to provide the brew water to the first receiving location. A separate water dispenser may be disposed to provide the pre-infusion water also to the first receiving location or, alternatively, may be disposed to provide the pre-infusion water to the second receiving location. However, in other configurations, the pre-infusion water and the brew water may be dispensed from the same water dispenser dispensing water to the first receiving location, for example when the flow rates of pre-infusion water during the pre-infusion operation and brew water during the extraction operation are similar. This may be the case for example, with a second variation for preparation of a pre-infusion mixture in the extraction vessel, discussed below.

The pre-infusion water may be dispensed to a receiving location for the pre-infusion, which may for example be the first receiving location or the second receiving location. The dispensed pre-infusion water may be delivered to a pre-infusion container pre-loaded with the coffee grounds. Advantageously, such a pre-infusion container may be selectively receivable in a pre-infusion orientation in the first receiving location or the second receiving location to receive the pre-infusion water to prepare the pre-infusion mixture in the pre-infusion container. After preparation of the pre-infusion mixture in such a pre-infusion container, and the pre-infusion mixture may be transferred to the extraction vessel, which may then be disposed in the first receiving location in the brewing orientation for the extraction operation. Implementations including dual utility and water dispensation features at the first receiving location, for dispensing both pre-infusion water and extraction water to the first receiving location, permits efficient utilization of space of the cold brew coffee brewing system and permits significant control of processing in a compact space for preparation of cold brew coffee products.

Alternatively, rather than dispensing the pre-infusion water to a pre-infusion container that is a different container than the extraction vessel, the dry coffee grounds may be initially loaded into the extraction vessel, the extraction vessel with the coffee grounds may be disposed in the first receiving location and the pre-infusion water may be dispensed to the first receiving location into the extraction vessel above the coffee grounds, to prepare the pre-infusion mixture in the extraction vessel. In a first variation of preparing the pre-infusion mixture in the extraction vessel, the extraction vessel may be disposed in the first receiving location in a pre-brewing configuration, which is different than the brewing orientation. In the pre-brewing orientation, a bottom end of the extraction vessel may be closed to fluid flow out of the bottom end of the extraction vessel, so that in the pre-brewing orientation the extraction vessel acts as a liquid hold-up container, as opposed to the brewing orientation in which the extraction vessel is fluidly open at the bottom end to permit cold brew coffee to exit the bottom end during the extraction operation. In some implementations, the extraction vessel may have a valve feature at a bottom end of the extraction vessel that is in a closed position to prevent fluid flow out of the bottom end of the extraction vessel in the pre-brewing orientation during the pre-infusion operation, and the valve feature may be in an open position when the extraction vessel is in the brewing orientation to permit the cold brew coffee to exit the bottom end for collection during the extraction operation. Between the pre-infusion operation and the extraction operation, the orientation of the extraction vessel as received in the first receiving location may be changed from the pre-brewing orientation at the end of the pre-infusion operation to the brewing orientation for the extraction operation. When using the first variation to prepare the pre-infusion mixture in the extraction vessel, the pre-infusion operation may be conducted in a manner similar to when using a pre-infusion container, except that it is not necessary to transfer the pre-infusion mixture to the extraction vessel for the extraction operation, although the extraction vessel will need to be reoriented from the pre-brewing orientation to the brewing orientation for the extraction operation. For example a similar profile of pre-infusion water dispensation may be used and the pre-infusion water and coffee grounds may be manually mixed in a similar manner, prior to the extraction operation. Advantages of using the first variation to prepare the pre-infusion mixture in the extraction vessel includes not having to transfer the extraction pre-infusion mixture from a separate pre-infusion container to the extraction vessel. However, advantages of using a separate pre-infusion container include permitting a simpler design for the extraction vessel and reducing wear on the extraction vessel.

In a second variation of preparing the pre-infusion mixture in the extraction vessel, the extraction vessel containing dry coffee grounds may be disposed in the first receiving location in the brew configuration, with the bottom end of the extraction open to fluid flow out of the bottom end of the extraction vessel, and the pre-infusion water may be dispensed to the first receiving location into the extraction vessel above the coffee grounds to wet the coffee grounds to form the pre-infusion mixture. When performing the pre-infusion operation using this second variation, the rate of addition of the pre-infusion water should preferably be very slow, and more preferably using a pulsed water addition profile, to provide the pre-infusion water sufficient time to diffuse through and saturate the coffee grounds without significant flow of pre-infusion water through and out of the bottom of the coffee grounds during the pre-infusion operation. If water is added too quickly during this second variation, then significant potential exists for channeling of water through the coffee grounds without substantially complete saturation of the coffee grounds, which could lead to significant product yield and/or product quality issues for cold brew coffee product collected during the extraction operation, as brew water will tend to preferentially flow through the channels formed during the pre-infusion operation and will bypass and not adequately extract a significant portion of the coffee grounds. Accordingly, when using this second variation, performance of the pre-infusion operation may require a significantly longer time than either the first variation or when using a pre-infusion container, because the average rate of addition of the pre-infusion water will tend to be much lower when using the second variation. Also, even with careful control of the rate of pre-infusion water addition during the second variation approach, saturation of the coffee grounds tends not be as complete or uniform as when using the first variation with the extraction vessel in a pre-brewing orientation or when using a separate pre-infusion container. For these reasons, pre-infusion using either a pre-infusion container or using the first variation with the extraction vessel is preferred. However, advantages of using the second variation of preparing the pre-infusion mixture in the extraction vessel include not requiring as much time or attention from a user/operation to perform a cold brew coffee brewing cycle, because the second variation typically will not include having the user/operator to manually mix the pre-infusion water and the coffee grounds, will not require either transfer of the pre-infusion mixture to the extraction vessel or reorientation of the extraction vessel from a pre-brewing orientation to a brewing orientation, and will not involve input of a separate control instruction to a brew control system to proceed to the extraction operation following completion of the pre-infusion operation. Also, because the average rate of water addition using the second variation is much slower than when using the first variation or the pre-infusion container, it is easier to dispense both the pre-infusion water and the brew water from a single water dispenser.

In various implementations, the cold brew coffee brewing system may include a collection container and/or a pre-infusion container. The feed water temperature for both the pre-infusion water and the brew water, and as dispensed to the first receiving location or the second receiving location, as the case may be, may often have a temperature of not greater than 80° C., not greater than 60° C., not greater than 40° C. or even not greater than 35° C. Such water should generally be above freezing, and may be at least 3° C., at least 5° C. or even at least 10° C. Such water temperature may often be at ambient temperature (e.g., room temperature), or may be at a reduced temperature to ambient temperature (e.g., chilled temperature).

In some implementations, the cold brew coffee brewing system may include a manually operable flow adjustment valve to permit manual adjustment of brew water flow rate for dispensation to the first receiving location. Such manual adjustment advantageously permits fine adjustment of brew water flow rate to approximately correspond with a target flow rate without complexity and possible feedback stability issues with automated control. In other implementations, the cold brew coffee brewing system may include an automatic flow control system to automatically maintain the brew water flow rate close to a desired flow rate for dispensation of the brew water.

In some implementations, the cold brew coffee brewing system includes a brew control system to control operation of the water dispensing system during a cold brewing process cycle for preparation of a cold brew coffee product. The brew control system may include a controller unit and one or more flow control valves in communication connection with the controller unit. The controller unit may have one or more stored product profiles for one or more cold brew coffee products that may be prepared by the cold brew coffee brewing system. Each product profile includes product preparation parameters for preparation of the corresponding cold brew coffee product. The controller unit may be configured to execute a brew control operation for performance of the cold brewing process cycle to prepare cold brew coffee product corresponding to the product preparation parameters. The brew control system may include a user interface in communication with the controller unit, and the user interface may be configured to display information to a user/operator of the cold brew coffee brewing system and receive input of instructions from the user for preparation of a cold brew coffee product. Such a brew control system advantageously provides flexibility to utilize the cold brew coffee brewing system to prepare cold brew coffee products carefully controlled to provide consistency between batches of high-quality cold brew coffee product, and for a number of different cold brew coffee products prepared according to different product preparation parameters.

The brew control system may beneficially permit programming a variety of different product profiles (different combinations of product preparation parameters) to prepare a variety of different cold brew coffee products. Among such product preparation parameters may be feed coffee source, feed coffee quantity, coffee grind requirement, total quantity of pre-infusion water, total quantity of brew water, total yield of cold brew coffee, brew time for performing the extraction operation, pre-infusion water dispensation profile to the receiving location for pre-infusion (e.g., to the first receiving location or to the second receiving location depending on the implementation) and brew water dispensation profile to the first receiving location. In some particularly advantageous implementations, the brew water dispensation profile may be set to a pulsed profile, also referred to as an intermittent profile, including alternating active brew periods of brew water dispensation (also referred to herein as first brew water profile periods) and rest periods (also referred to herein as second brew water profile periods) of either no brew water dispensation (preferred) or brew water dispensation at a substantially reduced flow rate relative to the active brew periods. In some implementations, the pre-infusion water dispensation profile may be set to a pulsed profile, also referred to as an intermittent profile, including active periods of active pre-infusion water dispensation (active water addition periods, also referred to herein as first pre-infusion water profile periods) and saturation rest periods (also referred to herein as second pre-infusion water profile periods) including no pre-infusion water dispensation (preferably) or pre-infusion water dispensation at a very reduced rate relative to the active water addition periods.

References herein to a water dispensation profile (pre-infusion water dispensation profile or brew water dispensation profile) for an operation (pre-infusion operation or extraction operation) are to the properties of water dispensation during the operation, including timing and sequence of when water is dispensed during the operation and the rate at which water is dispensed, and the water dispensation profile includes both times during the operation when water is being dispensed and times during the operation when water is not being dispensed. Unless otherwise specifically noted, references to an average rate of water dispensation during a water dispensation profile (pre-infusion water dispensation profile or brew water dispensation profile) mean the total quantity of the water (pre-infusion water or brew water) dispensed during the operation (pre-infusion operation or extraction operation) divided by the period of time beginning with initial dispensation of the water during the operation and ending with the final dispensation of the water during the operation, including all intermediate rest periods but not including any time period during the operation following the final dispensation of the water during the operation (e.g., not including any final rest period of the operation during which there is no water dispensation).

A pulsed profile for the pre-infusion water dispensation profile may be preferred, for example, in implementations when a brew control system directs performance of a pre-infusion operation and then at the conclusion of the pre-infusion operation automatically proceeds to direct dispensation of the brew water and performance of the extraction operation without intermediate intervention by a user of a cold brew coffee brewing system (e.g., without mixing of coffee grounds and pre-infusion water by a user prior to commencement of dispensation of the brew water and without the user inputting a control instruction to proceed to the extraction operation). A pulsed profile for the pre-infusion water dispensation is preferred when using the second variation of preparing the pre-infusion mixture in the extraction vessel. The discussions below on pulsed water dispensation profiles are provided primarily with reference to dispensation of brew water, but the discussions also apply to pulsed dispensation of pre-infusion water, appropriately adapted to the different context of the pre-infusion operation.

Significant flexibility may be provided through the brew control system to customize the number of pulse cycles, and the duration of active brew periods and rest periods, which advantageously need not be uniform in duration. In combination with significant flexibility to use different feed coffee sources, in different quantities and with different yields and at different grinds, the cold brew coffee brewing system provides significant flexibility in preparing different customized cold brew coffee products with product consistency between product batches and with simple operation of the cold brew coffee brewing system. The control system may advantageously display to the user key product preparation parameters, satisfaction of which may be confirmed by the user before the control system progresses processing to prepare the cold brew coffee product. Such key product preparation parameters for verification by a user may include, for example, the feed coffee source, feed coffee quantity and coffee grind requirement. Further, the control system may be advantageously be configured to display at key points during a cold brewing process cycle control verification prompts to prompt a user to input a corresponding control instruction indicating satisfaction of a corresponding process condition to have the controller unit continue with the cold brewing process cycle to prepare the desired cold brew coffee product.

In some implementations, the cold brew coffee brewing system may advantageously include flow sensing capability for monitoring at least brew water flow to the first receiving location, and preferably sensing capability for also monitoring pre-infusion water flow to the receiving location for pre-infusion (e.g., to the first receiving location or to the second receiving location depending on the implementation). Such flow sensing capability may be provided by a single flow sensor on a main input water line feeding both pre-infusion water and through water to separate water dispensers, or such flow sensing capability may alternatively be provided by separate flow sensors for monitoring pre-infusion water flow and brew water flow. Each such flow sensor may advantageously be in communication connection with the controller unit of the process control system and the controller unit may use flow information from each such flow sensor for determining when a targeted quantity of pre-infusion water has been dispensed during a pre-infusion operation and/or a targeted total quantity of brew water has been dispensed during an extraction operation and to terminate the corresponding water dispensation accordingly. The brew control system may be configured to display brew status information during a cold brewing process cycle for convenient reference by the user to confirm proper progression of a cold brewing process cycle and to identify and take remedial action when an anomaly is identified through the displayed brew status information. Following completion of an extraction operation, the controller unit may advantageously direct display of a notification that a cold brewing process cycle is complete, and the cold brew coffee product is ready.

The cold brew coffee brewing system may in some implementations advantageously be configured to include different levels of hierarchical access to the controller unit. One level of hierarchical access may be for a user to simply access available cold brew coffee products in a product menu and direct preparation of a selected cold brew coffee product, but without making any modifications to the menu of available cold brew coffee products or the product profile for any cold brew coffee products. Such access may be referred to as user access. One level of hierarchical access, which may be referred to as local administrator access, may optionally be provided to permit some level of local modification of product menu and/or product preparation parameters of a product profile for a given cold brew coffee product. For example, a particular cold brew coffee brewing system may be customized to prepare one or more cold brew products of particular interest at the geographic location where the cold brew coffee brewing system is located, and/or to modify a product profile to provide for a feed coffee source different from a standard feed coffee source pre-specified in a product profile when the standard feed coffee source may not be available. Likewise, a local modification may be made to identify a particular grind requirement when a pre-specified standard grind requirement is not locally available, because the location does not have access to the grind equipment specified by the standard specification. One level of hierarchical access, which may be referred to as a global access, may permit a change in a standard product mix provided in a product menu on the cold brew coffee brewing system that is not a function of local conditions, or to modify or update software generally in the controller unit for control of a cold brewing process cycle. For example, the cold brew coffee brewing system may be one of a number of cold brew coffee brewing systems in a network, and such global access may be utilized to consistently update various cold brew coffee brewing systems in the network with the same process control software, product menu and product profile changes for consistency across the network. A hierarchical level of access may permit accessing stored system utilization information in the controller unit of a cold brew coffee brewing system to monitor and evaluate utilization of the cold brew coffee brewing system, for example, for frequency of use to prepare cold brew coffee products and/or to evaluate brew activity for particular cold brew products to identify those that do particularly well or not at particular locations where the cold brew coffee brewing systems are located. Such utilization information download access may be part of a local administrator access and/or a global access. Such local administrator access and/or global access for making a change in the brew control system may be facilitated through a web portal application, where changes may be made and downloaded through the web portal application to the affected cold brew coffee brewing system(s).

A second aspect of this disclosure is directed to a cold brew coffee brewing network comprising a plurality of cold brew coffee brewing systems and a remote central server to receive information from and provide information to each said cold brew coffee brewing system of the network through remote access communication connections with the cold brew coffee brewing systems.

A number of feature refinements and additional features are applicable to this second aspect of the disclosure. These feature refinements and additional features may be used individually or in any combination within the subject matter of this aspect or any other aspect of this disclosure. As such, each of the following features may, but are not required to be, used with any other feature or a combination of features of this aspect or any other aspect of this disclosure.

One or more, or all, of the cold brew coffee brewing systems of the network may be according to the first aspect of this disclosure, and/or may have any feature or combination of features of such a cold brew coffee brewing system of the first aspect. The central server may advantageously be accessible through a web portal application. In some implementations, the central server may include pre-stored product profiles for a variety of cold brew coffee products, which may be temporarily accessed by a cold-brew coffee brewing system in a cloud-based application for preparation of a cold brew coffee brewing product corresponding to the temporarily accessed product profile and/or the product profiles of such cold brew coffee products may be downloaded for permanent storage on a cold brew coffee brewing system. New cold brew product introductions and/or changes/updates to product profiles and/or updates to system software stored in the controller unit of the cold brew coffee brewing system may be directed, automatically or upon request, to the cold brew coffee brewing systems of the network.

The third aspect of this disclosure is directed to a method for making a cold brew coffee product utilizing a cold brew coffee brewing system of the first aspect.

A number of feature refinements and additional features are applicable to this third aspect of the disclosure. These feature refinements and additional features may be used individually or in any combination within the subject matter of this aspect or any other aspect of this disclosure. As such, each of the following features may, but are not required to be, used with any other feature or combination of features of this aspect or any other aspect of this disclosure.

The cold brew coffee brewing system used in the method may be or have any feature or combination of features described with respect to the cold brew coffee brewing system of the first aspect. The cold brew coffee brewing system used in the method may be part of a network of the second aspect of this disclosure, or having any feature or combination of features disclosed for such second aspect.

The method may include disposing the extraction vessel containing coffee grounds in the brewing orientation of the first receiving location; dispensing from the water dispensing system at the first receiving location into the extraction vessel from above the coffee grounds a total quantity of brew water for preparation of the cold brew coffee product; and collecting cold brew coffee exiting the extraction vessel in a collection container disposed in a collection orientation in the second receiving location. The method may include performing an operation for a cold brewing process cycle as described in relation to the first aspect. The method, or portions thereof, may be controlled by a controller unit according to the first aspect.

Numerous additional features and advantages of the present disclosure are described in, or will be apparent to those skilled in the art upon consideration of, the embodiment descriptions provided in the drawings and descriptions of the drawings provided below, in the numbered example implementation combinations provided below and in the appended claims.

DETAILED DESCRIPTION

Features for some example cold brew coffee brewing systems will now be described with reference to FIGS. 1-10. With initial reference primarily to FIGS. 1-9, features of an example cold brew coffee brewing system 100 will be described.

Figure 1:
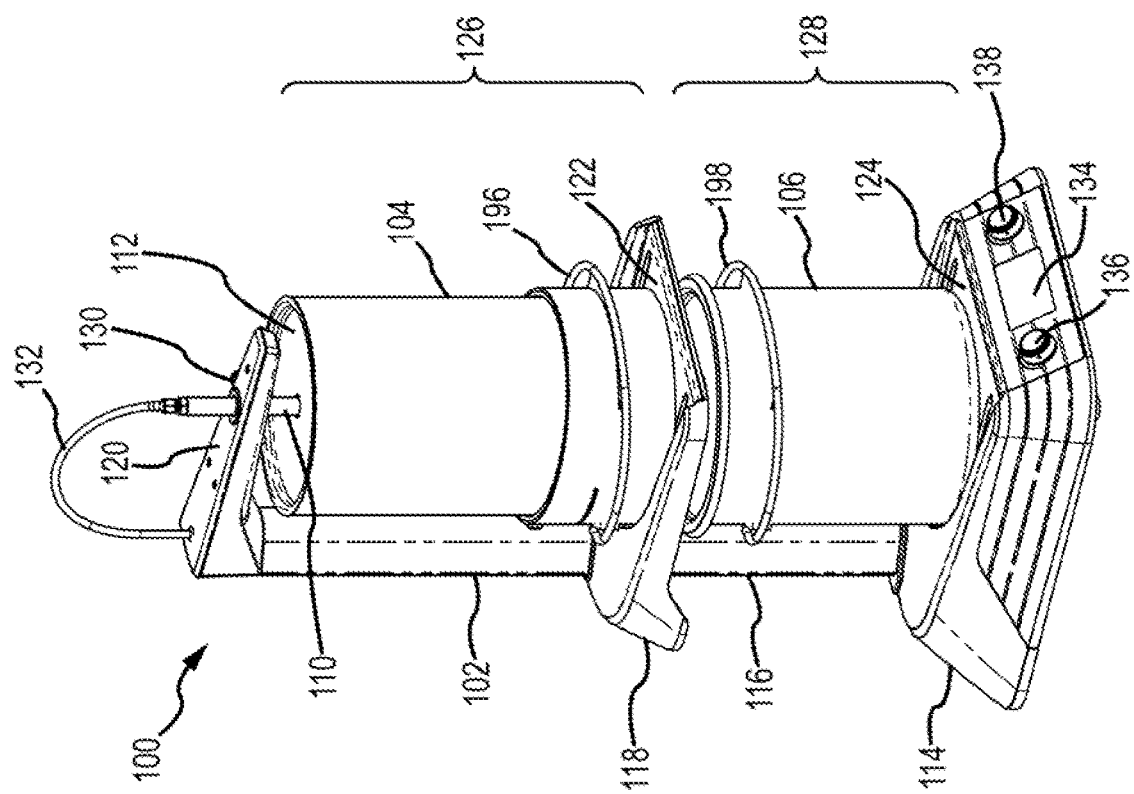
FIG. 1 is a side view of an example embodiment of a cold brew coffee brewing system.
Figure 2:
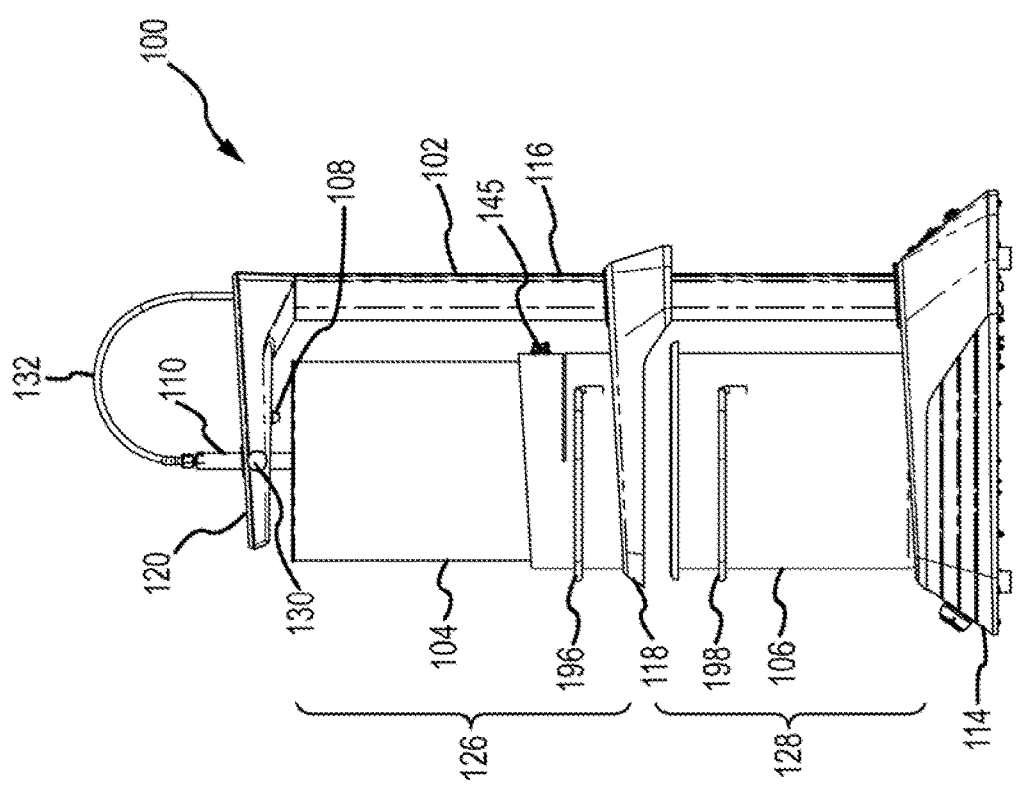
FIG. 2 is a perspective view of the cold brew coffee brewing system of FIG. 1.
Figure 3:
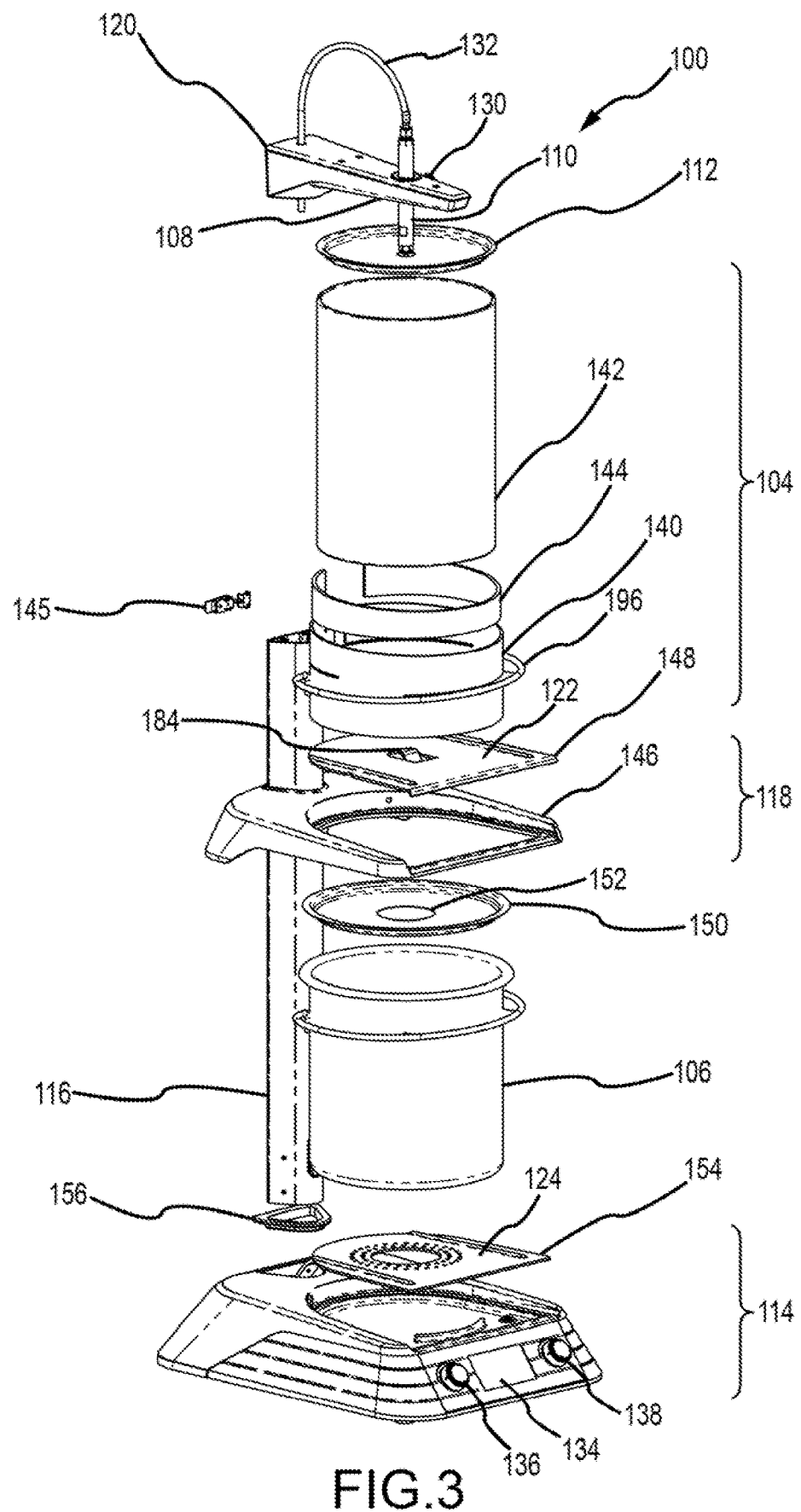
FIG. 3 is an exploded view of features of the same cold brew coffee brewing system of FIG. 1.

FIGS. 1-3 show a cold brew coffee brewing system 100 including a tower unit 102, a flow-through extraction vessel 104, a collection container 106 and a water dispensing system including a first water dispenser 108 to dispense pre-infusion water and a second water dispenser 110 to dispense brew water for a cold brewing process cycle to prepare a cold brew coffee product. In the illustration of FIGS. 1 and 2, the second water dispenser 110 is shown extending into the interior volume of the extraction vessel 104 through a lid 112 covering the interior volume of the extraction vessel 104.

The tower unit 102 includes a base portion 114, a support member 116 extending vertically from the base portion 104, an elevated shelf structure 118 supported by the support member 116 and a top member 120 also supported by the support member 116. The shelf structure 118 includes a first platform surface 122 on which the extraction vessel 104 rests and the base portion 114 includes a second platform surface 124 on which the collection container 106 rests. The space between the first platform surface 122 and the top member 120 provides a first receiving location 126 of the tower unit 102 to selectively receive the extraction vessel 104 in a brewing orientation, as illustrated in FIGS. 1 and 2, for a cold brew coffee extraction operation. The space between the second platform surface 124 and the shelf structure 118 provides a second receiving location 128 of the tower unit 102 to selectively receive the collection container 106 in a collection orientation, as illustrated in FIGS. 1 and 2, to receive and collect cold brew coffee exiting from the extraction vessel 104 during an extraction operation for preparation of a cold brew coffee product collected in the collection container 106.

As shown in FIGS. 1 and 2, the second water dispenser 110 includes a vertically-extending translatable conduit member passing through the top member 120 of the tower unit 102, and which may be translated up and down to set a brew water spray nozzle at a lower end of the second water dispenser 110 at different elevations at the first receiving location 126 inside of the extraction vessel 104, permitting the brew water nozzle to be set at different heights relative to a top surface of coffee grounds disposed in the extraction vessel 104 for an extraction operation. The translatable conduit of the second water dispenser 110 may be set at a particular vertical elevation through use of a set screw 130, seen best in FIG. 1. Fluidly connected to the second water dispenser 110 is a flexible fluid delivery conduit 132 that can accommodate vertical adjustments of the second water dispenser 110. In an alternative configuration, the second water dispenser 110 may be fixed in position when the coffee grounds will typically be filled to the same elevation in the extraction vessel 104 for an extraction operation.

Also as shown in FIGS. 1-3, the base portion 114 includes a user interface with a graphic display 134 for displaying information concerning operation of the cold brew coffee brewing system 100 and a first knob 136 for manipulation by a user to operate the cold brew coffee brewing system 100 to prepare a cold brew coffee product. The base unit also includes a second knob 138 for manipulation by a user to manually adjust a flow rate of brew water being delivered to the second water dispenser during an extraction operation, through manipulation of a flow adjustment valve disposed in the base portion 114.

FIG. 3 shows an exploded view of some components of the cold brew coffee brewing system 100. Minor pieces such as screws and other connecting articles that connect and retain the components in the assembly of the cold brew coffee brewing system 100 are not illustrated. As shown in FIG. 3, the extraction vessel 104 is in assembly of a plurality of components, including an extraction vessel base 140 a brew cylinder 142, which is inserted into the top of the extraction vessel base 140, and a gasket 144 disposed between the wall of the extraction vessel base 140 and the brew cylinder 142 and the receiving walls of the extraction vessel base 140 are drawn securely around the gasket 144 and the brew cylinder 142 by a latch 145. Additional features of the extraction vessel base 140 are shown in other figures discussed below. The brew cylinder 142 is preferably made of a transparent material, more preferably glass, permitting a user to observe the coffee grounds disposed in the brew cylinder 142 and progression of a cold brew coffee brewing operation. Also as shown in FIG. 3, the shelf structure 118 is an assembly including a shelf support member 146 attached to the support member 116 and a first platform plate 148, which is supported by the shelf support member 146 and which includes the first platform surface 122 for supporting the extraction vessel in the extraction orientation. As shown in FIG. 3, a lid 150 is also provided for the collection container 106, and the lid 150 has an aperture 152 through it to permit passage of cold brew coffee from the extraction vessel 104 into the collection container 106. The base portion 114 is in assembly that includes a second platform plate 154 that has the second platform surface 124 for supporting the collection container 106 in the collection orientation. As shown in FIG. 3, the tower unit 102 includes a gasket 156 disposed between the support member 116 and the base portion 114 to provide a secure fit between the support member 116 and the base portion 114.

Figure 4:
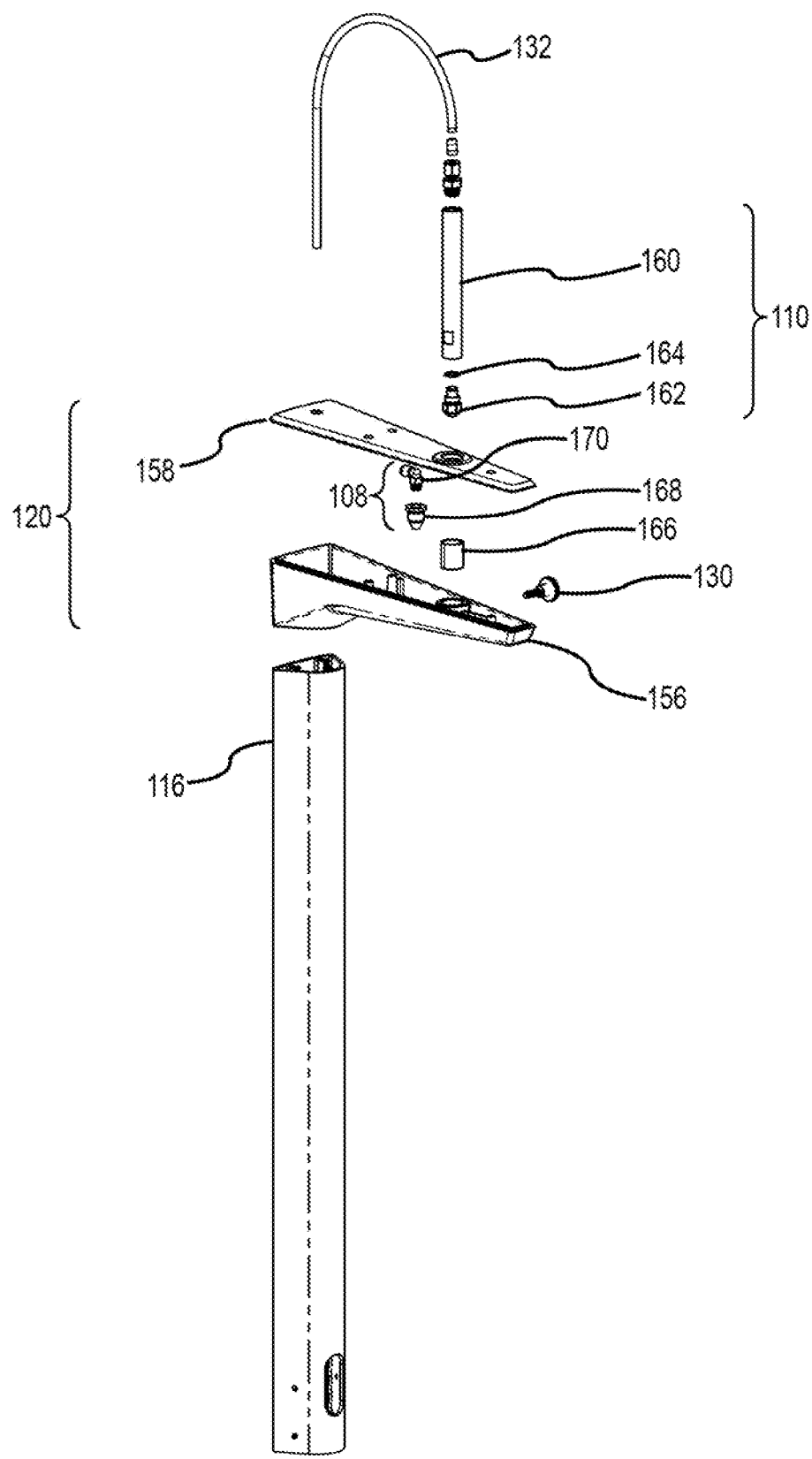
FIG. 4 is a partial exploded view of a portion of a tower unit of the same cold brew coffee brewing system of FIG. 1.

FIG. 4 shows a partial exploded view of some components of the tower unit 102 and water distribution system for the cold brew coffee brewing system 100 illustrated in FIGS. 1-3. As shown in FIG. 4, the top member 120 is comprised of a first piece 156 with an open interior space for componentry and a second piece 158 that forms a cover over the open interior space of the first piece 156. As shown in FIG. 4, the second water dispenser 110 includes an assembly with a translatable member 160 and a brew water spray nozzle 162 connected to a bottom end of the translatable member 160, with the connection sealed with a washer 164. Extending through corresponding openings through both the first piece 156 and the second piece 158 is a sleeve bearing 166, through which the translatable member 160 is disposed in the assembly of the cold brew coffee brewing system 100 shown in FIGS. 1-3. The first water dispenser 108 includes an assembly with a pre-infusion water nozzle outlet 168 connected to a 90° fluid fitting 170. In the assembly of the cold brew coffee brewing system 100 shown in FIGS. 1-3, the fluid fitting 170 is disposed in the open interior space of the first piece 156 of the top member 120 and the pre-infusion water nozzle outlet 168 extends out a bottom of the first piece 156 of the top member 120. In the cold brew coffee brewing system 100, the water distribution system includes fluid flow componentry (e.g., valves, fittings and conduits) for delivering pre-infusion water to the first water dispenser 108, to dispense pre-infusion water from the pre-infusion water nozzle outlet 168 to the first receiving location 126 (shown in FIGS. 1 and 2) and to deliver brew water to second water dispenser 110, to dispense brew water from the brew water spray nozzle 162 to the first receiving location 126. The first water dispenser 108 and the second water dispenser 110 are connected in the water distribution system by fluid conduits (not shown) extending through the support member 116 to water distribution control componentry located inside the base portion 114.

Figure 5:
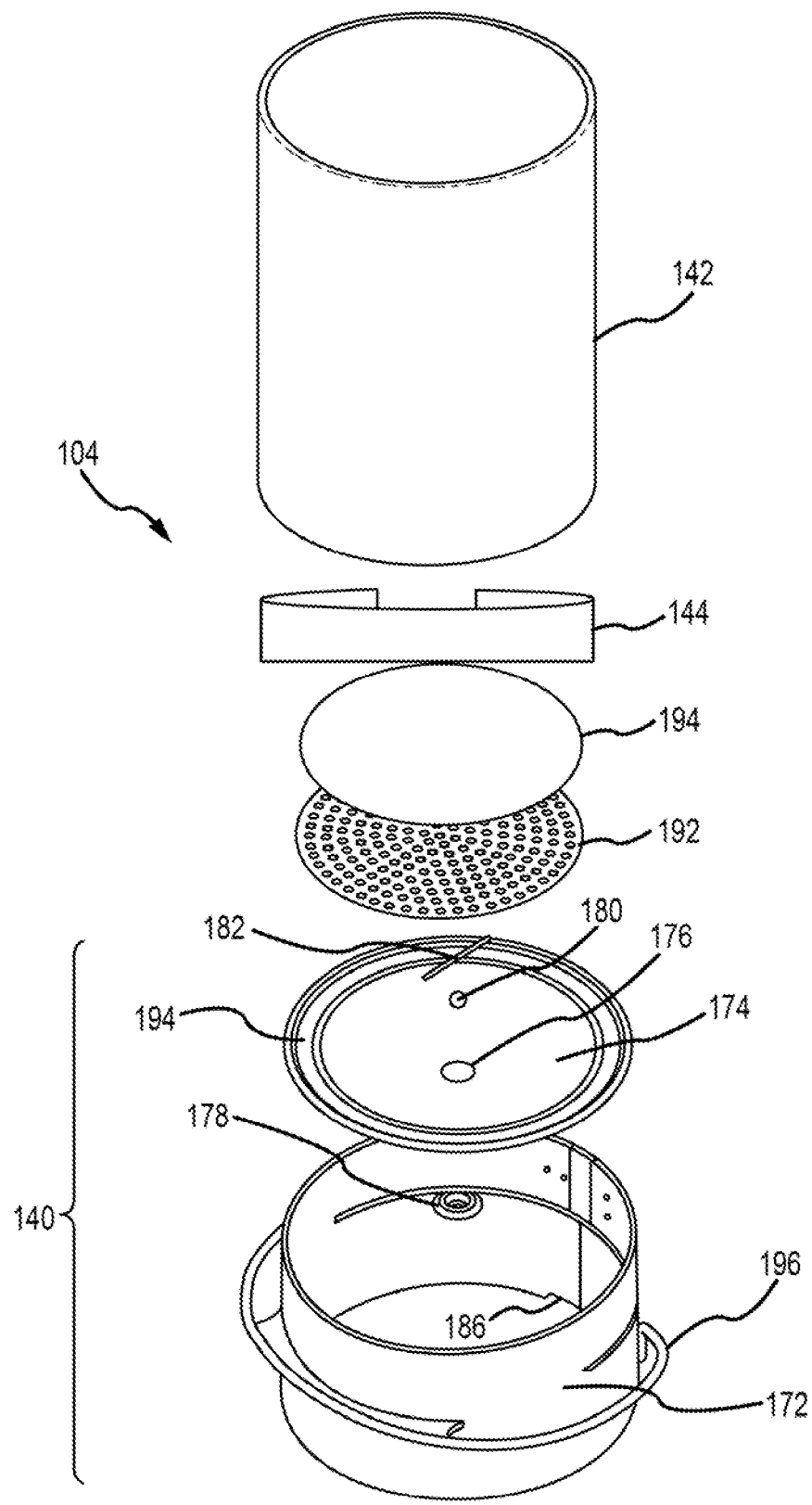
FIG. 5 is an exploded view of features of an extraction vessel of the cold brew coffee brewing system of FIG. 1.
Figure 6:
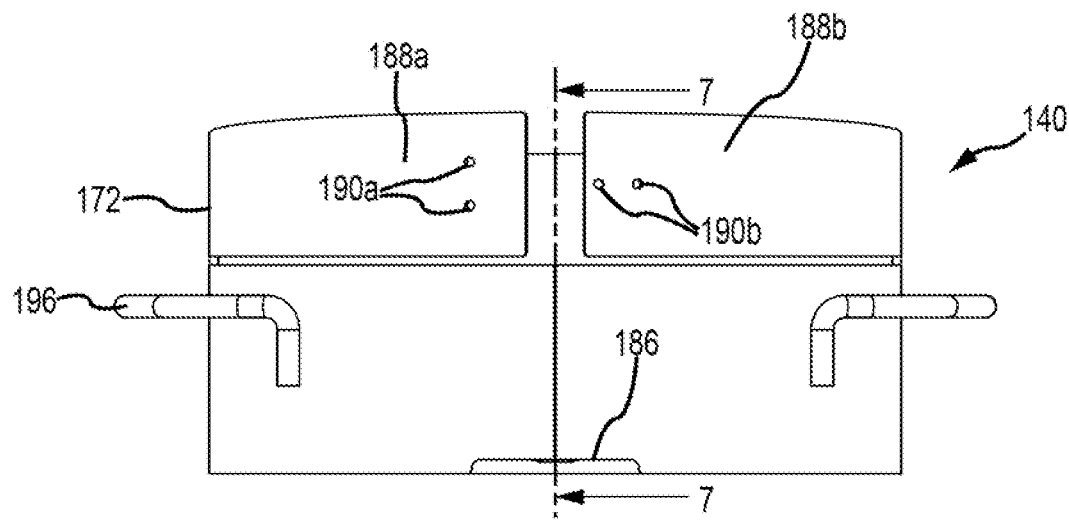
FIG. 6 is a rearview of a in extraction vessel base of an extraction vessel of the cold brew coffee brewing system FIG. 1.

Primary reference is now made to FIGS. 5-8, together with FIGS. 1-3, illustrating features of the extraction vessel 104. FIG. 5 shows an expanded view of components of the extraction vessel 104. As shown in FIG. 5, the extraction vessel base 140 includes an assembly with a vessel base support 172 and a funnel plate 174 disposed in and attached to an inner wall of the vessel base support 172 near the bottom of the vessel base support 172. The funnel plate 174 includes an aperture 176 through which cold brew coffee exits the extraction vessel 104 during an extraction operation to prepare a cold brew coffee product.

Figure 7:
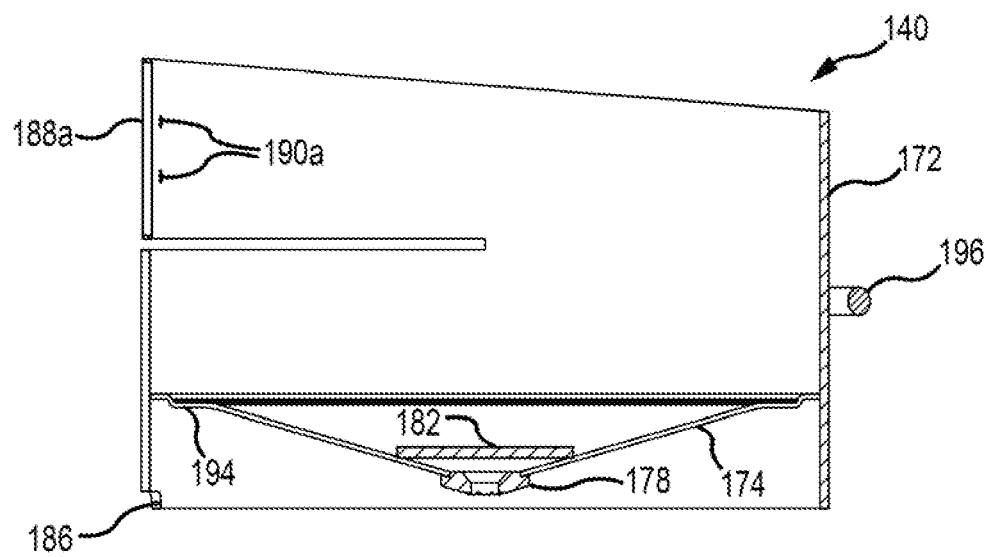
FIG. 7 is a sectional view of features of an extraction vessel base of the cold brew coffee brewing system of FIG. 1.
Figure 8:
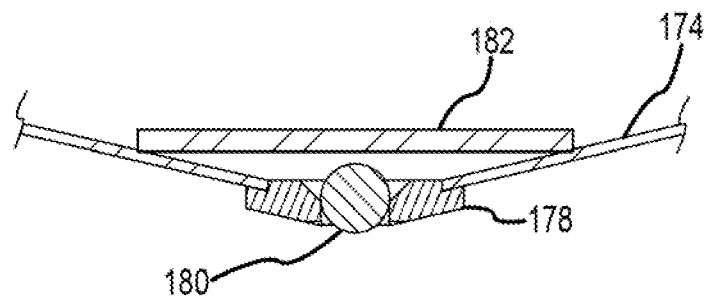
FIG. 8 is a partial sectional view showing valve features in a bottom portion of an extraction vessel base of the cold brew coffee brewing system of FIG. 1.

The extraction vessel base 140 also includes a valve feature that is in a normally closed position at the bottom of the funnel plate 174, but that is in an opened position when the extraction vessel 104 is received in the first receiving location 126 in the brewing orientation. As shown in FIG. 5, and with details of the valve feature assembly illustrated in FIGS. 7 and 8, a valve seat member 178 is attached to the bottom of the funnel plate 174 extending through the aperture 176, as illustrated in FIGS. 7 and 8. A ball 180 (not shown in FIG. 7) is configured to seat in the valve seat member 178 when the valve feature is in the normally closed position, as illustrated in the partial cross-section of FIG. 8. A pin 182, which is in a fixed position above the ball 180, keeps the ball 180 caged in the vicinity of the valve seat member 178, also as seen best in FIG. 8. As seen best in FIG. 3, the first platform plate 148 includes a tab projection 184 that upwardly projects above a surrounding flat platform surface to engage the valve features and to push the ball 180 up to unseat the ball 180 and open the valve when the extraction vessel 104 is received in the first receiving location 126 in the brewing orientation. In this way, the extraction vessel 104 is fluidly open through the valve feature when the extraction vessel 104 is received in the first receiving location 126 in the brewing orientation. A back side of the vessel base support 172 includes a slot 186 (seen best in FIG. 6) cut into the bottom wall portion of the vessel base support 172 to correspond to the position of the tab projection 184 and permit the extraction vessel 104 to be slid onto the first platform plate 148 without interference from the tab projection 184 until the tab projection 184 engages the valve features to unseat the ball 180 to open the valve when the extraction vessel 104 is in the brewing orientation for performing an extraction operation to prepare a cold brew coffee product. As may be appreciated, because of the very low rate of brew water flow to and through the extraction vessel 104 during a cold brew extraction operation, the size of the valve opening around the unseated ball 180 need not be very large. In many implementations, flow rate of brew water from the second water dispenser may be less than about 5 ounces per minute (less than about 9 liters per hour). As an alternative to the valve feature as illustrated in FIGS. 5-8, the valve feature may be provided with an alternative configuration. One preferred alternative configuration is a spring actuated valve that is biased by a spring toward an opened position and that is forced into a closed position against the bias of the spring by the tab projection 184 when the extraction vessel 104 is received in the first receiving location in the brewing orientation. Alternatively, a valve feature may include a manually actuated valve that may be manually positioned to the opened or closed position as desired, for example using a valve handle. The extraction vessel 104 may be manipulated with the valve feature manually positioned in the closed position until the extraction vessel 104 including the pre-infusion mixture is disposed in the first receiving location ready for an extraction operation, at which time the valve may be manually repositioned to the opened position to orient the extraction vessel 104 in the brewing orientation with a fluidly open bottom end for the extraction operation. In the embodiment illustrated in FIGS. 1-9, where the tab projection 184, or a similar feature, automatically repositions a valve feature from a close to an open position, in implementations including the first variation of preparing the pre-infusion mixture in the extraction vessel 104, during the pre-infusion operation the extraction vessel 104 may be received in the first receiving location 126 with the extraction vessel 104 not advanced onto the platform surface 122 to a sufficient distance to engage the tab projection 184 to open the valve feature, but sufficiently advanced onto the platform surface 122 to receive pre-infusion water dispensed from the first water dispenser 108. After preparing the pre-infusion mixture in the extraction vessel 104 with the valve feature in the closed position, then the extraction vessel 104 may be fully advanced onto the platform surface 122 to engage the tab projection 184 to push up on and open the valve feature, thereby reorienting the extraction vessel 104 to a brewing orientation for single-pass, flow-through extraction during the extraction operation. As will be appreciated, when the cold brew coffee brewing system 100 is used with the second variation for preparing the pre-infusion mixture in the extraction vessel 104, in one optional operation the pre-infusion water may be dispensed from the second water dispenser 110, the same water dispenser as used to dispense brew water during the brew operation, because the flow rates at which pre-infusion water and brew water are introduced into the extraction vessel 104 may be the same or similar. As will be appreciated, if the cold brew coffee brewing system 100 will be used with pre-infusion performed only by such a second variation, then the cold brew coffee brewing system 100 may be modified to include only a single water dispenser in the form of the second water dispenser 110. However, even if the cold brew coffee brewing system 100 will be operated using such a second variation for pre-infusion in the extraction vessel 104, having available both the first water dispenser 108 and the second water dispenser 110 provides flexibility to prepare the pre-infusion mixture in a pre-infusion container or in the extraction vessel 104 by the first variation using the first water dispenser 108 or to prepare the pre-infusion mixture in the extraction vessel 104 by the second variation using the second water dispenser 110 with pre-infusion water dispensation rates that are much higher than brew water dispensation rates used during the extraction operation.

With continued reference primarily to FIGS. 5-8, in the assembly of the extraction vessel 104 a bottom end portion of the brew cylinder 142 is received in the vessel base support 172 with the gasket 144 disposed between the outer received wall of the brew cylinder 142 and the adjacent inner wall of the vessel base support 172. As received in the vessel base support 172, the bottom end of the brew cylinder 142 is disposed above and adjacent to a top outer edge of the funnel plate 174 adjacent the inner wall of the vessel base support 172. The vessel base support 172 includes tab portions 188a,b. The gasket 144 is shaped generally to correspond in shape with the tab portions 188a,b, and when the brew cylinder 142 is received in the vessel base support 172 with the gasket 144 disposed about the outside of the brew cylinder 142 positioned adjacent the tab portions 188a,b, then the tab portions 188a,b may be drawn together and secured to snuggly engage the brew cylinder 142 with the vessel base support 172. The tab portions 188a,b may be drawn together and secured by the latch 145 (illustrated in FIG. 3, not illustrated in FIGS. 5-8) attached to the opposing ends of the tab portions 188a,b, for example by screws or rivets disposed through the securement holes 190a,b through the tab portions 188a,b.

With reference primarily to FIGS. 5 and 7, the extraction vessel 104 includes a perforated plate 192 that that is disposed inside the vessel base support 172 resting on top of a shoulder portion 194 of the funnel plate 174. The perforated plate 192 provides a fluid-permeable support to support coffee grounds in an extraction bed volume in the extraction vessel extending into the brew cylinder 142 above the perforated plate 192. As shown in FIG. 5, a filter element 194 may be disposed on top of the perforated plate 192 to appropriately filter the cold-brew coffee prior to exiting the fluid exit end of the extraction vessel 104 through the funnel plate 174. The filter element 194 may have a filtration separation size to filter out fine coffee ground particles, and in some implementations may have a filtration separation size in a range of from 15 microns to 150 microns, and preferably from 50 to 100 microns.

With continued reference to FIGS. 1-9, the extraction vessel 104 has a handle 196 extending around the front side of the extraction vessel 104, which permits convenient handling of the extraction vessel 104 and movement of the extraction vessel 104 into and out of the brewing orientation in the first receiving location 126. For convenient cleaning, the latch 145 may be unlatched to loosen the tab portions 188a,b and permit the components of the extraction vessel to be disassembled for washing as appropriate. Typically, a new filter element will be inserted for each batch of cold brew coffee product prepared using the cold brew coffee brewing system 100.

The collection container 106 also includes a handle 198 that may be used for convenient handling and movement of the collection container 106 into and out of the collection orientation in the second receiving location 128.

Figure 9:
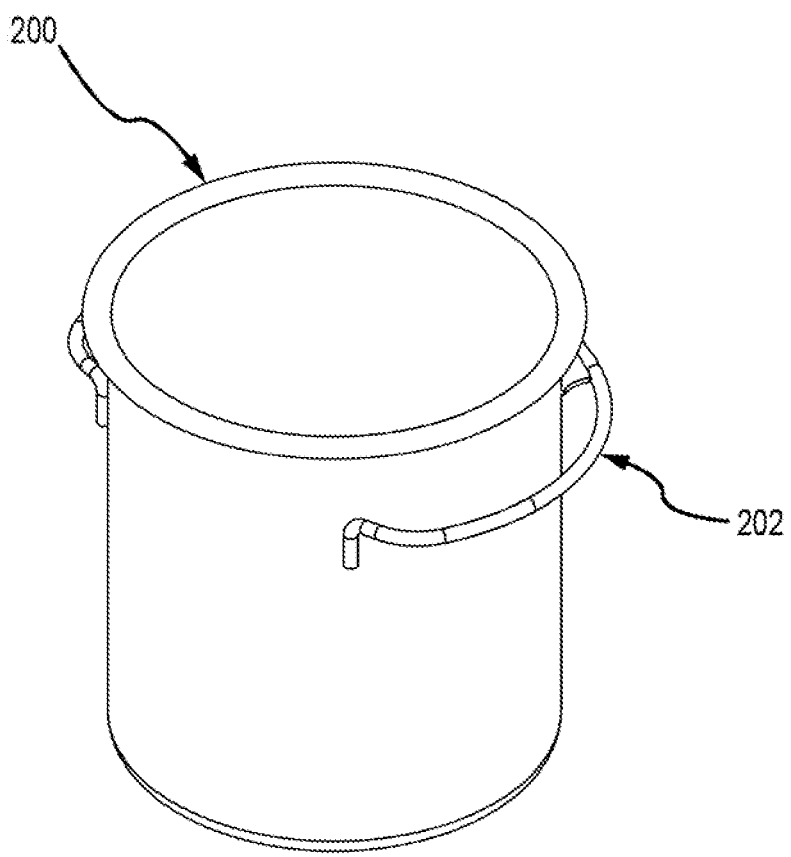
FIG. 9 is a perspective view of a collection vessel of the cold brew coffee brewing system of FIG. 1.

Optionally, the cold brew coffee brewing system 100 may include a pre-infusion container that may be selectively received in the first receiving location 126 to receive pre-infusion water from the first water dispenser 108 to prepare a pre-infusion mixture of the pre-infusion water and the fresh coffee grounds for preparation of a cold brew coffee product. The pre-infusion container may be a solid-bottom container to positively contain fluids, and may be of a similar design to the collection container 106, or may be of a different design. In some implementations, a single container may be use as both a pre-infusion container and a collection container. FIG. 9 shows one example of a pre-infusion container 200, which includes a handle 202 for convenient handling and movement of the pre-infusion container 200 into and out of a pre-infusion orientation in the first receiving location 126. In some implementations, the pre-infusion container 200 for use with the cold brew coffee brewing system 100 illustrated in FIGS. 1-3 may include a bottom profile that accommodates and does not interfere with the tab projection 184 of the first platform plate 148. For example, a bottom profile of the pre-infusion container may include a slot feature that corresponds in location with the tab projection 184. In other implementations, the pre-infusion container 200 may have a flat bottom profile, and the tab projection 184 may tilt the pre-infusion container 200 slightly when received in the first receiving location in the pre-infusion orientation to receive pre-infusion water. The cold brew coffee brewing system 100 may, optionally, also include a mixing member, or other mixing device, insertable into the pre-infusion container 200 to mix pre-infusion water and coffee grounds to prepare a well-mixed pre-infusion mixture, which after adequate mixing to wet the coffee grounds may be transferred from the pre-infusion container to the extraction vessel 104. For example, the pre-infusion mixture may be poured from the pre-infusion container 200 into the extraction vessel 104, and optionally any residual grounds may be scraped from the inside walls of the pre-infusion container 200 and added to the pre-infusion mixture in the extraction vessel 104. Such a mixing member may be a hand-held paddle, large spoon, spatula or other implement to manually stir the contents within the pre-infusion vessel. As an alternative to such a mixing member, the cold brew coffee brewing system 100 may include an electric mixer or other power mixer that may be manually inserted into the pre-infusion mixture to mix the pre-infusion water and the coffee grounds. As a further alternative, the extraction vessel 104 may include an internal mixer disposed in the interior space of the extraction vessel 104 (e.g., an electrically or magnetically powered mixer) to mix the coffee grounds and the pre-infusion water. Such an internal mixer is generally not preferred due to the added design complexity for the extraction vessel 104 and the difficulty of cleaning the extraction vessel with such an internal mixer.

In an alternative embodiment to that illustrated in FIGS. 1-9, the cold brew coffee brewing system 100 may be modified to relocate the first water dispenser 108 to the vicinity of the shelf structure 118 and disposed to deliver pre-infusion water downwardly to the second receiving location 128, where the pre-infusion container 200 may be disposed in a pre-infusion orientation to receive the pre-infusion water at the second receiving location. In that alternative embodiment, a water flow conduit to the relocated first water dispenser 108 may extend through the support member 116 to the elevation of the shelf structure 118 and then exit the support member to connect to the relocated first water dispenser 108 to provide pre-infusion water to the second receiving location 128.

Figure 10:
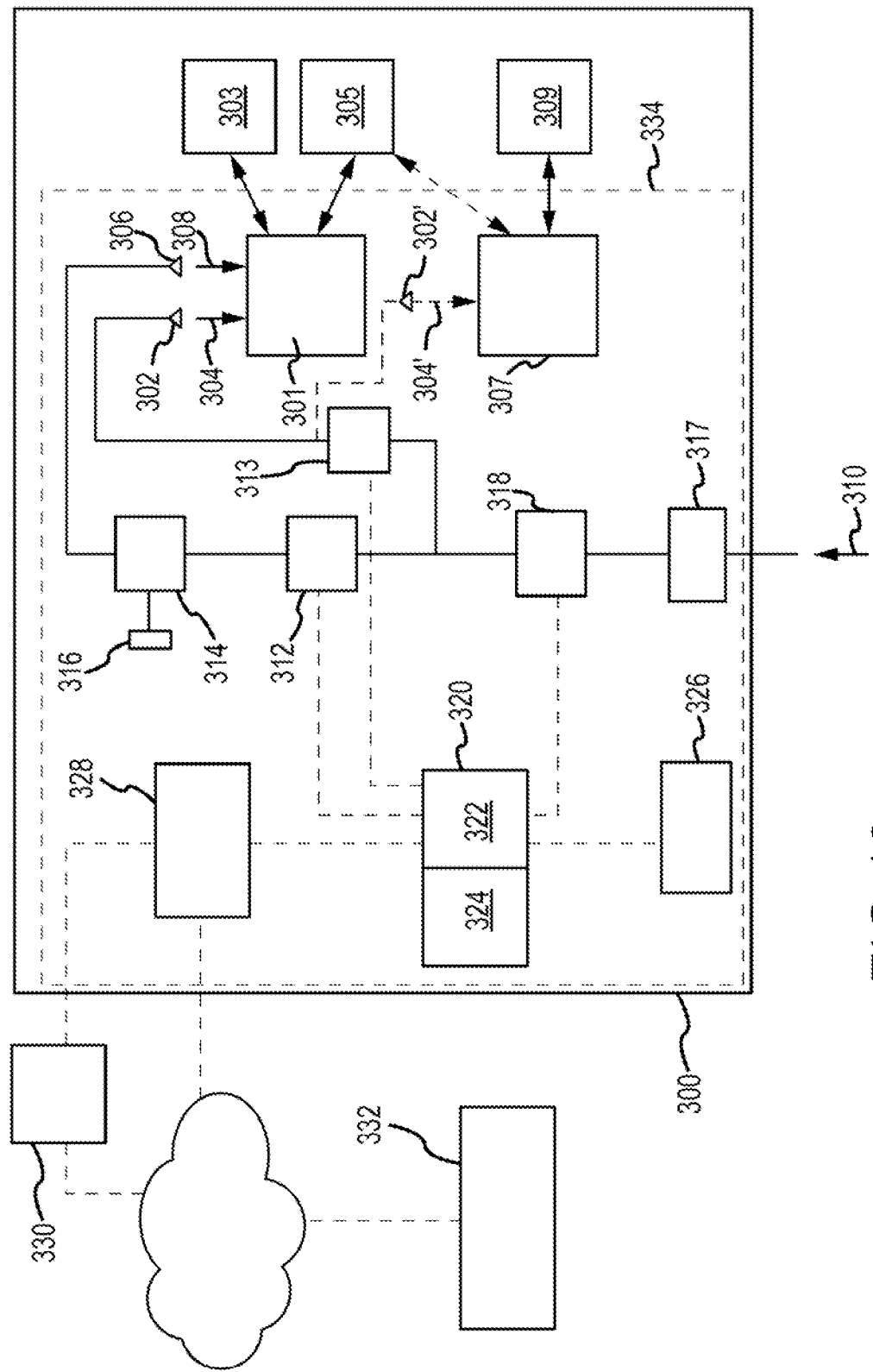
FIG. 10 is an illustration of an example embodiment of a cold brew coffee brewing system and communication and network features including such a cold brew coffee brewing system.

Reference is now made primarily to FIG. 10 with a schematic illustrating example water dispensing, process control and communication features for an example cold brew coffee brewing system 300 including an extraction vessel, pre-infusion container and collection container. In FIG. 10, for convenient illustration and description, fluid flow connections are generally shown as solid lines and communication connections are shown as dashed lines. Such communication connections may, for example, be provided as wired and/or wireless connections. One exception to this convention is that FIG. 10 illustrates one alternative water flow connection to an alternative first water dispenser 302', as discussed below. Illustrated in FIG. 10 are water dispensing and brew control features of an example cold brew coffee brewing system 300, which may for example be or include the cold brew coffee brewing system 100, or features thereof, illustrated in FIGS. 1-9. In the illustration of FIG. 9, the water dispensing system of the cold brew coffee brewing system 300 includes a first water dispenser 302 for dispensing pre-infusion water 304 to a first receiving location 301 during a pre-infusion operation for preparation of a pre-infusion mixture with water and coffee grounds and includes a second water dispenser 306 for dispensing brew water 308 to the first receiving location 301 during an extraction operation. A pre-infusion container 305 and extraction vessel 303 may alternatively be received in the first receiving location 301 during processing to prepare cold brew coffee product. The pre-infusion container 305 may be selectively received in the first receiving location 301 to receive the pre-infusion water 304 to prepare pre-infusion mixture with coffee grounds. The extraction vessel 303, initially containing the pre-infusion mixture transferred from the pre-infusion container 305, may be selectively received in the first receiving location 301 to receive the brew water 308 during an extraction operation to prepare a cold brew coffee product. Alternatively, the pre-infusion mixture may be prepared in the extraction vessel 303, using either the first variation approach or the second variation approach. The description below if provided primarily with reference to preparation of the pre-infusion mixture in a pre-infusion container 305, but the same general processing also applies to preparation of the pre-infusion mixture in the extraction vessel 303. A collection container 309 may be selectively received in the second receiving location 307 to receive and collect cold brew coffee exiting the extraction vessel during an extraction operation to prepare the cold brew coffee product.

The first water dispenser 302 and the second water dispenser 306 are in fluid connection through respective fluid flow paths with a source of feed water 310. The source for the feed water 310 may be provided through a single inlet water connection of the cold brew coffee brewing system 300 to a water source, for example a municipal water system or a water storage tank with a reservoir of feed water. Although the cold brew coffee brewing system 300 is shown with only a single feed water connection supplying feed water for both the pre-infusion water 304 to the first water dispenser 302 and the brew water 308 to the second water dispenser 306, in alternative implementations separate feed water sources may be provided for the pre-infusion water 304 and the brew water 308. A master shut-off valve 317 permits flow of the feed water to be turned on or off to the water dispensing system of the cold brew coffee brewing system 300. The water dispensing system of the cold brew coffee brewing system 300 includes two flow control valves 312, 313. A first control valve 312 may be operated between open and closed positions to permit or not permit flow of pre-infusion water for pre-infusion processing to the first water dispenser 302, and a second flow control valve 313 may be operated between open and closed positions to permit or not permit flow of brew water for extraction processing to the second water dispenser 306. The first flow control valve 312 and the second flow control valve 313 may, for example, each be a solenoid valve.

Regardless of the source of water for the cold brew coffee brewing system (e.g., municipal water connection or water reservoir tank), the water may be appropriately treated (e.g., by filtration, addition of desired dissolved mineral components and/or removal of undesired dissolved salts) prior to delivery to the cold brew coffee brewing system 300. Also, the pressure of the source water as fed to the cold brew coffee brewing system 300 may be regulated to a desired degree. For example when municipal water pressure or pressure from a reservoir tank is not at a desired pressure for operation of the cold brew coffee brewing system 300, pressure of the supply water to cold brew coffee brewing system 300 may be regulated. For example, a pressurizing pump may be used in combination with a pressurized fluid accumulator to boost the water pressure to a desired delivery pressure, and the pressurized fluid accumulator may provide for regulation of the pressure at which the water is supplied to the cold brew coffee brewing system 300. A pressure sensor downstream of the pressurizing pump (e.g., on the fluid accumulator) may monitor supply water pressure and activate the pressurizing pump between on and off positions to pressurize the accumulator as needed to maintain water feed pressure in a desire pressure range. It has been found that one preferred range for water supply pressure is from 95 to 110 psi (0.655 to 0.724 MPa). Also, a flow control system with a flow sensor and flow control valve may be located on the water supply line to the cold brew coffee brewing system 300 to control the flow rate of supply water. Monitored flow rate feedback may be provided from the flow sensor to adjust the flow control valve to maintain water supply flow at a controlled flow rate. Such a flow control system could alternatively be incorporated into componentry in the cold brew coffee brewing system 300, for example using the flow sensor 318 and the controller unit 320. In the case of such flow control on the supply water, the manual flow adjustment valve 314 might be used only for very fine flow adjustments or might be limited entirely.

As illustrated in FIG. 10, the water dispensing system 300 includes a flow adjustment valve 314 disposed in the fluid flow path for brew water between the first flow control valve 312 and the second water dispenser 306. The flow adjustment valve 314 may be hand-manipulated through a valve handle 316 to manually adjust a flow rate of brew water to the second water dispenser 306. The flow adjustment valve 314 may be used to make fine adjustments to the flow rate of the brew water during an extraction operation toward a specified target flow rate for preparing a particular cold brew coffee product. In a contemplated alternative, such fine flow adjustment could be provided through an automated flow measurement and control feedback loop to an automatically-adjusted flow valve. However, it is been found that providing for such fine flow adjustments of brew water through manual manipulation is convenient and provides simple and effective control of brew water flow rate, and avoids complications of control system fluctuations, and particularly as a consequence of possible fluctuations of feed water delivery pressures from a feed water source. Disposed in the flow path downstream of the shut-off valve 317 and prior to the flow tee to the first water dispenser 302 and the second water dispenser 306 is a flow sensor 318 for use to monitor water flow rate through the water dispensing system to either the first water dispenser 302 or the second water dispenser 306, as the case may be.

The cold brew coffee brewing system 300 illustrated in FIG. 10 includes a brew control system to control operation of the water dispensing system during a cold brewing process cycle for preparation of a cold brew coffee product. The brew control system includes a controller unit 320 having a computer processor 322 and nonvolatile computer memory 324 in communication with the processor 322. The memory 324 has stored product preparation parameters (product profile) for one or more cold brew coffee products that may be prepared by the cold brew coffee brewing system 300. The set of product preparation parameters for a cold brew coffee product is also referred to herein as the product profile. The processor 322 is configured to access the memory 324 to retrieve product preparation parameters and to execute a brew control operation for performance of a cold brewing process cycle to prepare the cold brew coffee product corresponding to the product preparation parameters. The processor 322 may also record in the memory 324 production data for cold brew coffee product batches prepared by the cold brew coffee brewing system 300. The controller unit 320 is in communication connection with the first flow control valve 312 and the second flow control valve 313, and the processor 322 may direct control signals to each of the first flow control valve 312 and the second flow control valve 313 to actuate the respective flow control valves between opened and closed positions to selectively permit or not permit water flow to each of the first water dispenser 302 and the second water dispenser 306. During a pre-infusion operation when pre-infusion water 304 is being dispensed to the first receiving location 301 from the first water dispenser 302, the first flow control valve 312 may be actuated to the opened position while the second control valve 313 is maintained in a closed position. Conversely, during an extraction operation when brew water 308 is being dispensed to the first receiving location 301 through the second water dispenser 306, the second flow control valve 313 may be actuated to the opened position while the first control valve 312 is maintained in a closed position. The controller unit 320 is also in communication connection with a user interface 326, which is configured to display information, for example through a graphic display, to a user (operator) of the cold brew coffee brewing system 300 and to receive input instructions from such a user, for example through an encoder, for preparation of a cold brew coffee product, which instructions are then processed by the controller unit 320 to control operation of the water dispensing system to prepare the cold brew coffee product based on the product preparation parameters for that cold brew coffee product. The controller unit 320 is also in communication connection with the flow sensor 318 to obtain monitored flow rate information of water flow through the fluid dispensing system to either the first water dispenser 302 or the second water dispenser 306. The controller unit may display at the user interface 326 water flow rate for flow of brew water to the second water dispenser 306, for example, to permit a user to manually manipulate the manual adjustment handle 316 to adjust the brew water flow rate to the second water dispenser 306 to near a desired target flow rate for brew water consistent with the product preparation parameters for preparation of a particular cold brew coffee product. The user interface may include a graphic display and one or more input devices. Such input devices may include, for example buttons, dials and or knobs, and may combine display and some or all input functions in a touchscreen, although use of a touchscreen is not preferred because of possible damage if water or cold brew coffee were to spill on it.

The cold brew coffee brewing system 300 illustrated in FIG. 10 includes a communication module 328 in communication connection with the controller unit 320. The communication module 328 may include communication componentry, for example antennas, modems and communication controllers, to facilitate communication of the controller unit with external devices. Such an external device may be in a local vicinity of the cold brew coffee brewing system 300 and may for example be connected through a local area connection, such as Wi-Fi or a local area network ethernet connection. Such an external device may alternatively be in a remote location relative to the cold brew coffee brewing system and may, for example be connected through a cellular, telephone or cable connection. For illustration purposes, the cold brew coffee brewing system 300 is shown with the communication module 328 in a local area communication connection with a local area device 330, for example a mobile phone, tablet computing device or laptop, that may be connected through a local area wired connection (e.g., through a USB plug connection) or wireless connection (e.g. through a local Wi-Fi connection) and with a remote device 332, for example a remote server, mobile phone or tablet that may be connected through a cellular, telephone and/or cable connection. Although the local area device 330 and the remote device 332 are illustrated in FIG. 10 as external to the cold brew coffee brewing system 300, any such device when in communication with the controller unit 320 may be considered to be a part of the cold brew coffee brewing system 300, and in one alternative, any functions that may be performable through the user interface 326 may alternatively be performed through such a local area device 330 or a remote device 332. For illustration purposes, the remote device 332 is shown connected through the internet as indicated by the illustrated cloud, although such a remote device 332 may alternatively be connected directly through a direct cellular, landline telephone, cable or other direct connection with the communication module 328.

As shown in FIG. 10, the device 332 may alternatively be connected with the cold brew coffee brewing system 300 through the local area device 330. Similarly, the device 332 may alternatively be connected to the cold brew coffee brewing system 300 through a remote access connection, such as a telephone, cellular or cable connection. In one variation, the device 332 may be a central server communicating with a network of a plurality of cold brew coffee brewing systems, which may each be or have attributes of the configuration of the cold brew coffee system 300. The central server device 332 may communicate changes to one or more of the cold brew coffee brewing systems of the network, for example to modify the profile (e.g., modify one or more product preparation parameters or add a new product preparation parameter) of a cold brew coffee product and/or to add to a menu a profile for a new cold brew coffee product for preparation by the cold brew coffee brewing system. In some preferred implementations, such a central server device 332 may be accessed through a web portal to input product modifications or new products for updating in the memory 324 of the cold brew coffee system 300 by such a central server device 332. In addition to or as an alternative to product profiles stored in the memory 324, the processor 322 may temporarily access a product profile for a cold brew coffee product stored on the central server device 332 and may control operation of the brew control system to prepare the cold brew coffee brewing system without having the product profile stored in the memory 324, in a cloud-based application accessible by the controller unit 320.

As illustrated in FIG. 10, most components of the cold brew water brewing system 300 may conveniently be contained in a tower unit 334 structure, which could for example be in the form of or have features of the tower unit 102 illustrated for the cold brew coffee brewing system 100 of FIGS. 1-9.

As noted, the cold brew coffee brewing system 300 illustrated in FIG. 10 may, but need not include or have features of, the cold brew coffee brewing system 100 illustrated in and described in relation to FIGS. 1-9. In that regard, the first water dispenser 302, second water dispenser 306, pre-infusion container 305, extraction vessel 303, collection container 309, first receiving location 301, second receiving location 307 and the manual adjustment handle 316 illustrated in FIG. 10 may be, respectively, the first water dispenser 108, second water dispenser 110, pre-infusion container 200, extraction vessel 104, collection container 106, first receiving location 126, second receiving location 128 and second knob 138 as illustrated and described in relation to FIGS. 1-9. The user interface 326 illustrated in FIG. 10 may be or include the user interface features of the display 134 and the first knob 136 illustrated in FIGS. 1-3. For example, the first knob 136 may have encoder functionality, and may be rotatable to scroll between available menu choices and may be depressable to input a selection from an available menu, for example to select a cold brew product for preparation, to input a control instruction, or to cancel an operation. For example, when the cold brew coffee brewing system 300 illustrated in FIG. 10 is in the form of or includes the cold brew coffee brewing system 100 illustrated in FIGS. 1-9, the shut off valve 317, first flow control valve 312, second flow control valve 313, flow adjustment valve 314, flow sensor 318, controller unit 320 and communication module 328 may be enclosed inside the base portion 114 of the tower unit 102 of the cold brew coffee brewing system 100.

FIG. 10 also illustrates an alternative arrangement for a first water dispenser to provide pre-infusion water to the second receiving location 307 rather than to the first receiving location. FIG. 10 shows an alternatively located first water dispenser 302' disposed to provide an alternative flow of pre-infusion water 304' to the second receiving location 307. As shown in FIG. 10, in this alternative configuration the pre-infusion container 305 is selectively receivable in a pre-infusion orientation in the second receiving location 307, when the collection container 309 is not received in the second receiving location 307. When the pre-infusion container 305 is received in the pre-infusion orientation in the second receiving location 307, in this alternative configuration the pre-infusion water 304' may be delivered to the pre-infusion container 305 from the alternative first water dispenser 302' to mix with coffee grounds in the pre-infusion container at the second receiving location 307 to prepare the pre-infusion mixture. Other than the alternative location of delivering the pre-infusion water to the pre-infusion container 305, the operation of the alternative configuration for the cold brew coffee brewing system 300 is the same as described above. As noted above, a water flow line for fluid connection to deliver water to the alternative first water dispenser 302' is shown in as a dashed line to indicate the alternative character of the feature in the illustration of FIG. 10. In a further alternative configuration, the cold brew brewing system 300 may include both the first water dispenser 302 and the alternative water dispenser 302' with appropriately modified fluid control to alternatively direct pre-infusion water to the first receiving location 301 or the second receiving location 307, depending on at which receiving location pre-infusion water is to be dispensed during a pre-infusion operation.

Features of an example method will now be described with reference to FIGS. 11-18.

Figure 11:
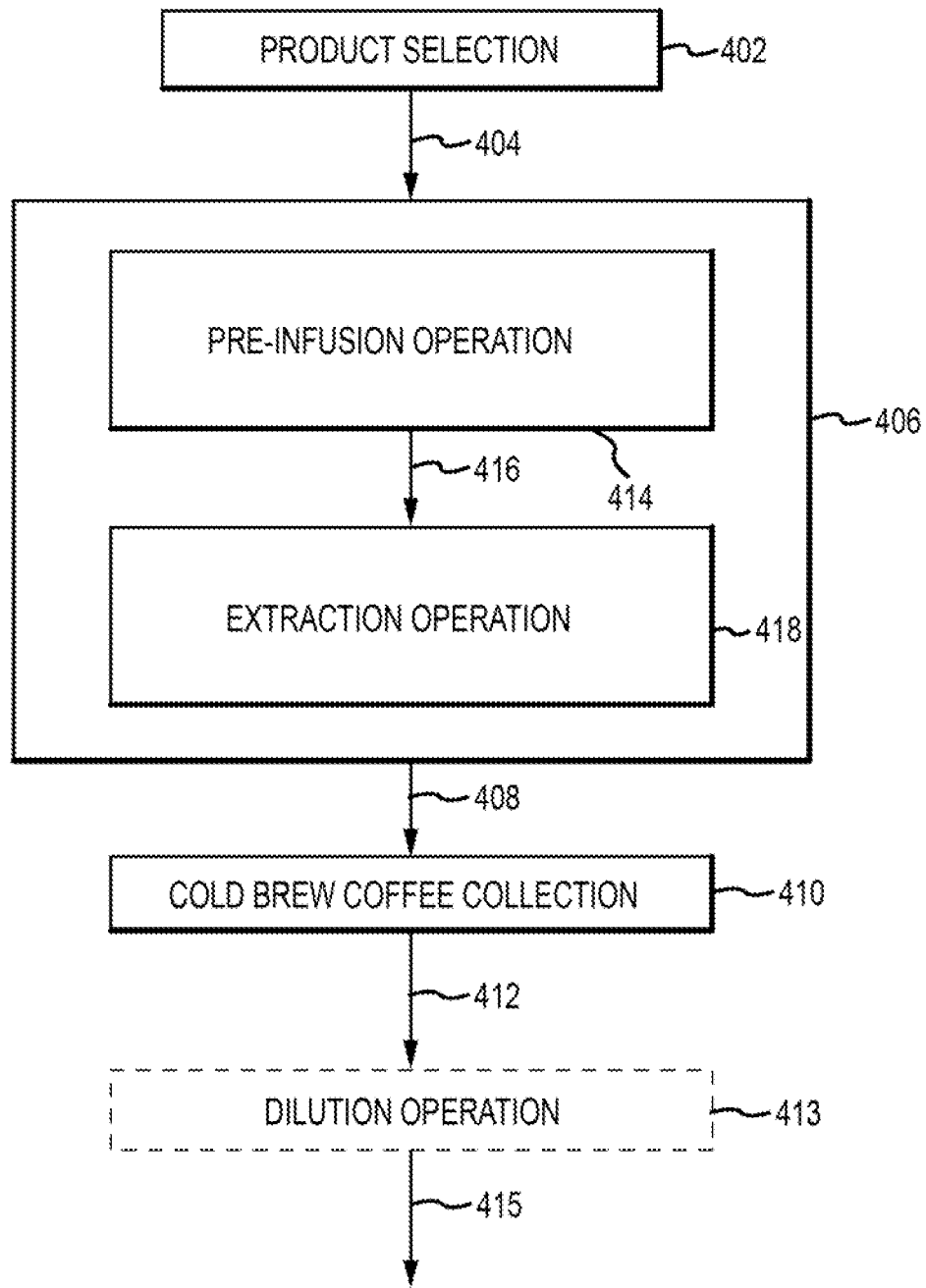
FIG. 11 is a process diagram for a method of preparing a cold brew coffee product.

FIG. 11 illustrates a general method for operation of a cold brew coffee brewing system of this disclosure (e.g., the cold brew coffee brewing system 100 illustrated in FIGS. 1-9 or the cold brew coffee brewing system 300 illustrated in FIG. 10 or having features of either of them). In the general process illustrated in FIG. 11, a first step is product selection 402, in which a selection is made between available cold brew coffee product options for preparation with the cold brew coffee brewing system, for example a selection is made from available menu options stored in a controller unit of the cold brew coffee brewing system or available through a cloud-based application. In a subsequent general step of coffee product preparation 406, a desired cold brew coffee 408 is prepared using the cold brew coffee brewing system according to product preparation parameters (product profile) for the selected cold brew coffee product 404. In a step of cold brew coffee collection 410, the cold brew coffee 408 is collected to prepare a resulting cold brew coffee product 412.

When the cold brew coffee brewing system used in the implementation of the method illustrated in FIG. 11 includes a controller unit programmed to prepare only a single cold brew coffee product, this product selection 402 step may include nothing more than instructing the controller unit to commence execution of a brew control operation for performance of a cold brewing process cycle to prepare the available cold brew coffee product as the product selection 404. However, when the cold brew coffee brewing system is programmed for, or a cloud-based application is accessed that provides for, preparation of a plurality of different cold brew coffee products, the product selection 402 may include displaying, at the direction of the controller unit, a menu of available cold brew coffee products on a graphic display of a user interface and selection by the user of one of the available menu options as the selected cold brew coffee product 404.

As illustrated in FIG. 11, the coffee product preparation 406 includes performance of a pre-infusion operation 414 to prepare a pre-infusion mixture 416 including coffee grounds and pre-infusion water and an extraction operation 418, during which the coffee grounds are subjected to a single-pass, non-immersion extraction with brew water.

During the pre-infusion operation 414, the pre-infusion mixture 416 is prepared including a mixture with a feed coffee quantity of coffee grounds of a particular feed coffee source and a total quantity of pre-infusion water according to product preparation parameters for the selected cold brew coffee product 404 as specified by the controller unit of the cold brew coffee brewing system. The pre-infusion mixture 416 may be prepared in a pre-infusion container with pre-infusion water dispensed by a water dispensing system to a receiving location of the cold brew coffee brewing system for pre-infusion (e.g., to the first receiving location or the second receiving location, depending on the configuration). It has been found that preferred operation is to have a total quantity of the pre-infusion water that is less than a residual water concentration that will be retained in the coffee grounds at the end of the extraction operation. To commence the extraction operation 418, the pre-infusion mixture 414 may be transferred from the pre-infusion container to an extraction vessel which is then disposed in the first receiving location and brew water is dispensed into the extraction vessel above the coffee grounds from the water distribution system of the cold brew coffee brewing system, with the coffee grounds initially being in the pre-infusion mixture 414 at commencement of dispensing the brew water into the extraction vessel. In alternative operation, the pre-infusion mixture may be prepared in the extraction vessel, using either of the first or second variations.

In the cold brew coffee collection 410 cold brew coffee exiting from the extraction vessel during the extraction operation, and optionally also for some drain period following the extraction operation 418, may be collected with the batch of collected cold brew coffee making up the cold brew coffee product 412. The cold brew coffee collection 410 may include collecting the cold brew coffee 408 in a collection container received in the second receiving location of the cold brew coffee brewing system, and the collection container may be removed from the second receiving location with the cold brew coffee product 412 after collection of all or a desired portion of the cold brew coffee 408 as a product batch of cold brew coffee. Dispensation of pre-infusion water and brew water, and progression between various stages of the processing of FIG. 11 may be controlled at the direction of the controller unit of the cold brew coffee brewing system according to the product preparation parameters for the particular cold brew product selection 403. Such stages of the processing may occur before, after or within one of the general processing steps is identified in FIG. 11.

Product preparation parameters for a cold brew product stored in the process controller (e.g., in the memory 324 of the cold brew coffee brewing system 300 of FIG. 10) or available through a cloud-based application, may include any one or more of the following parameters, or all of the following parameters:

TABLE 1

Example Product Preparation Parameters

| Product Preparation Parameter | Description |
|---|---|
| Feed coffee source | Identification of particular coffee to be used to prepare the cold brew coffee product (e.g., country, region, grower, processor and/or label of origin) |
| Feed coffee grind requirement | How finely or coarsely the coffee is to be ground for preparation of the cold brew coffee product. This may be specified as a particular grind setting for a particular coffee grinding machine brand and model. This product preparation parameter may be customized for particular grinding equipment used in the location where the cold brew coffee brewing system is located. |
| Feed coffee quantity | Total amount of coffee to be used to prepare the cold brew coffee product, typically identified by weight (e.g., pounds or kilograms). This is typically the amount of the feed coffee used to prepare the pre-infusion mixture of coffee grounds and water. |
| Total quantity of pre-infusion water | Amount of water to be used to make the pre-infusion mixture with coffee grounds to prepare the cold brew coffee product, typically identified by volume (e.g., volumetric liquid ounces, quarts or liters). |
| Total quantity of brew water | Amount of water to be used during extraction processing (after pre-infusion processing has been completed) to prepare the cold brew coffee product, typically identified by volume (e.g., volumetric fluid ounces, quarts or liters). |
| Proportion (ratio) of total quantity of pre-infusion water to feed coffee quantity | Quantity of pre-infusion water per unit quantity of coffee grounds mixed together for the pre-infusion mixture for preparation of the cold brew coffee product, typically identified as volume of pre-infusion water per unit weight of coffee grounds (e.g., volumetric fluid ounces per pound, quarts per pound, or liters per kilogram). |
| Pre-infusion water dispensation profile properties | Constant or intermittent (pulsed) dispensation profile and allocation of active and inactive (rest) periods for intermittent profile. |
| Proportion (ratio) of total quantity of brew water to feed coffee quantity | Quantity of brew water delivered to the extraction vessel containing coffee grounds for preparation of the cold brew coffee product per unit quantity of the feed coffee quantity used for preparation of the cold brew coffee product, typically identified as volume of brew water per unit weight of coffee grounds (e.g., volumetric fluid ounces per pound, quarts per pound, or liters per kilogram). |
| Total product yield | Quantity of cold brew coffee product targeted for preparation, typically identified by volume. May be identified as a total quantity (e.g., volumetric fluid ounces, quarts or liters of cold brew coffee) or as a unit quantity relative to feed coffee quantity (e.g., volumetric fluid ounces per pound, quarts per pound, or liters per kilogram). |
| Total brew time | Total time identified for the brew (extraction) operation from commencement of dispensation of brew water through dispensation of the total quantity of brew water, and including any final rest/drain period following final dispensation of brew water. |
| Brew water dispensation profile | Flow profile for dispensation of all brew water dispensed during an extraction operation (e.g., dispensation of brew water at an approximately constant rate until all brew water has been dispensed for the extraction operation, or a pulsed or intermittent profile including active brew periods of brew water dispensation |

TABLE 1-continued

Example Product Preparation Parameters

| Product Preparation Parameter | Description |
|---|---|
| | alternating with rest periods with no or substantially reduced dispensation of brew water). There may be several sub-parameters for the brew water dispensation profile, as noted in the listing below. |
| Brew water dispensation profile properties, e.g., total allocation of total brew time between active water dispensation periods and rest periods for pulsed/intermittent brew water dispensation profile | Proportions of total projected brew time during which brew water is to be dispensed (active brew periods) and during which there is to be no or substantially reduced water dispensation (rest periods). These proportional times may correspond to the total time of first brew water profile periods and total time of second brew water profile periods. |
| Brew water dispensation profile—the length of first brew water profile periods (active brew periods) for pulsed/intermittent brew water dispensation profile | The time duration of each active brew period (first brew water profile period) typically identified in minutes. The time duration of each active brew period may be the same or may vary between different active brew periods. |
| Brew water dispensation profile—length of second brew water profile periods (rest periods) for pulsed/intermittent brew water dispensation profile | The time duration of each rest period, including any final specified rest period following final dispensation of brew water) typically identified in minutes. The time duration of each rest period may be the same or may vary between different rest periods. |
| Brew water dispensation rate | Flow rate of brew water from the water dispensing system to the to the extraction vessel during times of active brew water dispensation, typically identified as volume of brew water per unit time (e.g., volumetric fluid ounces per minute or liters per hour) |
| Collected Product TDS | Target level of total dissolved solids (TDS) content desired in a collected cold brew coffee product from completion of the extraction operation. |
| Diluted Product TDS | Target level of total dissolved solids (TDS) content in a diluted cold brew coffee product, for example with desired properties for consumption relative to a more concentrated product resulting directly from an extraction operation.. |

The example product preparation parameters listed in Table 1 are not exclusive and in addition to one or more of these listed product preparation parameters, additional product preparation parameters could also be specified, and stored in the controller unit, for the product profile of any particular cold brew coffee product to be prepared using the cold brew coffee brewing system.

Figure 12:
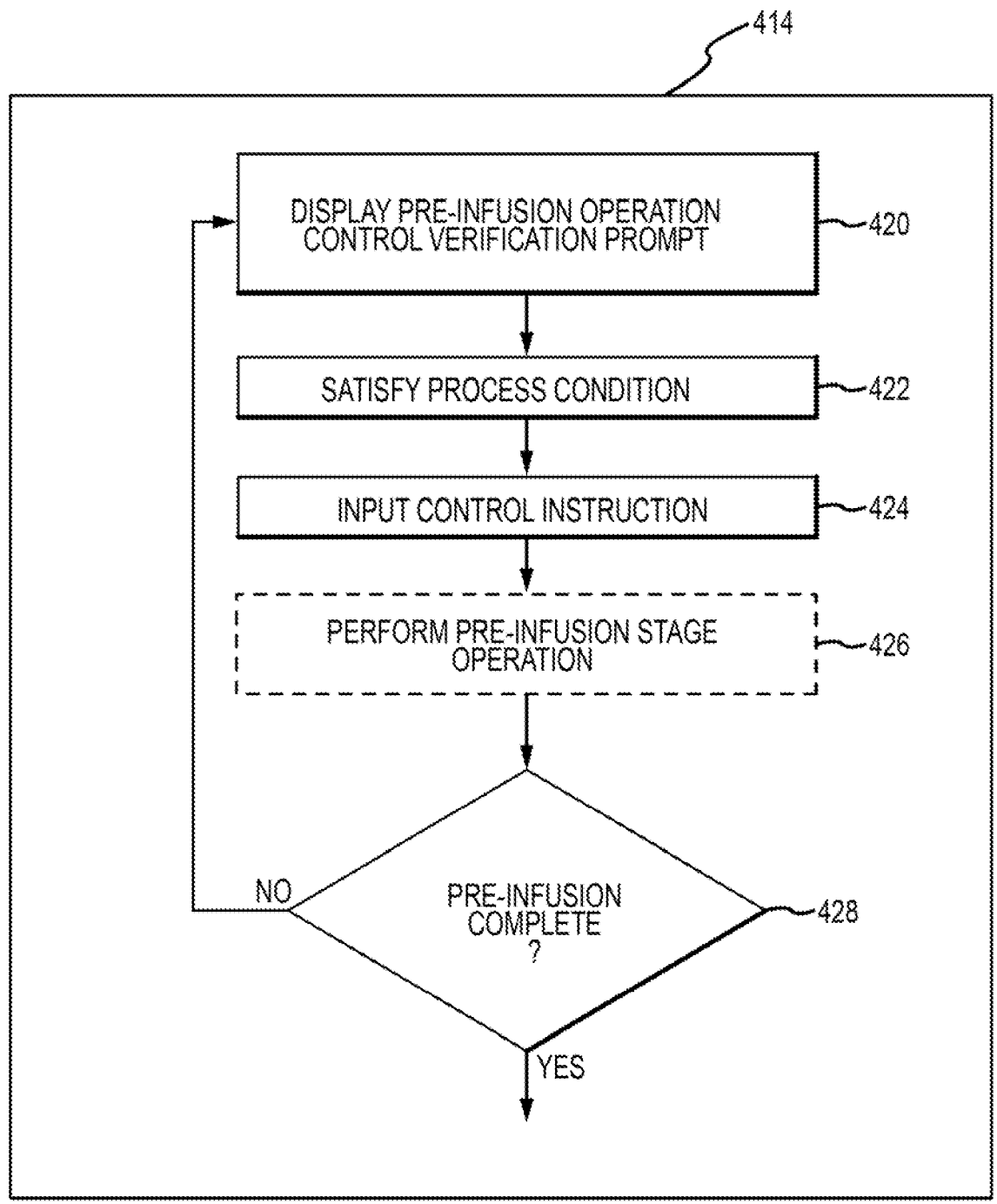
FIG. 12 is a process diagram of example processing during a pre-infusion operation of general processing shown in FIG. 11.

Reference is now made to FIG. 12 illustrating one example of processing that may be performed using the cold brew coffee brewing system during the pre-infusion operation 414 in the general processing shown in FIG. 11. In the example illustrated in FIG. 12, the pre-infusion operation 414 includes a step 420 to display a pre-infusion operation control verification prompt. In a next step 422, a process condition corresponding to the control verification prompt of step 420 is satisfied, for example by action performed by an operator (user) of the cold brew coffee brewing system to prepare cold brew coffee. In a next step 424, the operator then inputs a control instruction indicating satisfaction of the process condition for the pre-infusion operation 414 to proceed with a next optional step 426 to perform a pre-infusion stage operation, for which satisfaction of the process condition in the step 422 was important. In a next step 428, if pre-infusion has been completed, then the pre-infusion operation is complete and processing may advance to the extraction operation 418 in the general processing of FIG. 11. If pre-infusion is not complete, then processing returns to repeat the process by displaying a different pre-infusion operation control verification prompt in step 420 and the processing is continued until all process conditions have been satisfied and all pre-infusion stage operations completed. As may be appreciated, the steps 420, 426 and 428 may typically be performed by the cold brew coffee brewing system at the direction of the controller unit, and the steps 422 and 424 may typically be performed by the operator. For the step 420, the control verification prompt may be displayed, for example, on a graphic display of the user interface of the cold brew coffee brewing system. As shown in the processing illustration of FIG. 12, the step 426 is illustrated with dashed lines indicating that performance of that step is optional in the processing example, in that not every input of a control instruction will be followed by performance of a pre-infusion stage operation. Rather, the controller unit may require confirmation of satisfaction of a certain process condition required for the coffee product preparation 406 before proceeding further with processing.

Figure 13:
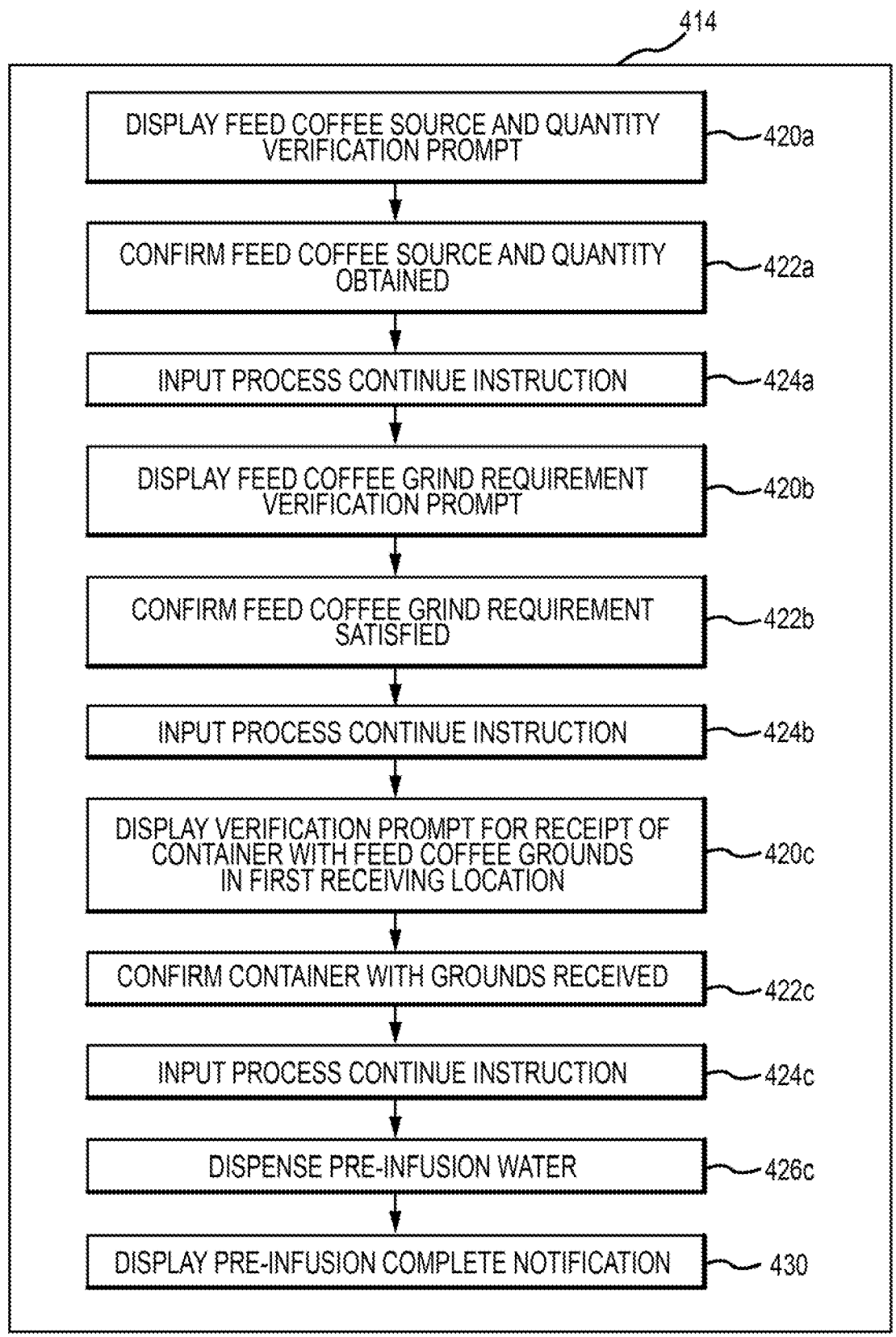
FIG. 13 is a process diagram of example processing during a pre-infusion operation of general processing shown in FIG. 11.

Reference is now made to FIG. 13, together with FIGS. 11 and 12, to illustrate one specific example of processing in the pre-infusion operation 414 within the context of the example processing illustrated in FIG. 12. In the example pre-infusion operation 414 illustrated in FIG. 13, processing includes a step 420a to display a control verification prompt for feed coffee source and quantity. In a next step 422a, and the operator checks on the availability of the feed coffee for the identified feed coffee source and in the feed coffee quantity within the product preparation parameters for the selected cold brew coffee product 404, and preferably at that time the operator also obtains the identified feed coffee quantity for that identified feed coffee source. After the operator confirms the availability of the identified feed coffee source and identified feed coffee quantity, then in step 424a the operator inputs a control instruction to continue with processing for preparation of the cold brew coffee product 404. After the controller unit receives the control instruction to continue with the process in step 424a, then the controller unit directs in step 420b display of a control verification prompt for a feed coffee grind requirement. The operator then in step 422b confirms that the feed quantity of the feed coffee source has been ground in conformance with the grind requirement of the product preparation parameters for the selected cold brew coffee product 404. The step 422b may include the operator identifying that a pre-ground quantity of the desired feed coffee is available that satisfies the grind requirement, or the operator may at that time grind coffee beans according to the grind requirement. After the operator performs the step 422b, then in step 424b, the operator inputs a control instruction for processing to continue. After receiving the control instruction in step 424b, then the controller unit directs in the step 420c display of a control verification prompt for receipt of a container (e.g., pre-infusion container or extraction vessel) containing the feed coffee grounds in the appropriate receiving location for pre-infusion (e.g., the first receiving location or the second receiving location, depending on the configuration) of the cold brew coffee brewing system. The operator then in step 422c confirms that the container containing the feed coffee grounds is received in the appropriate receiving location for pre-infusion in an orientation to receive pre-infusion water, and after doing that the operator in step 424d inputs a control instruction for processing to continue. In performance of the step 422c, the operator may transfer the coffee grounds, of the proper feed coffee source and in the proper feed coffee quantity and satisfying the grind requirement of the product preparation parameters, to the pre-infusion container or extraction vessel and then dispose that container or vessel containing the coffee grounds in the appropriate receiving location for pre-infusion (e.g., first receiving location or second receiving location, depending on the configuration) of the cold brew coffee brewing system so that the pre-infusion container or extraction vessel is received in the appropriate receiving location for pre-infusion in the appropriate orientation (e.g., pre-infusion orientation for a pre-infusion container, or pre-brewing orientation or brewing orientation for an extraction vessel depending on pre-infusion water dispensation profile) to receive pre-infusion water dispensed to the receiving location for pre-infusion (e.g., the first-receiving location or the second receiving location, depending on the configuration) from a water dispensing system of the cold brew coffee brewing system. In a next step 426c, the controller unit directs performance of a pre-infusion stage operation of dispensation of a total quantity of pre-infusion water into the appropriate container (e.g., pre-infusion container or extraction vessel) at the receiving location for pre-infusion from the water dispensing system, after which pre-infusion processing in the cold brew coffee brewing system is complete, and in a next step 430 the controller unit directs display of a notification that pre-infusion is complete. Processing may then continue to the extraction operation 418 of the general processing of FIG. 11.

Figure 14:
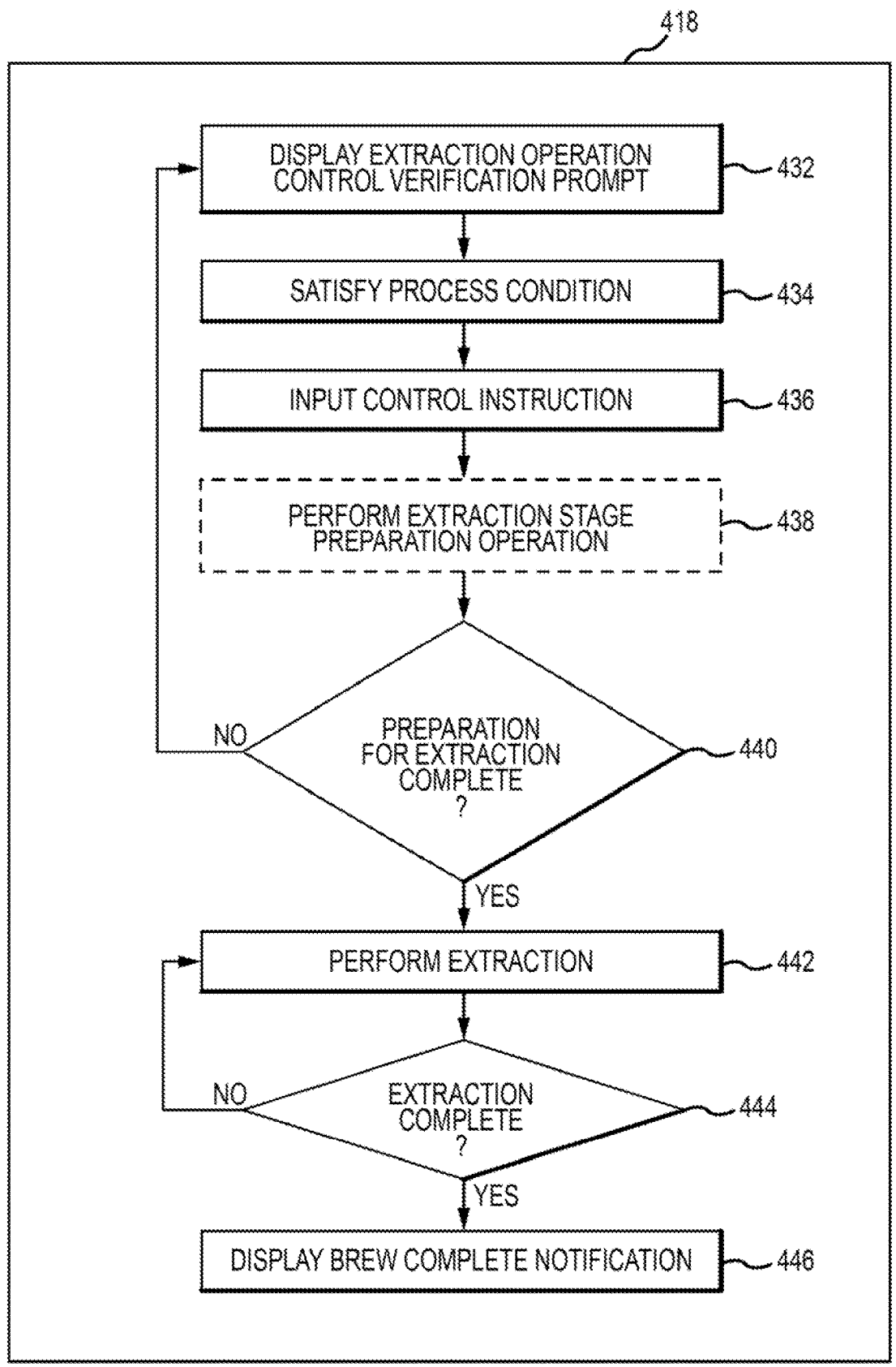
FIG. 14 is a process diagram of example processing during an extraction operation of general processing shown in FIG. 11.

Reference is now made to FIG. 14, which illustrates one example of processing that may be performed using the cold brew coffee brewing system during the extraction operation 418 of the general processing illustrated in FIG. 11. In the example illustrated in FIG. 14, the extraction operation 418 includes a step 432 to display an extraction operation control verification prompt. In a next step 434 a process condition corresponding to the control verification prompt of step 432 is satisfied, for example by action performed by an operator of the cold brew coffee brewing system. In a next step 436, the operator then inputs a control instruction indicating satisfaction of the process condition for the extraction operation 418 to proceed with a next optional step 438 to perform an extraction stage operation at the direction of the controller unit, for which satisfaction of the process condition in step 434 was important. In a next step 440 if preparation for performing the extraction with brew water has been completed, then the pre-infusion operation advances to a next step 442 to perform the extraction. If preparation for performing the extraction is not complete at step 440, then processing returns to repeat the previous processing sequence by displaying a different extraction operation control verification prompt in step 432 and the processing is continued until all process conditions have been satisfied and all extraction stage operations completed in preparation for performing the extraction. In the step 442 to perform the extraction, brew water is introduced into the extraction vessel containing the coffee grounds and the coffee grounds are extracted with the brew water to prepare the cold brew coffee in a non-immersion, single-pass extraction. In step 444, the extraction is monitored and continued until it is determined that the extraction is complete, in which case processing proceeds to a step 446 in which the extraction is stopped. As may be appreciated, the steps 432, 438, 440, 442, 444 and 446 may typically be performed by the cold brew coffee brewing system at the direction of the controller unit, and steps 434 and 436 may typically be performed by the operator. For step 432, the control verification prompt may be displayed, for example, on a graphic display of the user interface of the cold brew coffee brewing system. As shown in the processing illustration of FIG. 14, the step 438 is illustrated with dashed lines indicating the performance of that step is optional, and that not every input of a control instruction will be followed by performance of an extraction stage operation. Rather, the controller unit may require confirmation of satisfaction of a certain process condition required for the coffee product preparation 406 before proceeding further with processing.

Figure 15:
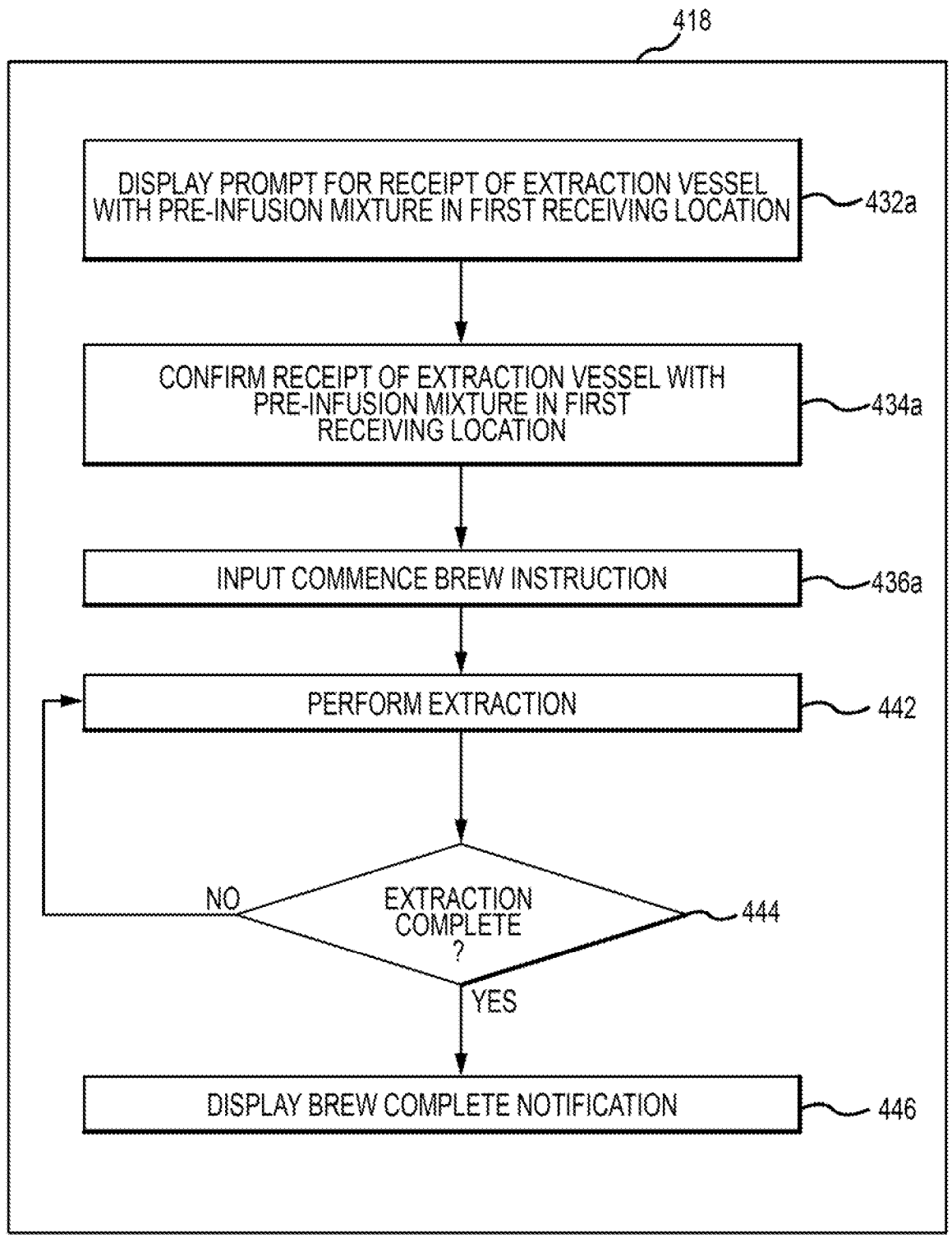
FIG. 15 is a process diagram of example processing during an extraction operation of general processing shown in FIG. 11.

Reference is now made to FIG. 15, together with FIGS. 11 and 14, to illustrate one specific example of processing in the extraction operation 418 within the context of the example processing illustrated in FIG. 14. In the example extraction operation 418 illustrated in FIG. 15, processing includes a step 432a to display a control verification prompt for receipt of the extraction vessel with the pre-infusion mixture in the first receiving location of the cold brew coffee brewing system. In the next step 434a, the operator confirms that the pre-infusion mixture has been prepared, transferred from the pre-infusion container to the extraction vessel, if necessary, and that the extraction vessel containing the pre-infusion mixture has been disposed in the first receiving location in the brewing orientation. Completion of step 434a may include the operator mixing pre-infusion water and coffee grounds in the pre-infusion container and then after the coffee grounds and pre-infusion water have been preferably mixed to a homogeneously wetted composition, transferring the pre-infusion mixture from the pre-infusion container to the extraction vessel, and then placing the extraction vessel with the pre-infusion mixture in the first receiving location of the cold brew coffee brewing system in the brewing orientation, positioned to receive brew water from the water dispensing system for single-pass, non-immersion extraction of the coffee grounds with the brew water. Alternatively, when using the first variation of preparing a pre-infusion mixture in the extraction vessel, completion of step 434a may include the operator mixing pre-infusion water and coffee grounds in the extraction vessel (preferably with a bottom end of the extraction vessel closed to fluid flow out of the extraction vessel, then after the coffee grounds and pre-infusion water have been preferably mixed to a homogeneously wetted composition, disposing the extraction vessel with the pre-infusion mixture in the first receiving location of the cold brew coffee brewing system in the brewing orientation, positioned to receive brew water from the water dispensing system for single-pass, non-immersion extraction of the coffee grounds with the brew water. In a further alternative, when using the second variation of preparing the pre-infusion mixture in the extraction vessel, the extraction vessel may already be received in first receiving location in the brewing orientation with the pre-infusion mixture at the end of the pre-infusion operation 414, and an operator may need only input the control instruction in step 436a to commence dispensation of the brew water for the extraction operation 418. After completion of step 434a in the processing of FIG. 15, then in step 436a, the operator inputs a control instruction indicating that the condition corresponding to the control verification prompt of step 432a has been satisfied. In the processing illustrated in FIG. 15, the control instruction is shown as an instruction to commence brewing.

With continued reference to FIG. 15, after the operator enters the process control instruction in step 436a, then step 442 is performed by the cold brew coffee brewing system at the direction of the controller unit. In step 442, brew water is delivered from the water dispensing system into the extraction vessel at the first receiving location and cold brew coffee exiting the extraction vessel is collected in a collection container received in the second receiving location of the cold brew coffee brewing system. During the step 442, the brew water is dispensed from the water dispensing system according to the product preparation parameters, including any specified brew water dispensation profile. The dispensation of brew water into the extraction vessel to contact and extract the grounds continues until the controller unit determines in step 444 that the extraction is complete, and the controller unit then directs in step 446 display of a notification that brewing of the cold brew coffee is complete. As may be appreciated, when using the second variation for preparation of the pre-infusion mixture in the extraction vessel, the example processing of FIGS. 14 and 15 may be modified to not require input of a control instruction following preparation of the pre-infusion mixture before proceeding to performance of the extraction, in which the processing of FIG. 14 may be modified to remove steps 432, 434, 436 and 438 and processing of FIG. 15 may likewise be modified to remove steps 432a, 434a and 436a). However, even when using the second variation for preparation of the pre-infusion mixture in the extraction vessel, keeping retaining those steps in the processing of FIGS. 14 and 15 may provide a benefit of having an operator confirm that all is in order and to input a control instruction at step 432 or 432a for the processing to continue to the perform extraction step 442.

Figure 16:
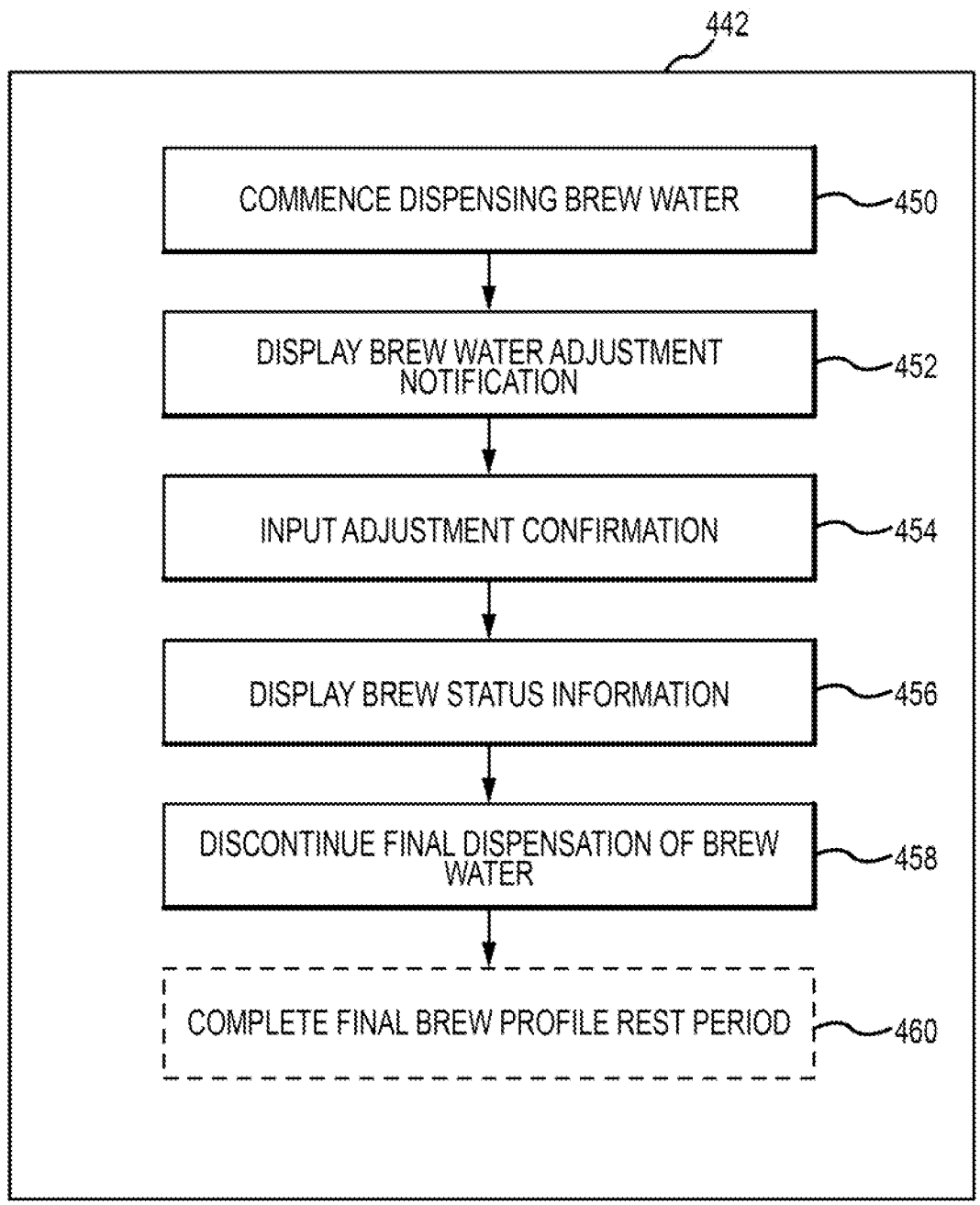
FIG. 16 is a process diagram of example processing within a process step of FIG. 15.

Reference is now made to FIG. 16, together with FIGS. 14 and 15. FIG. 16 illustrates one example of processing that may occur during the perform extraction step 442 in the processing of FIGS. 14 and 15. In the example processing illustrated in FIG. 16, the perform extraction step 442 includes a step 450 to commence dispensing brew water, during which step flow of brew water from the water dispensing system of the cold brew coffee brewing system into the extraction vessel above the coffee grounds begins. After commencement of dispensing the brew water in the step 450, the processing includes display of a brew water adjustment notification to the operator in step 452, for example at the user interface of the cold brew coffee brewing system. The brew water adjustment notification notifies the operator to adjust the brew water flow rate, as needed, to correspond approximately with the brew water flow rate specified for the product preparation parameters for the selected cold brew product 404 (FIG. 11). In one preferred implementation, the target brew water flow rate of the product preparation parameters is displayed as part of the notification, along with a readout of actual measured flow rate of the brew water, for example from data provided by a flow sensor (e.g., flow sensor 318 of the cold brew coffee brewing system 300 of FIG. 10). The operator may then adjust the flow rate of brew water delivered to the extraction vessel, for example through manipulation of the flow adjustment valve 314 through manual operation of the manual adjustment handle 316, illustrated in FIG. 10. It has been found that manual adjustment of brew water flow rate to approximate the target brew water flow rate of the product preparation parameters is a convenient and simple method to effectively control the brew water flow rate and is less prone to stability issues that may develop with automatic adjustment through feedback process control. In one preferred implementation, the brew water adjustment notification displayed in step 452 includes a notification to adjust, as needed, the vertical elevation at which the brew water dispenser is set (e.g., the second water dispenser 306 shown in the example cold brew coffee brewing system 300 of FIG. 10 or the second water dispenser 110 in the example cold brew coffee brewing system 100 of FIGS. 1-9). The displayed notification may preferably include a graphic image illustrating a spray pattern coverage of the top of the coffee grounds in the extraction vessel, without over-spray onto the extraction vessel walls or under-spray that does not fully cover the area of the top surface of the coffee grounds. Preferably, the extraction vessel has a transparent wall (e.g., brew cylinder 142 of the extraction vessel 104 of the coffee brewing system 100 of FIGS. 1-9 may be a glass cylinder). The operator may view the actual spray pattern over the coffee grounds through the transparent wall of the extraction vessel and compare it to the illustration of the desired spray pattern coverage, and may adjust as needed the vertical elevation setting of the fluid dispenser so that the brew water spray pattern covers the coffee grounds to approximately the same extent as in the displayed illustration. This has been found to be a convenient and simple way to effectively control the spray pattern to the coffee grounds based on actual brew water flow conditions and actual top elevation of the bed of coffee grounds in the extraction vessel for any particular extraction operation to prepare a cold brew coffee product.

With continued reference to FIG. 16, together with FIGS. 14 and 15, as shown in the processing of FIG. 16 a next step, after the display step 452, is a step 454 for the operator to input an adjustment confirmation confirming that needed adjustments have been made to the brew water flow rate and brew water dispenser elevation. After receiving the confirmation, the controller unit in step 456 directs display of brew status information to which the operator may occasionally refer to monitor the progress of the extraction operation, to identify any potential problems with the extraction, to make any further needed manual adjustments to the brew water flow rate or elevation adjustments to the brew water dispenser, for example due to changes in feed water pressure to the cold brew coffee brewing system, and to estimate when the extraction operation will be complete, and the cold brew coffee product will be ready. The displayed brew status information may include a progress bar graphically showing a user the progress toward completion of the cold brewing process at any time. In a next step 458, the controller unit discontinues the final dispensation of brew water from the water dispensing system to the extraction vessel. When the brew water dispensation profile includes a pulsed (intermittent) brew water dispensation profile, performance of step 458 may correspond with the end of the final active brew period (the final first brew water profile period). In a next, optional, step 460 the controller unit waits for expiration of a final specified rest period, if any, of the brew water dispensation profile, before the processing in FIG. 15 advances to the display brew complete notification step 446.

With reference again to FIGS. 14 and 15, the determination in step 444 that the extraction is complete may be based on a determination relative to one or more of the product preparation parameters for the selected cold brew coffee product 404 (FIG. 11). In one preferred implementation, the extraction is determined by the controller unit to be complete when the controller unit determines that a product preparation parameter of total product yield has been achieved. This may be determined by the controller based on a determination of when total water applied to the coffee grounds, either as pre-infusion water of as brew water, is sufficient to approximately provide the desired total product yield of the product preparation parameters. Total pre-infusion water and total brew water applied to the grounds may each be determined by the controller unit from flow data from a flow sensor (e.g., flow sensor 318 of FIG. 10) monitoring dispensation of pre-infusion water to the coffee grounds during the pre-infusion operation and dispensation of brew water to the coffee grounds during the extraction operation, until the cumulative volume of pre-infusion water and brew water that has been dispensed is determined by the controller unit to be adequate to provide approximately the total volume yield of the product preparation parameters. This determination may account for anticipated retention of residual water saturation in the coffee grounds even after cold brew coffee has effectively stopped exiting the extraction vessel. In equation form, the calculation for determining total volume yield may be as follows:

$$Y = Vpw + Vbw - Vrw$$

Where Y is the total volume yield of cold brew coffee, Vpw is the total volume of pre-infusion water dispensed to mix with the coffee grounds during the pre-infusion operation, Vbw is the total volume of brew water dispensed into the extraction vessel above the coffee grounds during the extraction operation, and Vrw is the volume of residual water retained with the coffee grounds following the extraction operation. The volumes may be expressed in any convenient volume measure (e.g., liters, volumetric liquid ounces or quarts). Residual water retained by the coffee grounds will vary somewhat, but is frequently around about 1.5 to 2 liters of water per kilogram of coffee grounds, and in one implementation the residual water content may be based on such an assumed value for Vrw in calculating estimated total volume yield for purposes of determining when the extraction is complete in step 444 and discontinuing the perform extraction step 442 shown in FIGS. 14 and 15. It has been found that assuming a value of about 1.7 liters of water per kilogram of coffee grounds for residual water generally provides good results for estimating total yield. As will be appreciated, the actual yield of cold brew coffee collected in the cold brew coffee product may be somewhat different than the total volume yield specified in the product preparation parameters, but should in most cases be reasonably close.

Figure 17:
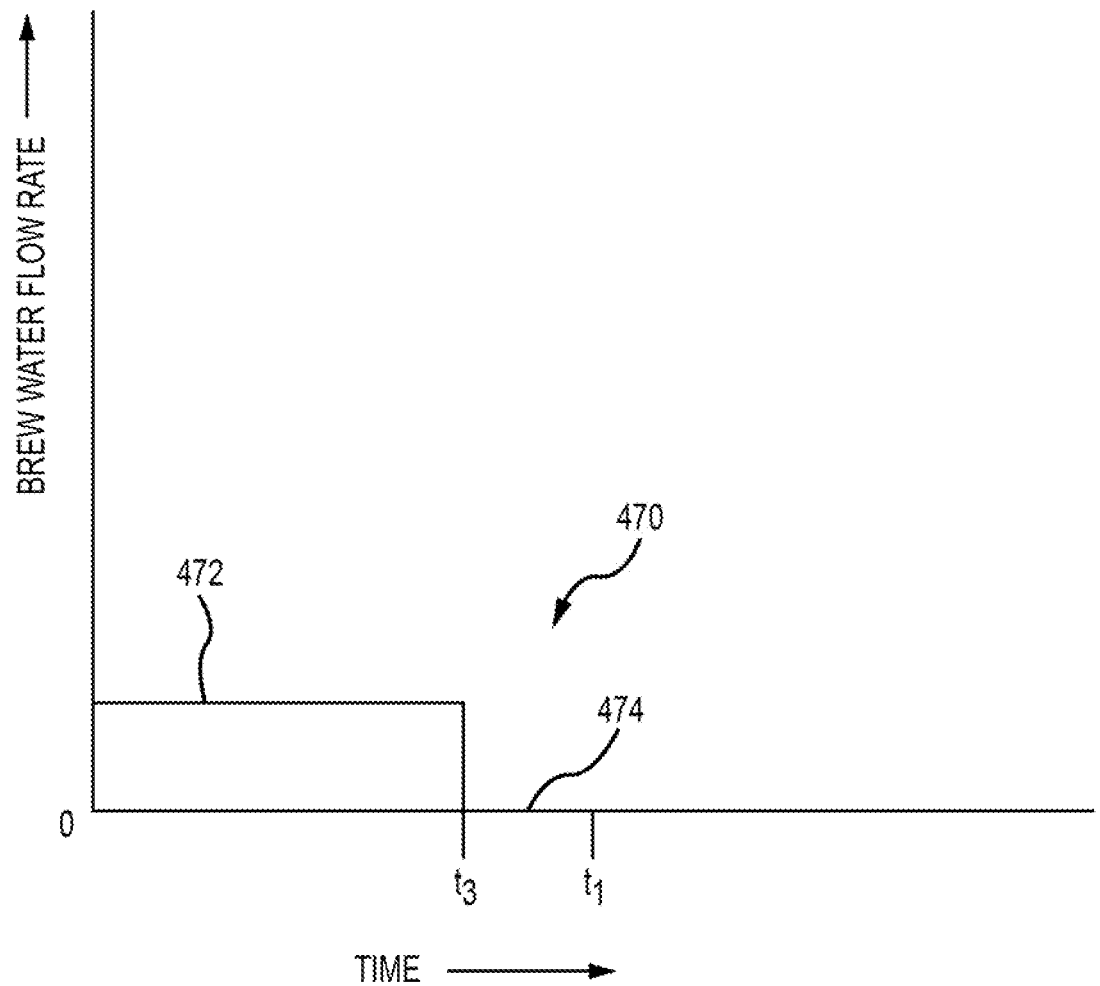
FIG. 17 is a generalized plot illustrating an example brew water dispensation profile.
Figure 18:
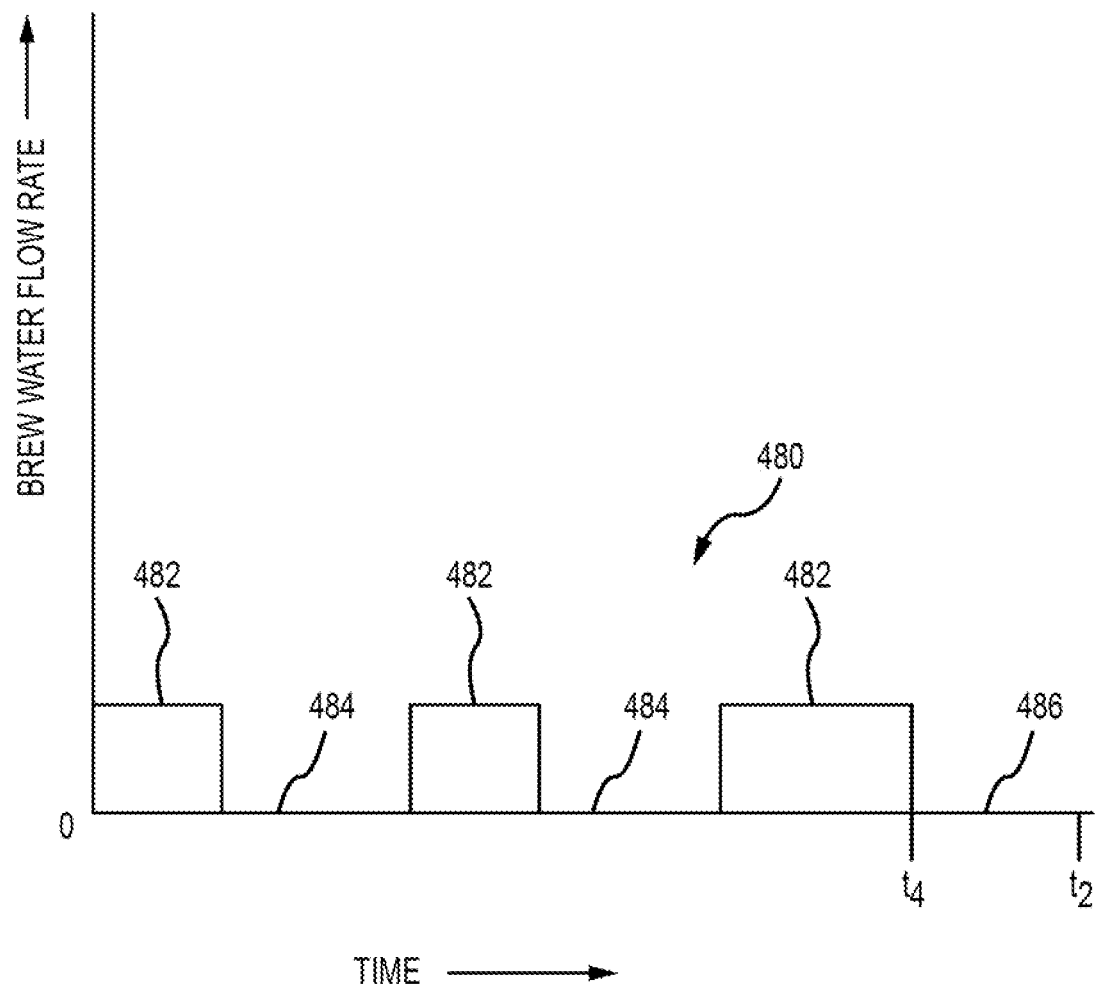
FIG. 18 is a generalized plot illustrating another example brew water dispensation profile.

In the case of a brew water dispensation profile that involves a continuous dispensation of brew water to the extraction vessel, the dispensation of brew water may simply be discontinued at the direction of the controller unit when the total volume yield has been determined by the controller unit to have been achieved. In the case of a brew water dispensation profile that includes alternating active brew periods of brew water dispensation and rest periods with no brew water dispensation, the process of determining when to discontinue dispensation of brew water marking the end of extraction may be more complicated. In some preferred implementations, the number of active brew periods and rest periods, and the duration of each, may be specified as product preparation parameters for the brew water dispensation profile for a selected cold brew coffee product 404 (FIG. 11). Except in an unusual circumstance when achievement of total volume yield is determined by the controller unit to exactly coincide with the end of a specified active brew period (a first brew water profile period), then either the number of active brew periods could be changed (increased or decreased) and/or the duration of a brew water dispensation period could be changed (lengthened or shortened), to accommodate a total volume yield that is not achieved exactly at the end of a specified active brew water dispensation period. In some preferred processing alternatives, the number of active brew water dispensation periods is kept the same as specified in the product preparation parameters, and the final specified active brew period is either lengthened or shortened to end when the controller unit determines that the total volume yield has been achieved. Any final rest period specified in the product preparation parameters following the last specified active brew period would then follow the last actual active brew period, at which point the controller unit could display a notification that the brew is complete, for example in step 446 of the processing shown in FIG. 15. FIG. 17 shows a plot of an example brew water dispensation profile 470 for an extraction that last for a total time $t_1$, and with the total quantity of the brew water being dispensed over a total time period $t_3$ The brew water dispensation profile 470 does not include a pulsed profile, and includes only a single active brew period 472 that extends for the full duration of $t_3$, and which is followed by a terminal rest period 474, following which, in the processing of FIG. 15, the controller unit would direct performance of the step 446 to display a notification that the brew is complete. FIG. 18 shows a plot of another example brew water dispensation profile 480 for an extraction that lasts for a total time $t_2$. The brew water dispensation profile 480 includes three intermittent (pulsed) active brew periods 482 (first brew water profile periods) with two intermediate rest periods 484 (second brew water profile periods). The total quantity of brew water is dispensed during the three active brew periods 482 over a total time period $t_4$. The final dispensation of the brew water is followed by a final rest period 486, providing a final drainage period, after which, in the processing of FIG. 15, the controller unit would direct performance of the step 446 to display a notification that the brew is complete. In the example of FIG. 18, the three active brew periods 482 may have been specified in the product preparation parameters as being of equal duration, and the longer time duration of the last active brew period 482, shown as lengthened relative to the other two in FIG. 18, could be a consequence of the last active brew period 482 being lengthened based on achieving a total volume yield for cold brew coffee as determined by the controller unit. As will be appreciated, when a pre-infusion mixture is prepared in a pre-infusion container or in the extraction vessel using the first variation, then the pre-infusion water dispensation profile may have a similar profile to that shown in FIG. 17, and when the pre-infusion mixture is prepared in the extraction vessel using the second variation, the pre-infusion water dispensation profile may be more similar to the profile illustrated in FIG. 18, with the active and rest periods appropriately set for purposes of effective accomplishment of the desired saturation of the coffee grounds during the pre-infusion operation. As may be appreciated, when the pre-infusion water dispensation profile includes a pulsed water delivery profile, such a pulsed pre-infusion water dispensation profile may have water flow features similar to those illustrated in FIG. 18 for the brew water. Referring again to FIG. 11, the processing of that figure also includes an optional step of a dilution operation 413. Such a dilution operation 413 may or may not be included after the cold brew coffee collection 410. Including the dilution operation 413 permits a user to have a controller unit of the cold brew coffee brewing system calculate and dispense a volume of dilution water from the water dispensing system (e.g., to the first receiving location or the second receiving location) to dilute the collected cold brew coffee of the cold brew coffee product 412 (which may be in the form of a cold brew concentrate) to prepare a diluted cold brew product, for example to prepare a more diluted cold brew coffee product having desired properties for consumption. One more specific example implementation for the dilution operation 413 of the processing of FIG. 11 is illustrated in FIG. 19.

Figure 19:
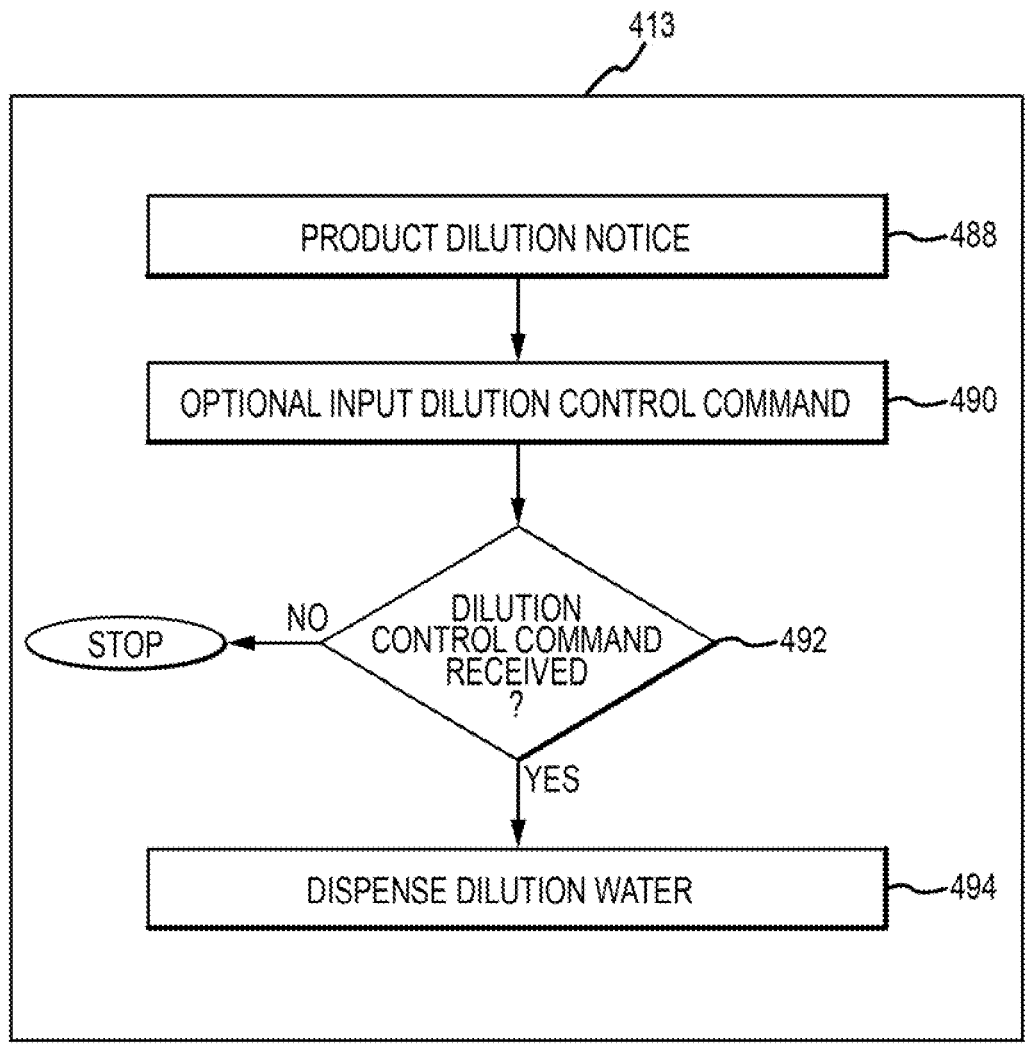
FIG. 19 is a process diagram of example processing during a dilution operation of general processing shown in FIG. 11.

In the processing implementation shown in FIG. 19, the dilution operation includes display, such as at the user interface of the cold brew coffee brewing system, of a product dilution notice 468, to notify a user that an optional dispensation of dilution water to prepare a diluted cold brew product may be performed at the direction of the user through provision of an optional dilution control command instructing the controller unit to determine a dilution volume and dispense that volume of dilution water from the water dispensing system for use to prepare the diluted cold brew product. The dilution control command may simply be an instruction to the controller unit to proceed to dispense the dilution water, for example based on the original product preparation parameters associated with the cold brew coffee product 412 (e.g., based on dilution from a target total dissolved solids (TDS) content in the cold brew coffee product and a target reduced TDS content desired for a diluted cold brew product). Alternatively, the dilution control command may specify product criteria for use by the controller unit to determine a volume of dilution water to dispense based on the specified product criteria. For example, the specified product criteria may include an actual measured TDS content of the cold brew coffee product 412, which may be combined with a previously inputted target TDS content for the diluted cold brew product (e.g., in the original product preparation parameters) and/or the specified product criteria may include a newly specified TDS content for the diluted cold brew product inputted as part of the dilution control command. At step 492 a determination is made as to whether a dilution control command has been received by the controller unit, and if the determination is yes the processing proceeds to dispense the dilution water 494 with a volume of dispensed dilution water being as determined by the controller unit. Dispensation of the dilution water may be to a receiving location (e.g., the first receiving location or the second receiving location), and the dispensation of the dilution water should be designed not to contact the coffee grounds (not to extract additional cold brew coffee), but simply to provide clean water in a correct volume for the desired dilution. The dilution water may be dispensed into a collection container or other container (e.g., cold brew product keg) that contains the cold brew coffee product 412, or may be in to an empty container (e.g., empty pre-infusion container or empty collection container), and the dilution water may then be transferred to another container containing the cold brew coffee product 412 to prepare the diluted coffee product.

In an alternative implementation for the dilution operation 413 of FIG. 11, a brew control operation may be pre-set with dilution information based on target properties (e.g., target TDS content) for the cold brew coffee product resulting from the extraction and for the desired diluted cold brew product, and the process controller may automatically instruct the dispensation of the dilution water, for example into a collection container in which the cold brew coffee product 412 was initially collected. As will be appreciated, in such an automatic dilution situation the collection container must be appropriately sized to contain both the volume of the cold brew coffee product and the added dilution water.

Example Implementation Combinations

In various aspects, the cold brew coffee brewing system of the invention includes as a base configuration an over/under fluid flow design for single-pass, non-immersion cold brew coffee brewing with a single-pass, non-immersion extraction vessel disposed above a collection vessel in which the cold brew coffee product collects. Such a base configuration for the cold brew coffee brewing system may have a combination of features as provided in numbered paragraph 1 that follows:

1. A cold brew coffee brewing system to prepare cold brew coffee by extraction of coffee grounds with brew water in a single-pass, non-immersion extraction operation following a pre-infusion operation to pre-infuse the coffee grounds with pre-infusion water, the system comprising:

a flow-through extraction vessel to retain coffee grounds for single-pass, non-immersion extraction of the coffee grounds with water to prepare cold brew coffee, the extraction vessel comprising a fluid-permeable support to support coffee grounds in an extraction bed volume in the extraction vessel during the extraction operation;

a tower unit, comprising a plurality of receiving locations to receive fluid containers or process vessels, the plurality of receiving locations comprising:

a first receiving location configured to selectively receive the extraction vessel in a brewing orientation in an elevated position for the extraction operation, wherein in the brewing orientation the extraction vessel is fluidly open at a fluid exit end adjacent a bottom of the extraction vessel for flow of cold brew coffee out of the fluid exit end for single-pass, non-immersion extraction of coffee grounds to prepare the cold brew coffee; and a second receiving location, at a lower elevation than the first receiving location, configured to selectively receive a collection container in a collection orientation to receive and collect the cold brew coffee from the extraction vessel during the extraction operation for preparation of a cold brew coffee product comprising the collected cold brew coffee in the collection container; and a water dispensing system configured to dispense the brew water into the extraction vessel above the coffee grounds in the extraction vessel in the brewing orientation at the first receiving location during the extraction operation; and optionally, the cold brew coffee brewing system comprises the collection container.

Some preferred example feature combinations and embodiments for the cold brew coffee brewing system of this disclosure including such a base configuration will now be described with reference to the following numbered paragraphs:

2. The cold brew coffee brewing system of paragraph 1, wherein the water dispensing system comprises a first water dispenser to dispense the pre-infusion water to a said receiving location for pre-infusion, optionally selected from the group consisting of the first receiving location and the second receiving location, and a second water dispenser to separately dispense the brew water to the first receiving location.

3. The cold brew coffee brewing system of paragraph 2, wherein delivery of the pre-infusion water to the first water dispenser is controlled by a first flow control valve and the delivery of the brew water to the second water dispenser is controlled by a second control valve to control flow of the pre-infusion water to the first water dispenser and the second water dispenser is in fluid communication with a second control valve to control flow of the brew water to the second water dispenser.

4. The cold brew coffee brewing system of either one of paragraph 2 or paragraph 3, wherein the second water dispenser is height adjustable to adjust a vertical elevation from which the second water dispenser dispenses the brew water to the first location.

5. The cold brew coffee brewing system of any one of paragraphs 2-4, wherein the first water dispenser is fixed in position to dispense the pre-infusion water at a fixed elevation to the said receiving location for pre-infusion.

6. The cold brew coffee brewing system of any one of paragraphs 1-5, wherein a said receiving location for pre-infusion is configured to receive a pre-infusion container for pre-infusion and wherein the said receiving location for pre-infusion comprises:

the first receiving location configured to selectively receive, when the extraction vessel is not received in the first receiving location, the pre-infusion container in a pre-infusion orientation to receive the pre-infusion water at the first receiving location from the water dispensing system for preparation and containment in the pre-infusion container of a pre-infusion mixture of the coffee grounds and the pre-infusion water; or the second receiving location configured to selectively receive a pre-infusion container in a pre-infusion orientation to receive the pre-infusion water at the second receiving location from the water dispensing system for preparation and containment in the pre-infusion container of a pre-infusion mixture of the coffee grounds and the pre-infusion water; and optionally, the cold brew coffee brewing system comprises the pre-infusion container.

7. The cold brew coffee brewing system of paragraph 6, comprising a mixer selectively insertable into the pre-infusion container to mix the coffee grounds and the pre-infusion water in the pre-infusion container to prepare the pre-infusion mixture in the pre-infusion container.

8. The cold brew coffee brewing system of any one of paragraphs 1-7, comprising:

a flow sensor to monitor a flow rate of the brew water to the first receiving location; and a graphic display to display to a user monitored flow rate data from the flow sensor for the flow rate of the brew water to the first receiving location during the brewing (extraction) operation; and optionally, the flow sensor is operable to monitor a flow rate of the pre-infusion water to a said receiving location, optionally selected from the group consisting of the first receiving location and the second receiving location, during the pre-infusion operation.

9. The cold brew coffee brewing system of any one of paragraphs 1-8, comprising a manual adjustment interface operably connected to a flow adjustment valve, wherein the manual adjustment interface is manually manipulable by a user to manually adjust a flow rate of the brew water to the first receiving location during the brewing (extraction) operation.

10. The cold brew coffee brewing system of any one of paragraphs 1-9, comprising a brew control system to control operation of the water dispensing system during a cold brewing process cycle for preparation of the cold brew coffee product, wherein the brew control system comprises:

a controller unit having stored product preparation parameters for the cold brew coffee product and configured to execute a brew control operation for performance of the cold brewing process cycle to prepare a cold brew coffee product corresponding to the product preparation parameters for the cold brew coffee product; and a user interface in communication with the controller unit, the user interface configured to display information to a user and to receive input of instructions from the user for preparation of the cold brew coffee product.

11. The cold brew coffee brewing system of paragraph 10, wherein the brew control operation comprises directing the user interface to display at least one control verification prompt prompting the user to input a corresponding control instruction indicating satisfaction of a corresponding process condition to have the controller unit continue with the cold brewing process cycle, and optionally to direct performance of a corresponding next stage of the cold brewing process cycle.

12. The cold brew coffee brewing system of paragraph 11, wherein a said control verification prompt is for satisfaction of a said process condition comprising disposition of the coffee grounds in a said receiving location, optionally selected from the group consisting of the first receiving location and the second receiving location, to receive water from the water dispensing system for the cold brewing process cycle.

13. The cold brew coffee brewing system of paragraph 12, wherein for the said control verification prompt, a corresponding said next stage of the cold brewing process cycle directed by the controller unit includes commencement of dispensing pre-infusion water from the water dispensing system to a said receiving location for pre-infusion, optionally selected from the group consisting of the first receiving location and the second receiving location, to mix with the coffee grounds to form a pre-infusion mixture.

14. The cold brew coffee brewing system of paragraph 13, wherein the said process condition comprises disposition of the coffee grounds in the extraction vessel at the first receiving location ready to receive the pre-infusion water from the water dispensing system at the first receiving location.

15. The cold brew coffee brewing system of paragraph 14, wherein the said process condition comprises disposition of a pre-infusion mixture including the coffee grounds in the extraction vessel received in a pre-brewing orientation at the first receiving location.

16. The cold brew coffee brewing system of paragraph 15, wherein in the pre-brewing orientation, a bottom end of the extraction vessel is closed to fluid flow out of the bottom end of the extraction vessel.

17. The cold brew coffee brewing system of any one of paragraphs 13-16, wherein the product preparation parameters comprise a total quantity of the pre-infusion water to combine with the coffee grounds during the pre-infusion operation, and the brew control operation comprises;

after the commencement of dispensing the pre-infusion water from the water dispensing system, at the direction of the controller unit discontinuing dispensing the pre-infusion water from the water dispensing system when the controller unit identifies that the total quantity of the pre-infusion water has been dispensed; and after the discontinuing dispensing the pre-infusion water, commencing dispensing the brew water for the extraction operation, optionally after a saturation rest period following the discontinuing dispensing the pre-infusion water, and optionally the commencing dispensing the brew water for the extraction operation is automatically directed by controller unit executing the brew control operation without further input of instructions from the user to proceed to performance of the extraction operation.

18. The cold brew coffee brewing system of paragraph 12, wherein for the said control verification prompt, a corresponding said next stage of the cold brewing process cycle directed by the controller unit includes commencement of dispensing brew water from the water dispensing system to the first receiving location.

19. The cold brew coffee brewing system of either one of paragraph 11 or paragraph 12, wherein a said control verification prompt is for satisfaction of a said process condition comprising receipt of the extraction vessel in the first receiving location in the extraction orientation containing in the extraction bed a pre-infusion mixture including the coffee grounds and the pre-infusion water, in conformance with the product preparation parameters for the cold brew coffee product, and performance of a corresponding said next stage of the cold brewing process cycle directed by the controller unit includes commencement of dispensing the brew water from the water dispensing system to the first receiving location for the extraction operation.

20. The cold brew coffee brewing system of any one of paragraphs 11-13, wherein a said control verification prompt is for satisfaction of a corresponding said process condition comprising receipt of the pre-infusion container in a said receiving location for pre-infusion, optionally selected from the group consisting of the first receiving location and the second receiving location, with the pre-infusion container in the pre-infusion orientation containing the coffee grounds for the pre-infusion mixture in conformance with the product preparation parameters for the cold brew coffee product, and performance of a corresponding said next stage of the cold brewing process cycle directed by the controller unit includes commencement of dispensing the pre-infusion water from the water dispensing system to the said receiving location for pre-infusion during the pre-infusion operation.

21. The cold brew coffee brewing system of any one of paragraphs 13-20, wherein the product preparation parameters comprise a feed coffee source; and the brew control operation comprises displaying identification of the feed coffee source at the user interface prior to permitting acceptance by the controller unit of the corresponding said control instruction to direct commencement of the dispensing.

22. The cold brew coffee brewing system of any one of paragraphs 13-21, wherein the product preparation parameters comprise a feed coffee grind requirement; and the brew control operation comprises displaying identification of the feed coffee grind requirement at the user interface prior to permitting acceptance by the controller unit of the corresponding said control instruction to direct commencement of the dispensing.

23. The cold brew coffee brewing system of any one of paragraphs 13-22, wherein the product preparation parameters comprise a feed coffee quantity; and the brew control operation comprises displaying an indication of the feed coffee quantity at the user interface prior to permitting acceptance by the controller unit of the corresponding said control instruction to direct commencement of the dispensing.

24. The cold brew coffee brewing system of paragraph 11, wherein:

a first said control verification prompt is for satisfaction of a corresponding first said process condition comprising receipt of the coffee grounds in a said receiving location for pre-infusion, optionally selected from the group consisting of the first receiving location and the second receiving location, to pre-infuse the coffee grounds with the pre-infusion water in conformance with the product preparation parameters for the cold brew coffee product, and performance of a corresponding first said next stage of the cold brewing process cycle directed by the controller unit includes commencement of dispensing the pre-infusion water from the water dispensing system to the said receiving location for pre-infusion;

a second said control verification prompt, display of which is after the first said control verification prompt, is for satisfaction of a second said process condition comprising receipt of the extraction vessel in the first receiving location in the extraction orientation containing in the extraction bed a pre-infusion mixture including the coffee grounds and the pre-infusion water in conformance with the product preparation parameters for the cold brew coffee product, and performance of a corresponding second said next stage of the cold brewing process cycle directed by the controller unit includes commencement of dispensing the brew water from the water dispensing system to the first receiving location for the extraction operation.

25. The cold brew coffee brewing system of paragraph 24, comprising a pre-infusion container for preparation and containment of the pre-infusion mixture, and wherein:

the pre-infusion container is configured to contain the coffee grounds for preparation of the pre-infusion mixture and to be selectively received in a said receiving location for pre-infusion, optionally selected from the group consisting of the first receiving location or the second receiving location, in a pre-infusion orientation to receive the pre-infusion water at the said receiving location for pre-infusion from the water dispensing system for preparation of the pre-infusion mixture in the pre-infusion container; and the first said process condition comprises receipt of the pre-infusion container in the said receiving location for pre-infusion in the pre-infusion orientation containing the coffee grounds for the pre-infusion mixture.

26. The cold brew coffee brewing system of paragraph 24, wherein the first said process condition comprises receipt of the extraction vessel containing the coffee grounds in the first receiving location, and optionally with the extraction vessel being in a pre-brewing orientation in which a bottom end of the extraction vessel is closed to fluid flow out of the bottom end of the extraction vessel during the pre-infusion operation, 27. The cold brew coffee brewing system of any one of paragraphs 24-26, wherein the product preparation parameters comprise a feed coffee source; and the brew control operation comprises displaying an indication of the feed coffee source at the user interface prior to permitting acceptance by the controller unit of the corresponding first said control instruction to direct commencement of the dispensing the pre-infusion water from the water dispensing system.

28. The cold brew coffee brewing system of any one of paragraphs 24-27, wherein the product preparation parameters comprise a feed coffee grind requirement; and the brew control operation comprises displaying an indication of the feed coffee grind requirement at the user interface prior to permitting acceptance by the controller unit of the corresponding first said control instruction to direct commencement of the dispensing the pre-infusion water from the water dispensing system.

29. The cold brew coffee brewing system of any one of paragraphs 24-28, wherein the product preparation parameters comprise a feed coffee quantity; and the brew control operation comprises displaying the feed coffee quantity at the user interface prior to permitting acceptance by the controller unit of the corresponding first said control instruction to direct commencement of dispensing the pre-infusion water from the water dispensing system.

30. The cold brew coffee brewing system of any one of paragraphs 24-29, wherein the product preparation parameters comprise a total quantity of the pre-infusion water to combine with the coffee grounds to prepare the pre-infusion mixture, and the brew control operation comprises;

after the commencement of dispensing the pre-infusion water from the dispensing system, at the direction of the controller unit discontinuing dispensing the pre-infusion water from the dispensing system when the controller identifies that the total quantity of the pre-infusion water has been dispensed; and after the discontinuing dispensing the pre-infusion water, displaying the second said control verification prompt at the display awaiting input from the user of the second said control instruction indicating satisfaction of the second said process condition to have the controller unit direct performance of the second said next stage of the cold brewing process cycle.

31. The cold brew coffee brewing system of any one of paragraphs 10-30, wherein the brew control operation comprises dispensing a total quantity of the brew water to the first receiving location during the extraction operation at a brew water dispensation profile.

32. The cold brew coffee brewing system of paragraph 31, wherein the brew control operation comprises dispensing the total quantity of the brew water to the first receiving location over a period of time in a range having a lower limit selected from the group consisting of 30 minutes, 40 minutes, 50 minutes and 60 minutes and an upper limit selected from the group consisting of 240 minutes, 180 minutes, 150 minutes and 120 minutes, and with one preferred range being from 50 minutes to 150 minutes.

33. The cold brew coffee brewing system of either one of paragraph 31 or paragraph 33, wherein the total quantity of the brew water is in a range having a lower limit selected from the group consisting of 1.5 liters, 2 liters, 3 liters and 4 liters and an upper limit selected from the group consisting of 14 liters, 12 liters, 10 liters and 8 liters, and with one preferred range being from 3 liters to 10 liters.

34. The cold brew coffee brewing system of any one of paragraphs 31-33, wherein:

the brew water dispensation profile comprises first brew water profile periods of brew water dispensation (active brew periods) with a second brew water profile period (rest period) between occurrences of the first brew water profile periods; and the second brew water profile period comprises no brew water dispensation or brew water dispensation at a reduced dispensation rate relative to the first brew water profile periods, preferably brew water dispensation at a dispensation rate no larger than 25% (and more preferably no larger than 10%) of a brew water dispensation rate of the first brew water profile periods and even more preferably no brew water dispensation; and optionally, the first brew water profile periods may each last for the same duration of time or one or more of the first brew water profile periods may last for a different duration of time than one or more other ones of the first brew water profile periods; and optionally, the second brew water profile periods may each last for the same duration of time or one or more of the second brew water profile period may last for a different duration of time than one or more other ones of the second brew water profile periods;

optionally, a said second brew water profile period may follow a final one of the first brew water profile periods.

35. The cold brew coffee brewing system of paragraph 34, wherein the brew water dispensation profile includes a number of occurrences of the first brew water profile period in a range having a lower limit selected from the group consisting of 2, 3 and 4 occurrences of the first brew water profile periods and having an upper limit selected from the group consisting of 120, 24 and 12 occurrences of the first brew water profile periods, and with one preferred range being from 4 to 12 occurrences of the first brew water profile periods.

36. The cold brew coffee brewing system of either one of paragraph 34 or paragraph 35, wherein at least one said second brew water profile period lasts for a longer duration of time than at least one said first brew water profile period; and optionally, the brew water dispensation profile includes a sequence including a said first brew water profile period lasting a first time duration, followed by a said second brew water profile period lasting a second time duration, and followed by a different said first brew water profile period lasting a third time duration, and optionally the different said first brew water profile period is followed by a different said second brew water profile period lasting a fourth time duration, wherein the second time duration is at least as long as, and preferably longer than, the first time duration and the third time duration is longer than the optional fourth time duration, and optionally wherein the third time duration is longer than the first time duration and further optionally the second time duration is longer than the optional fourth time duration, and which fourth time duration may or may not be a final rest period during the extraction operation. Such optional processing in the implementation combination of this paragraph 36 is advantageous to provide a relatively long rest period in the second time duration to penetrate and extract components of the coffee grounds following a relatively short dispensation of brew water during the first time duration, which relatively long rest period of the second time duration is followed by a relatively long period of dispensation of brew water during the third time duration to remove components extracted from the coffee grounds during the rest period of the second time duration. The relatively short optional rest period of the fourth time duration is advantageous in helping to avoid over-extraction of the coffee grounds. One example of such an optional brew water dispensation profile sequence could include about 5 minutes for the first time duration, about 20 minutes for the second time duration, about 30 minutes for the third time duration and about 5 to 10 minutes for the optional fourth time duration.

37. The cold brew coffee brewing system of any one of paragraphs 34-36, wherein each said first brew water profile period lasts for a time period in a range having a lower limit selected from the group consisting of 2 minutes and 5 minutes and an upper limit selected from the group consisting of 45 minutes and 30 minutes, with one preferred range being from 5 minutes to 30 minutes.

38. The cold brew coffee brewing system of any one of paragraphs 34-37, wherein each said second brew water profile period lasts for a time period in a range having a lower limit selected from the group consisting of 3 minutes, 5 minutes and 10 minutes and an upper limit selected from the group consisting of 30 minutes and 20 minutes, with one preferred range being from 5 minutes to 20 minutes.

39. The cold brew coffee brewing system of any one of paragraphs 34-38, wherein the product preparation parameters include a feed coffee quantity; and a proportion the brew water in the total quantity of the brew water to the feed coffee in the feed coffee quantity is in a range having a lower limit selected from the group consisting of 1 liter of the brew water per kilogram of the feed coffee, 2 liters of the brew water per kilogram of the feed coffee and 3 liters of the brew water per kilogram of the feed coffee and having an upper limit selected from the group consisting of 12 liters of the brew water per kilogram of the feed coffee, 10 liters of the brew water per kilogram of the feed coffee and 8 liters of the brew water per kilogram of the feed coffee, with one preferred range being from 2 liters to 10 liters of the brew water per kilogram of the feed coffee.

40. The cold brew coffee brewing system of any one of paragraphs 34-39, wherein the second brew water profile period comprises no brew water dispensation.

41. The cold brew coffee brewing system of any one of paragraphs 31-40, wherein the brew control operation comprises dispensing a total quantity of the pre-infusion water to a said receiving location for pre-infusion, optionally selected from the group consisting of the first receiving location and the second receiving location, during the pre-infusion operation at a pre-infusion water dispensation profile that is different than the brew water dispensation profile.

42. The cold brew coffee brewing system of paragraph 41, wherein the brew control operation comprises dispensing the total quantity of the pre-infusion water to the said receiving location for pre-infusion over a period of time in a range having a lower limit selected from the group consisting of 1 minute and 2 minutes and an upper limit selected from the group consisting of 10 minutes, 6 minutes and 4 minutes, with one preferred range being from 1 minute to 4 minutes.

43. The cold brew coffee brewing system of either one of paragraph 41 or paragraph 42, wherein an average rate of pre-infusion water dispensation to dispense the total quantity of the pre-infusion water during the pre-infusion operation is at least 4 times, preferably at least 6 times and more preferably at least 8 times as large as an average rate of brew water dispensation to dispense the total quantity of the brew water during the extraction operation, and optionally the average rate of pre-infusion water dispensation during the pre-infusion operation is no larger than 200 times and preferably no larger than 100 times the average rate of brew water dispensation during the extraction operation.

44. The cold brew coffee brewing system of any one of paragraphs 41-43, wherein a maximum rate of pre-infusion water dispensation during the pre-infusion operation is at least 4 times, preferably at least 6 times and more preferably at least 8 times as large as a maximum rate of brew water dispensation during the extraction operation, and optionally the maximum rate of pre-infusion water dispensation during the pre-infusion operation is no greater than 200 times and preferably no larger than 100 times the maximum rate of brew water dispensation during the extraction operation.

45. The cold brew coffee brewing system of paragraph 41, wherein:

the pre-infusion water dispensation profile comprises first pre-infusion water profile periods of active pre-infusion water dispensation (active water addition periods) with a second pre-infusion water profile period (saturation period) between occurrences of the first pre-infusion water profile periods; and the second pre-infusion water profile period comprises no pre-infusion water dispensation or pre-infusion water dispensation at a reduced dispensation rate relative to the first pre-infusion water profile periods, preferably pre-infusion water dispensation at a dispensation rate no larger than 25% (and preferably no larger than 10%) of a pre-infusion water dispensation rate of the first pre-infusion water profile periods and even more preferably no pre-infusion water dispensation; and optionally, the first pre-infusion water profile periods may each last for the same duration of time or one or more of the first pre-infusion water profile periods may last for a different duration of time than one or more other ones of the first pre-infusion water profile periods; and optionally, the second pre-infusion water profile periods may each last for the same duration of time or one or more of the second pre-infusion water profile periods may last for a different duration of time than one or more other ones of the second pre-infusion water profile periods;

optionally, the pre-infusion operation comprises a final saturation rest period, with no water dispensation from the water dispensing system, after a final said first pre-infusion water profile period of the pre-infusion water dispensation profile and prior to commencement of dispensing the brew water to commence the extraction operation, and preferably the final saturation rest period is longer in duration than a duration of any of the second pre-infusion water profile periods.

46. The cold brew coffee brewing system of paragraph 45, wherein the pre-infusion water dispensation profile includes a number of occurrences of the first pre-infusion water profile period in a range having a lower limit selected from the group consisting of 2, 3, 4 and 5 occurrences of the first pre-infusion water profile periods and having an upper limit selected from the group consisting of 12, 10, 8 and 6 occurrences of the first pre-infusion water profile periods, and with one preferred range being from 3 to 8 occurrences of prior said first pre-infusion water profile periods.

47. The cold brew coffee brewing system of either one of paragraph 45 or paragraph 46, wherein:

the pre-infusion operation comprises a final saturation rest period, with no water dispensation from the water dispensing system, after a final said first pre-infusion water profile period of the pre-infusion water dispensation profile and prior to commencement of dispensing the brew water for the extraction operation; and a sum of the times of all of the second pre-infusion water profile periods and the final saturation rest period of the pre-infusion operation is larger than a sum of the times of all of the first pre-infusion water profile periods;

and optionally, the final saturation rest period has a duration that is longer than a duration of any prior said second pre-infusion water profile period and any prior said first pre-infusion water profile period. Such processing in the implementation combination of this paragraph 47 is advantageous to provide a relatively long period of time following each said first pre-infusion water profile period to permit pre-infusion water dispensed during the prior first pre-infusion water profile periods to saturate the coffee grounds, rather than to channel through the coffee grounds, and the optional longer final saturation rest period permits a significant final period for the coffee grounds to become saturated with the pre-infusion water prior to commencement of dispensation of the brew water during the extraction operation, helping to reduce potential for channeling of the brew water through the coffee grounds during the extraction operation. Optionally, the final saturation rest period is preferably at least 1.5 times as long as, more preferably at least 2 times as long as and even more preferably at least 2.5 times as long as any prior said second pre-infusion water profile period.

48. The cold brew coffee brewing system of any one of paragraphs 45-47, wherein each said first pre-infusion water profile period lasts for a time period in a range having a lower limit selected from the group consisting of 1 minute, 2 minutes, 3 minutes and an upper limit selected from the group consisting of 6 minutes, 4 minutes and 3 minutes, provided that the upper limit is selected to be larger than the lower limit, and with one preferred range being from 2 minutes to 3 minutes.

49. The cold brew coffee brewing system of any one of paragraphs 45-48, wherein each said second pre-infusion water profile period lasts for a time period in a range having a lower limit selected from the group consisting of 2 minutes, 3 minutes, 4 minutes and 5 minutes and an upper limit selected from the group consisting of 10 minutes, 7 minutes, 5 minutes and 4 minutes, provided that the upper limit is selected to be larger than the lower limit, and with one preferred range being from 3 minutes to 5 minutes for each said second pre-infusion water profile period.

50. The cold brew coffee brewing system of any one of paragraphs 45-49, wherein each said second pre-infusion water profile period has a duration at least 1 minute longer than an immediately preceding said first pre-infusion water profile period.

51. The cold brew coffee brewing system of any one of paragraphs 45-50, wherein each said second pre-infusion water profile period has a duration at least 50% longer than an immediately preceding said first pre-infusion water profile period.

52. The cold brew coffee brewing system of any one of paragraphs 45-51, wherein the second pre-infusion water profile period comprises no pre-infusion water dispensation.

53. The cold brew coffee brewing system of any one of paragraphs 41 and 45-52, wherein the duration of the pre-infusion water dispensation profile between first commencement of dispensation of the pre-infusion water and completion of dispensation of the total quantity of the pre-infusion water is in a range having a lower limit selected from the group consisting of 4 minutes, 6 minutes and 10 minutes and an upper limit selected from the group consisting of 40 minutes, 30 minutes and 20 minutes, with one preferred range being from 6 minutes to 20 minutes.

54. The cold brew coffee brewing system of any one of paragraphs 41-53, wherein the product preparation parameters include a feed coffee quantity; and a proportion of a total quantity of the pre-infusion water dispensed during the pre-infusion operation to the feed coffee in the feed coffee quantity is in a range having a lower limit selected from the group consisting of 0.5 liter of the pre-infusion water per kilogram of the feed coffee, 0.7 liter of the pre-infusion water per kilogram of the feed coffee, and 0.9 liters of the pre-infusion water per kilogram of the feed coffee and having an upper limit selected from the group consisting of 2 liters of the pre-infusion water per kilogram of the feed coffee, 1.7 liters of the pre-infusion water per kilogram of the feed coffee and 1.5 liters of the pre-infusion water per kilogram of the feed coffee, with one preferred range being from 0.7 liters to 1.5 liters of the pre-infusion water per kilogram of the feed coffee.

55. The cold brew coffee brewing system of any one of paragraphs 41-54, wherein the product preparation parameters include a feed coffee quantity; and a proportion of a total quantity of water dispensed to contact the coffee grounds during the pre-infusion operation and the extraction operation to the feed coffee in the feed coffee quantity is in a range having a lower limit selected from the group consisting of 1.5 liters of water per kilogram of the feed coffee, 2.7 liters of water per kilogram of the feed coffee and 3.9 liters of water per kilogram of the feed coffee feed coffee and having an upper limit selected from the group consisting of 14 liters of the pre-infusion water per kilogram, 10.7 liters of water per kilogram of the feed coffee.

56. The cold brew coffee brewing system of any one of paragraphs 31-55, wherein the brew control operation comprises, after the total quantity of the brew water has been dispensed to the first receiving location, directing the user interface to display an indication that preparation of the cold brew coffee product is complete; and optionally, the product preparation parameters comprise total yield of cold brew coffee and the brew control operation comprises discontinuing dispensation of the brew water when the total quantity of brew water has been dispensed based on a determination by the controller unit that the total yield of cold brew coffee has been achieved, optionally taking into account a volume of residual water retained with the coffee grounds following the extraction operation.

57. The cold brew coffee brewing system of paragraph 56, wherein the directing the user interface to display the indication that preparation of the cold brew coffee product is complete follows dispensation of the total quantity of the brew water by a final drainage wait time (final rest period) in a range having a lower limit selected from the group consisting of zero minutes (no drainage wait time), 1 minute, 2 minutes, 3 minutes and 4 minutes and having an upper limit selected from the group consisting of 30 minutes, 20 minutes, 15 minutes, 12 minutes and 10 minutes, with one preferred range being from 3 minutes to 12 minutes.

58. The cold brew coffee brewing system of any one of paragraphs 10-57, wherein the brew control operation comprises, after the extraction operation, dispensation of dilution water, at the direction of the controller unit, from the water dispensing system following the extraction operation, to not contact the coffee grounds and for dilution of the collected cold brew coffee to prepare a diluted cold brew product, for example at a diluted level desired for consumption.

59. The cold brew coffee brewing system of paragraph 58, wherein the product preparation parameters comprise a first target criteria, optionally a first target total dissolved solids (TDS) content, for the cold brew coffee product and a second target criteria, optionally a second target TDS content that is smaller than a first target TDS content of the cold brew coffee product, for the diluted cold brew product, and the brew control operation comprises automatically dispensing the dilution water from the water dispensing system to a said receiving location other than the first receiving location, and preferably to the second receiving location, following the extraction operation.

60. The cold brew coffee brewing system of any one of paragraphs 10-57, wherein the brew control operation comprises, after the extraction operation, optional dispensation of dilution water, at the direction of the controller unit pursuant to instructions from a user, from the water dispensing system to not contact the coffee grounds and for dilution of the collected cold brew coffee to prepare a diluted cold brew product, for example at a diluted level desired for consumption.

61. The cold brew coffee brewing system of paragraph 60, wherein the brew control operation comprises;
    displaying at the user interface a product dilution notification; and
    dispensation of the dilution water from the water dispensing system in response to receipt by the controller unit of a dilution control command from a user following the product dilution notification.

62. The cold brew coffee brewing system of paragraph 61, wherein the dilution control command comprises specification by the user of product criteria for preparation of the diluted cold brew product, and the brew control operation comprises dispensation from the water dispensing system of a total volume of the dilution water determined by the controller unit based at least in part on the product criteria to dilute the collected cold brew coffee to prepare the diluted cold brew coffee product.

63. The cold brew coffee brewing system of paragraph 62, wherein product criteria comprise a total dissolved solids (TDS) content for the collected cold brew coffee.

64. The cold brew coffee brewing system of either one of paragraph 62 or paragraph 63, wherein the product preparation parameters comprise a first target value for a first product parameter, optionally a first target TDS for the cold brew coffee product, and the product criteria for the dilution control command permits specification by the user of a new value for the first product parameter, which new value for the first product parameter may be the same or different than the first target value. This feature advantageously permits a user to specify an actually measured value for the first product parameter for the collected cold brew coffee and to have the diluted cold brew product prepared to specifications with an appropriate amount of dilution water dispensed at the direction of the controller unit based at least in part on the actual measured properties of the collected cold brew coffee rather than a target value of the product preparation parameters.

65. The cold brew coffee brewing system of any one of paragraphs 62-64, wherein the product preparation parameters comprise a second target value for a second product parameter, optionally a second target TDS content for the diluted cold brew product that is smaller than a target TDS content for the cold brew coffee product, and the product criteria for the dilution control command permits specification by the user of a new value for the second product parameter, which new value for the second product parameter may be the same or different than the second target value. This feature advantageously permits a user to modify a desired property of the diluted cold brew product following the extraction operation based on a reconsideration of the desired diluted cold brew product, which may be influenced by actual measured properties of the collected cold brew coffee.

66. The cold brew coffee brewing system of any one of paragraphs 60-65, wherein the dispensation of the dilution water is to the first receiving location.

67. The cold brew coffee brewing system of any one of paragraphs 60-65, wherein the dispensation of the dilution water is to the second receiving location.

68. The cold brew coffee brewing system of any one of paragraphs 10-67, wherein the controller unit has stored therein a plurality of different sets of product preparation parameters corresponding to a plurality of different said cold brew coffee products for alternative preparation during the brewing process cycle.

69. The cold brew coffee brewing system of paragraph 68, wherein the brew control operation comprises directing the user interface to prompt a user to make a product selection of a said cold brew coffee product from among the plurality of different said cold brew coffee products for preparation during the cold brewing process cycle and waiting for a control instruction making the product selection.

70. The cold brew coffee brewing system of paragraph 69, wherein the brew control operation comprises directing the user interface to display one or more said product preparation parameters for a selected said cold brew coffee product.

71. The cold brew coffee brewing system of any one of paragraphs 10-70, comprising hierarchical access to the controller unit, the hierarchical access comprising at least a first hierarchical level of access permitting operation of the controller unit to execute a said brew control operation to perform a said cold brewing process cycle to prepare the cold brew product according to the product preparation parameters already stored in the controller unit.

72. The cold brew coffee brewing system of paragraph 71, wherein the hierarchical access comprises a second hierarchical level of access, different than the first hierarchical level of access, the second hierarchical level of access permitting storing in the controller unit a product modification wherein the product modification comprises a member selected from the group consisting of modifying product preparation parameters for a said cold brew coffee product already stored in the controller unit, storing a set of product preparation parameters for a new said cold brew coffee product and combinations thereof 73. The cold brew coffee brewing system of paragraph 72, wherein the first hierarchical level of access does not permit storing in the controller unit a said product modification.

74. The cold brew coffee brewing system of any one of paragraphs 71-73, wherein the hierarchical access comprises a third hierarchical level of access, different than the first hierarchical level of access, the third hierarchical level of access permitting an operation selected from the group consisting of:
    (i) storing in the controller unit a product menu change to a menu of coffee products for preparation by the cold brew coffee brewing system;
    (ii) accessing stored system utilization information comprising production quantity of a said cold brew coffee product produced by the cold brew coffee system over a period of time; and (iii) combinations of (i) and (ii)
and, optionally, wherein the hierarchical access comprises the second hierarchical level of access with the second level of hierarchical access being different than the first level of hierarchical access and different than the third hierarchical level of access.

75. The cold brew coffee brewing system of paragraph 74, wherein the product menu change comprises adding a said cold brew coffee product to the menu of coffee products.

76. The cold brew coffee brewing system of either one of paragraph 74 or 75, wherein the product menu change comprises removing a said cold brew coffee product from the menu of coffee products.

77. The cold brew coffee brewing system of any one of paragraphs 74-76, wherein the product menu change comprises changing said product preparation parameters of a said cold brew coffee product.

78. The cold brew coffee brewing system of any one of paragraphs 74-77, wherein the product menu change comprises changing a product name or description in the product menu of a said cold brew coffee product.

79. A cold brew coffee brewing network, comprising:
a plurality of said cold brew coffee brewing systems according to any one of paragraphs 64-68;
a remote central server to receive information from and provide information to each said cold brew coffee brewing system of the network through a remote access communication connection, optionally through a communication module of the cold brew coffee brewing system.

The cold brew coffee brewing system may be used to prepare a cold brew coffee product, and in the performance of methods for making a cold brew coffee product. Some exemplary methods are presented in the numbered paragraphs that follow.

80. A method for making a cold brew coffee product, comprising:
providing a cold brew coffee brewing system according to any one of paragraphs 1-78;
disposing the extraction vessel containing coffee grounds in the brewing orientation at the first receiving location;
during an extraction operation, dispensing from the water dispensing system at the first receiving location into the extraction vessel above the coffee grounds a total quantity of the brew water at a brew water dispensation profile for preparation of the cold brew coffee product;
collecting cold brew coffee exiting the extraction vessel in a collection container disposed in the collection orientation in the second receiving location.

81. The method of paragraph 80, wherein the total quantity of the brew water is dispensed into the extraction vessel at the first receiving location over a period of time in a range having a lower limit selected from the group consisting of 30 minutes, 40 minutes, 50 minutes and 60 minutes and an upper limit selected from the group consisting of 240 minutes, 180 minutes, 150 minutes and 120 minutes, and with one preferred range being from 50 minutes to 150 minutes.

82. The method of either one of paragraph 80 or paragraph 81, wherein the brew water dispensation profile comprises first brew water profile periods of brew water dispensation (active brew periods) with a second brew water profile period (rest period) between occurrences of the first brew water profile periods; and
the second brew water profile period comprises no brew water dispensation or brew water dispensation at a reduced dispensation rate relative to the first brew water profile periods, preferably brew water dispensation at a dispensation rate no larger than 25% (and more preferably no larger than 10%) of a brew water dispensation rate of the first brew water profile periods and even more preferably no brew water dispensation; and
optionally, the first brew water profile periods may each last for the same duration of time or one or more of the first brew water profile periods may last for a different duration of time than one or more other ones of the first brew water profile periods; and
optionally, the second brew water profile periods may each last for the same duration of time or one or more of the second brew water profile period may last for a different duration of time than one or more other ones of the second brew water profile periods;
optionally, a said second brew water profile period may follow a final one of the first brew water profile periods.

83. The method of any one of paragraph 82, wherein the brew water dispensation profile includes a number of occurrences of the first brew water profile period in a range having a lower limit selected from the group consisting of 2, 3 and 4 occurrences of the first brew water profile periods and having an upper limit selected from the group consisting of 120, 24 and 12 occurrences of the first brew water profile periods, and with one preferred range being from 4 to 12 occurrences of the first brew water profile periods.

84. The method of either one of paragraph 82 or paragraph 83, wherein at least one said second brew water profile period lasts for a longer duration of time than at least one said first brew water profile period; and
optionally, the brew water dispensation profile includes a sequence including a said first brew water profile period lasting a first time duration, followed by a said second brew water profile period lasting a second time duration, and followed by a different said first brew water profile period lasting a third time duration, and optionally the different said first brew water profile period is followed by a different said second brew water profile period lasting a fourth time duration, wherein the second time duration is at least as long as, and preferably longer than, the first time duration and the third time duration is longer than the optional fourth time duration, and optionally wherein the third time duration is longer than the first time duration and further optionally the second time duration is longer than the optional fourth time duration, and which fourth time duration may or may not be a final rest period during the extraction operation. Such optional processing in the implementation of this of paragraph 74 is advantageous to provide a relatively long rest period in the second time duration to penetrate and extract components of the coffee grounds following a relatively short dispensation of brew water during the first time duration, which relatively long rest period of the second time duration is followed by a relatively long period of dispensation of brew water during the third time duration to remove components extracted from the coffee grounds during the rest period of the second time duration. The relatively short optional rest period of the fourth time duration is advantageous in helping to avoid over-extraction of the coffee grounds. One example of such an optional brew water dispensation profile sequence could include about 5 minutes for the first time duration, about 20 minutes for the second time duration, about 30 minutes for the third time duration and about 5 to 10 minutes for the optional fourth time duration.

85. The method of any one of paragraphs 82-84, wherein each said first brew water profile period lasts for a time period in a range having a lower limit selected from the group consisting of 2 minutes and 5 minutes and an upper limit selected from the group consisting of 45 minutes and 30 minutes, with one preferred range being from 5 minutes to 30 minutes.

86. The method of any one of paragraphs 82-85, wherein each said second brew water profile period lasts for a time period in a range having a lower limit selected from the group consisting of 3 minutes, 5 minutes and 10 minutes and an upper limit selected from the group consisting of 30 minutes and 20 minutes, with one preferred range being from 5 minutes to 20 minutes.

87. The method of any one of paragraphs 82-86, wherein a proportion of the total quantity of the brew water to a feed coffee quantity is in a range having a lower limit selected from the group consisting of 1 liter of the brew water per kilogram of the feed coffee, 2 liters of the brew water per kilogram of the feed coffee and 3 liters of the brew water per kilogram of the feed coffee and having an upper limit selected from the group consisting of 12 liters of the brew water per kilogram of the feed coffee, 10 liters of the brew water per kilogram of the feed coffee and 8 liters of the brew water per kilogram of the feed coffee, with one preferred range being from 2 liters to 10 liters of the brew water per kilogram of the feed coffee.

88. The method of any one of paragraphs 80-87, wherein the disposing the extraction vessel containing coffee grounds in the brewing orientation at the first receiving location comprises disposing the extraction vessel in the brewing orientation at the first receiving location with the extraction vessel containing a pre-infusion mixture comprising the coffee grounds and pre-infusion water.

89. The method of paragraph 88, comprising preparing the pre-infusion mixture in the extraction vessel during a pre-infusion operation, and wherein the preparing the pre-infusion mixture comprises:

loading the coffee grounds, preferably in a dry form, into the extraction vessel; and after the loading the coffee grounds into the extraction vessel, dispensing a total quantity of the pre-infusion water for the pre-infusion mixture from the water dispensing system at a said receiving location for pre-infusion that is the first receiving location into the extraction vessel above the coffee grounds, the total quantity of the pre-infusion water being dispensed with a pre-infusion water dispensation profile, and wherein the pre-infusion water dispensation profile is different than the brew water dispensation profile.

90. The method of paragraph 89, comprising:

during the dispensing the pre-infusion water into the extraction vessel, the extraction vessel is received in the first receiving location in a pre-brewing orientation, in which a bottom end of the extraction vessel is closed to fluid flow out of the bottom end of the extraction vessel;

after dispensing the total quantity of the pre-infusion water into the extraction vessel for the pre-infusion mixture, disposing the extraction vessel containing the pre-infusion mixture in the brewing orientation at the first receiving location.

91. The method of paragraph 90, wherein;

the preparing the pre-infusion mixture in the extraction vessel comprises, after dispensing the total quantity of the pre-infusion water into the extraction vessel, mixing the coffee grounds and the total quantity of the pre-infusion water in the extraction vessel, optionally with a mixer, and further optionally a manually-operated mixer; and optionally, the mixing is prior to the disposing the extraction vessel containing the pre-infusion mixture in the brewing orientation at the first receiving location, and further optionally the bottom end of the extraction vessel is closed to fluid flow out of the bottom end of the extraction vessel during the mixing.

92. The method of paragraph 89, wherein during the dispensing the pre-infusion water into the extraction vessel, the extraction vessel is received at the first receiving location, optionally in the brewing orientation.

93. The method of any one of paragraphs 89-92, wherein the total quantity of the pre-infusion water is dispensed from a water dispenser of the water dispensing system to the extraction vessel at the first receiving location; and the total quantity of the brew water is dispensed from the same water dispenser of the water dispensing system to the extraction vessel at the first receiving location.

94. The method of either one of paragraph 92 or paragraph 93, wherein:

the pre-infusion water dispensation profile comprises first pre-infusion water profile periods (at least 2) of active pre-infusion water dispensation (active water addition periods) with a second pre-infusion water profile period (saturation rest period) between occurrences of the first pre-infusion water profile periods; and the second pre-infusion water profile period comprises no pre-infusion water dispensation or pre-infusion water dispensation at a reduced dispensation rate relative to the first pre-infusion water profile periods, preferably pre-infusion water dispensation at a dispensation rate no larger than 25% (and more preferably no larger than 10%) of a pre-infusion water dispensation rate of the first pre-infusion water profile periods and even more preferably no pre-infusion water dispensation; and optionally, the first pre-infusion water profile periods may each last for the same duration of time or one or more of the first pre-infusion water profile periods may last for a different duration of time than one or more other ones of the first pre-infusion water profile periods; and optionally, the second pre-infusion water profile periods may each last for the same duration of time or one or more of the second pre-infusion water profile periods may last for a different duration of time than one or more other ones of the second pre-infusion water profile periods;

optionally, the pre-infusion operation comprises a final saturation rest period with no water dispensation to the first receiving location after a final said first pre-infusion water profile period of the pre-infusion water dispensation profile and prior to commencement of dispensing the brew water into the extraction vessel, and preferably the final saturation rest period is longer in duration than a duration of any prior said second pre-infusion water profile period.

95. The method of paragraph 94, wherein the pre-infusion water dispensation profile includes a number of occurrences of the first pre-infusion water profile period in a range having a lower limit selected from the group consisting of 2, 3, 4 and 5 occurrences of the first pre-infusion water profile periods and having an upper limit selected from the group consisting of 12, 10, 8, and 6 occurrences of the first pre-infusion water profile periods, and with one preferred range being from 3 to 8 occurrences of the first pre-infusion water profile periods.

96. The cold brew coffee brewing system of either one of paragraph 94 or paragraph 95, wherein:

the pre-infusion operation comprises a final saturation rest period with no water dispensation to the first receiving location after a final said first pre-infusion water profile period of the pre-infusion water dispensation profile and prior to commencement of dispensing the brew water for the extraction operation; and a sum of the times of all of the second pre-infusion water profile periods and the final saturation rest period of the pre-infusion operation is larger than a sum of the times of all of the first pre-infusion water profile periods;

and optionally, the final saturation rest period has a duration that is longer than a duration of any prior said second pre-infusion water profile period and any prior said first pre-infusion water profile period. Such processing in the implementation combination of this paragraph 96 is advantageous to provide a relatively long period of time following each said first pre-infusion water profile period to permit pre-infusion water dispensed during the prior first pre-infusion water profile periods to saturate the coffee grounds, rather than to channel through the coffee grounds, and the optional longer final saturation rest period permits a significant final period for the coffee grounds to become saturated with the pre-infusion water prior to commencement of dispensation of the brew water during the extraction operation, helping to reduce potential for channeling of the brew water through the coffee grounds during the extraction operation. Optionally, the final saturation rest period is preferably at least 1.5 times as long as, more preferably at least 2 times as long as and even more preferably at least 2.5 times as long as any prior said second pre-infusion water profile period.

97. The method of any one of paragraphs 94-96, wherein each said first pre-infusion water profile period lasts for a time period in a range having a lower limit selected from the group consisting of 1 minute, 2 minutes, 3 minutes and an upper limit selected from the group consisting of 6 minutes, 4 minutes and 3 minutes, provided that the upper limit is selected to be larger than the lower limit, and with one preferred range being from 2 minutes to 3 minutes.

98. The method of any one of paragraphs 94-97, wherein each said second pre-infusion water profile period lasts for a time period in a range having a lower limit selected from the group consisting of 2 minutes, 3 minutes, 4 minutes and 5 minutes and an upper limit selected from the group consisting of 10 minutes, 7 minutes, 5 minutes and 4 minutes, provided that the upper limit is selected to be larger than the lower limit, and with one preferred range being from 3 minutes to 5 minutes for each said second pre-infusion water profile period.

99. The method of any one of paragraphs 94-98, wherein each said second pre-infusion water profile period has a duration at least 1 minute longer than an immediately preceding said first pre-infusion water profile period.

100. The method of any one of paragraphs 94-99, wherein each said second pre-infusion water profile period has a duration at least 50% longer than an immediately preceding said first pre-infusion water profile period.

101. The method of any one of paragraphs 94-100, wherein the second pre-infusion water profile period comprises no pre-infusion water dispensation.

102. The method of any one of paragraphs 89 and 94-101, wherein the duration of the pre-infusion water dispensation profile between first commencement of dispensation of the pre-infusion water and completion of dispensation of the total quantity of the pre-infusion water is in a range having a lower limit selected from the group consisting of 4 minutes, 6 minutes and 10 minutes and an upper limit selected from the group consisting of 40 minutes, 30 minutes and 20 minutes, with one preferred range being of from 6 minutes to 20 minutes.

103. The method of any one of paragraphs 80-88, wherein the disposing the extraction vessel containing coffee grounds in the brewing orientation at the first receiving location comprises loading into the extraction vessel a pre-prepared, pre-infusion mixture comprising the coffee grounds and the pre-infusion water.

104. The method of paragraph 103, comprising preparing the pre-infusion mixture in a pre-infusion container during a pre-infusion operation, the preparing the pre-infusion mixture comprising, prior to disposing the extraction vessel containing coffee grounds in the brewing orientation of the first receiving location:

disposing the pre-infusion container containing the coffee grounds, preferably in a dry form, in a pre-infusion orientation at a said receiving location for pre-infusion, optionally selected from the group consisting of the first receiving location and the second receiving location;

dispensing the pre-infusion water for the pre-infusion mixture from the water dispensing system at the said receiving location for pre-infusion into the pre-infusion container above the coffee grounds, the pre-infusion water being dispensed with a pre-infusion water dispensation profile to provide a total quantity of the pre-infusion water for the pre-infusion mixture;

after the dispensing the total quantity of the pre-infusion water, removing the pre-infusion container with the total quantity of the pre-infusion water and the coffee grounds from the said receiving location; and wherein the loading into the extraction vessel a pre-prepared, pre-infusion mixture comprises transferring the pre-infusion mixture from the pre-infusion container to the extraction vessel.

105. The method of paragraph 104, wherein the transferring occurs when the extraction vessel is not received in the brewing orientation in the first receiving location.

106. The method of paragraph 104, wherein the transferring occurs when the extraction vessel is received in the brewing orientation in the first receiving location.

107. The method of any one of paragraphs 104-106, wherein the preparing the pre-infusion mixture comprises mixing the coffee grounds and the total quantity of the pre-infusion water in the pre-infusion container following the dispensing the total quantity of the pre-infusion water into the pre-infusion container, and optionally the mixing comprises shaking the pre-infusion container containing the coffee grounds and the total quantity of the pre-infusion water.

108. The method of paragraph 107, wherein the mixing occurs when the pre-infusion container is not received in the said receiving location in the pre-infusion orientation.

109. The method of either one of paragraph 107 or paragraph 108, wherein the mixing comprises mixing contents of the pre-infusion container with a mixer, optionally with the mixer comprising a mixing member selectively insertable into the pre-infusion container and manipulable to perform the mixing.

110. The method of any one of paragraphs 104-109, wherein the total quantity of the pre-infusion water is dispensed from a first water dispenser of the water dispensing system to the pre-infusion container at the said receiving location for pre-infusion; and the total quantity of the brew water is dispensed from a second water dispenser, different than the first water dispenser, of the water dispensing system to the extraction vessel at the first receiving location.

111. The method of any one of paragraphs 104-110, wherein the pre-infusion water dispensation profile is different than the brew water dispensation profile.

112. The method of any one of paragraphs 89-92 and 104-111, comprising dispensing the total quantity of the pre-infusion water at the said receiving location into the pre-infusion container or into the extraction vessel over a period of time in a range having a lower limit selected from the group consisting of 1 minute and 2 minutes and an upper limit selected from the group consisting of 10 minutes, 6 minutes and 4 minutes, with one preferred range being from 1 minutes to 4 minutes.

113. The method of any one of paragraphs 89-92 and 104-112, wherein an average rate of pre-infusion water dispensation during the dispensing the total quantity of the pre-infusion water is at least 4 times, preferably at least 6 times and more preferably at least 8 times as large as an average rate of brew water dispensation during the dispensing the brew water, and optionally the average rate of pre-infusion water dispensation during the dispensing the total quantity of the pre-infusion water is no larger than 200 times and preferably no larger than 100 times an average rate of brew water dispensation during dispensing the brew water.

114. The method of any one of paragraphs 89-92 and 104-113, wherein a maximum rate of pre-infusion water dispensation during the pre-infusion water dispensing is at least 4 times, preferably at least 6 times and more preferably at least 8 times as large as a maximum rate of brew water dispensation during the extraction operation, and optionally a maximum rate of pre-infusion water dispensation during the pre-infusion operation is no greater than 200 times and preferably no larger than 100 times a maximum rate of brew water dispensation during the extraction operation.

115. The method of any one of paragraphs 89-92 and 104-114, wherein the product preparation parameters include a feed coffee quantity; and a proportion of a total quantity of the pre-infusion water dispensed during the pre-infusion operation to the feed coffee in the feed coffee quantity is in a range having a lower limit selected from the group consisting of 0.5 liter of the pre-infusion water per kilogram of the feed coffee, 0.7 liter of the pre-infusion water per kilogram of the feed coffee, and 0.9 liters of the pre-infusion water per kilogram of the feed coffee and having an upper limit selected from the group consisting of 2 liters of the pre-infusion water per kilogram of the feed coffee, 1.7 liters of the pre-infusion water per kilogram of the feed coffee and 1.5 liters of the pre-infusion water per kilogram of the feed coffee, with one preferred range being from 0.7 liters to 1.5 liters of the pre-infusion water per kilogram of the feed coffee.

116. The method of any one of paragraphs 89-92 and 104-115, wherein the product preparation parameters include a feed coffee quantity; and a proportion of a total quantity of water dispensed to contact the coffee grounds during the pre-infusion operation and the extraction operation to the feed coffee in the feed coffee quantity is in a range having a lower limit selected from the group consisting of 1.5 liters of water per kilogram of the feed coffee, 2.7 liters of water per kilogram of the feed coffee and 3.9 liters of water per kilogram of the feed coffee and having an upper limit selected from the group consisting of 14 liters of the pre-infusion water per kilogram, 10.7 liters of water per kilogram of the feed coffee.

117. The method of any one of paragraphs 80-116, comprising during the dispensing the brew water, monitoring brew water flow rate relative to a preselected flow rate and adjusting a flow control valve to adjust the brew water flow rate toward the preselected flow rate.

118. The method of paragraph 117, wherein the adjusting a flow control valve comprises manual adjustment of the flow control valve.

119. The method of paragraph 117, wherein the adjusting a flow control valve comprises automatic adjustment of the control valve by a flow control system.

120. The method of any one of paragraphs 80-119, comprising, after the collecting the cold brew coffee, preparing a diluted cold brew coffee product, the preparing a diluted cold brew coffee product comprising dispensing a volume of dilution water from the water dispensing system and, without contacting the dilution water with the coffee grounds, diluting the collected cold brew coffee with the volume of the dilution water.

121. The method of paragraph 120, comprising prior to dispensing the dilution water from the water dispensing system, measuring a property of the collected cold brew coffee and determining the volume of the dilution water to dispense based at least in part on the measured property.

122. The method of paragraph 121, wherein the property is total dissolved solids (TDS) content of the collected cold brew coffee and the volume of the dilution water is an amount of the dilution water to prepare the diluted cold brew product with a second TDS content that is smaller than the TDS content of the collected cold brew coffee.

123. The method of any one of paragraphs 80-122, comprising performing a cold brewing process cycle with control by a brew control system of the cold brew coffee brewing system of any one of paragraphs 10-78 executing a said brew control operation.

124. A method for making a product modification in a cold brew coffee brewing system of any one of paragraphs 72-78, the method comprising:

accessing the controller unit with the second hierarchical level of access and storing in the controller unit a product modification comprising a member selected from the group consisting of modifying product preparation parameters for a cold brew coffee product already stored in the controller unit, storing a set of product preparation parameters for a new cold brew product not already stored in the controller unit and combinations thereof.

125. A method for making a product menu change to a menu of coffee products for preparation by the cold brew coffee brewing system of any one of paragraphs 74-78, the method comprising:

accessing the controller unit with the third hierarchical level of access and performing an operation in the controller unit selected from the group consisting of:
  (i) storing in the controller unit a product menu change to a menu of coffee products for preparation by the cold brew coffee brewing system;
  (ii) accessing stored system utilization information comprising production quantity of a said cold brew coffee product produced by the cold brew coffee system over a period of time; and
  (iii) combinations of (i) and (ii).

126. A method for making a global menu change using the cold brew coffee brewing network of paragraph 79 to a menu of coffee products for preparation by a plurality of the cold brew coffee brewing systems of any one of paragraphs 64-68 the method comprising:

from the remote central server, accessing each said cold brew coffee brewing system of the plurality of cold brew coffee brewing systems with the third hierarchical level of access and performing an operation in the controller unit of each said cold brew coffee brewing system of the plurality of cold brew coffee brewing systems, wherein the operation is selected from the group consisting of:

(i) storing in the controller unit a product menu change to a menu of coffee products for preparation by the cold brew coffee brewing system;
(ii) accessing stored system utilization information comprising production quantity of a said cold brew coffee product produced by the cold brew coffee system over a period of time; and
(iii) combinations of (i) and (ii).

127. Use of the cold brew coffee brewing system of any one of paragraphs 1-78 to prepare a cold brew coffee product.

128. Use of the cold brew coffee brewing system of any one of paragraphs 72-78 to make a product modification in the controller unit of the cold brew coffee brewing system with a said second hierarchical level of access.

129. Use of the cold brew coffee brewing system of any one of paragraphs 74-78 to perform an operation in the controller unit with a said third hierarchical level of access.

The foregoing description of the present invention and various aspects thereof, indicating the examples presented above, has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

The description of a feature or features in a particular combination do not exclude the inclusion of an additional feature or features in a variation of the particular combination. Processing steps and sequencing are for illustration only, and such illustrations do not exclude inclusion of other steps or other sequencing of steps to an extent not necessarily incompatible. Additional steps may be included between any illustrated processing steps or before or after any illustrated processing step to an extent not necessarily incompatible.

The terms "comprising", "containing", "including" and "having", and grammatical variations of those terms, are intended to be inclusive and nonlimiting in that the use of such terms indicates the presence of a stated condition or feature, but not to the exclusion of the presence also of any other condition or feature. The use of the terms "comprising", "containing", "including" and "having", and grammatical variations of those terms in referring to the presence of one or more components, subcomponents or materials, also include and is intended to disclose the more specific embodiments in which the term "comprising", "containing", "including" or "having" (or the variation of such term) as the case may be, is replaced by any of the narrower terms "consisting essentially of" or "consisting of" or "consisting of only" (or any appropriate grammatical variation of such narrower terms). For example, a statement that something "comprises" a stated element or elements is also intended to include and disclose the more specific narrower embodiments of the thing "consisting essentially of" the stated element or elements, and the thing "consisting of" the stated element or elements. Examples of various features have been provided for purposes of illustration, and the terms "example", "for example" and the like indicate illustrative examples that are not limiting and are not to be construed or interpreted as limiting a feature or features to any particular example. The term "at least" followed by a number (e.g., "at least one") means that number or more than that number. The term at "at least a portion" means all or a portion that is less than all. The term "at least a part" means all or a part that is less than all. When reference is made to a "liquid medium" in which fluorogenic dyes are dissolved, such as in the case of the first liquid medium of the concentrated dye formulation of the aqueous liquid medium of the aqueous diluted dye formulation, it is meant the liquid composition in which the fluorogenic dyes are dispersed in solution, and not including the fluorogenic dyes themselves. Such a liquid medium as used herein also does not include any suspended solids that may be carried by such a liquid composition. Such a liquid composition may include one or more than one normally-liquid components (e.g., DMSO and/or water and/or one or more other organic solvent components) and one or more normally-solid materials (e.g., dissolved salts and other additives of buffer solutions) that may be in solution in the liquid composition.

What is claimed is:

1. A cold brew coffee brewing system to prepare cold brew coffee by extraction of coffee grounds with brew water in a single-pass, non-immersion extraction operation following a pre-infusion operation to pre-infuse the coffee grounds with pre-infusion water, the system comprising:
   a flow-through extraction vessel to retain coffee grounds for single-pass, non-immersion extraction of the coffee grounds with water to prepare cold brew coffee, the extraction vessel comprising a fluid-permeable support to support coffee grounds in an extraction bed volume in the extraction vessel during the extraction operation;
   a tower unit, comprising a plurality of receiving locations, the plurality of receiving locations comprising:
      a first receiving location configured to selectively receive the extraction vessel in a brewing orientation in an elevated position for the extraction operation, wherein in the brewing orientation the extraction vessel is fluidly open at a fluid exit end adjacent a bottom of the extraction vessel for flow of cold brew coffee out of the fluid exit end for single-pass, non-immersion extraction of coffee grounds to prepare the cold brew coffee; and
      a second receiving location, at a lower elevation than the first receiving location, configured to selectively receive a collection container in a collection orientation to receive and collect the cold brew coffee from the extraction vessel during the extraction operation for preparation of a cold brew coffee product comprising the collected cold brew coffee in the collection container;
   a water dispensing system configured to dispense the brew water into the extraction vessel above the coffee grounds in the extraction vessel in the brewing orientation at the first receiving location during the extraction operation; and
   a brew control system to control operation of the water dispensing system during a cold brewing process cycle for preparation of the cold brew coffee product, wherein the brew control system comprises:
      a controller unit having stored product preparation parameters for the cold brew coffee product and configured to execute a brew control operation for performance of the cold brewing process cycle to prepare a cold brew coffee product corresponding to the product preparation parameters for the cold brew coffee product; and a user interface in communication with the controller unit, the user interface configured to display information to a user and to receive input of instructions from the user for preparation of the cold brew coffee product;

and wherein:

the brew control operation comprises directing the user interface to display at least two control verification prompts each prompting the user to input a corresponding control instruction indicating satisfaction of a corresponding process condition to have the controller unit continue with the cold brewing process cycle and to direct performance of a corresponding next stage of the cold brewing process cycle;

a first said control verification prompt is for satisfaction of a corresponding first said process condition comprising disposition of the coffee grounds in a said receiving location for pre-infusion to receive pre-infusion water from the water dispensing system for pre-infusion of the coffee grounds with the pre-infusion water for the cold brewing process cycle in conformance with the product preparation parameters for the cold brew coffee product, and performance of a corresponding first said next stage of the cold brewing process cycle directed by the controller unit includes commencement of dispensing the pre-infusion water from the water dispensing system to the said receiving location for pre-infusion; and;

a second said control verification prompt, display of which is after the first said control verification prompt, is for satisfaction of a second said process condition comprising receipt of the extraction vessel in the first receiving location in the brewing orientation containing in the extraction bed a pre-infusion mixture including the coffee grounds and the pre-infusion water in conformance with the product preparation parameters for the cold brew coffee product, and performance of a corresponding second said next stage of the cold brewing process cycle directed by the controller unit includes commencement of dispensing the brew water from the water dispensing system to the first receiving location for the extraction operation.

2. The cold brew coffee brewing system of claim 1, wherein;

the first said process condition comprises receipt of a pre-infusion container, different than the extraction vessel, in the said receiving location for pre-infusion in a pre-infusion orientation containing the coffee grounds for the pre-infusion mixture in conformance with the product preparation parameters for the cold brew coffee product.

3. The cold brew coffee brewing system of claim 1, wherein the product preparation parameters comprise a feed coffee source; and the brew control operation comprises displaying an indication of the feed coffee source at the user interface prior to permitting acceptance by the controller unit of the corresponding first said control instruction to direct commencement of the dispensing the pre-infusion water from the water dispensing system.

4. The cold brew coffee brewing system of claim 3, wherein the product preparation parameters comprise a feed coffee grind requirement and a feed coffee quantity;

the brew control operation comprises displaying an indication of the feed coffee grind requirement at the user interface prior to permitting acceptance by the controller unit of the corresponding first said control instruction to direct commencement of the dispensing the pre-infusion water from the water dispensing system; and the brew control operation comprises displaying the feed coffee quantity at the user interface prior to permitting acceptance by the controller unit of the corresponding first said control instruction to direct commencement of dispensing the pre-infusion water from the water dispensing system.

5. The cold brew coffee brewing system of claim 1, wherein the product preparation parameters comprise a total quantity of the pre-infusion water to combine with the coffee grounds to prepare the pre-infusion mixture, and the brew control operation comprises;

after the commencement of dispensing the pre-infusion water from the dispensing system, and at the direction of the controller unit, discontinuing dispensing the pre-infusion water from the dispensing system when the controller identifies that the total quantity of the pre-infusion water has been dispensed; and after the discontinuing dispensing the pre-infusion water, displaying the second said control verification prompt at the display awaiting input from the user of the second said control instruction indicating satisfaction of the second said process condition to have the controller unit direct performance of the second said next stage of the cold brewing process cycle.

6. The cold brew coffee brewing system of claim 5, wherein the water dispensing system comprises a first water dispenser to dispense the pre-infusion water to the said receiving location for pre-infusion and a second water dispenser to separately dispense the brew water to the first receiving location.

7. The cold brew coffee brewing system of claim 1, wherein:

the brew control operation comprises dispensing a total quantity of the brew water to the first receiving location during the extraction operation at a brew water dispensation profile;

the brew water dispensation profile comprises first brew water profile periods of brew water dispensation with a second brew water profile period between occurrences of the first brew water profile periods;

the second brew water profile period comprises no brew water dispensation or brew water dispensation at a reduced dispensation rate no larger than 25% of a brew water dispensation rate of the first brew water profile periods.

8. A cold brew coffee brewing system to prepare cold brew coffee by extraction of coffee grounds with brew water in a single-pass, non-immersion extraction operation following a pre-infusion operation to pre-infuse the coffee grounds with pre-infusion water, the system comprising:

a flow-through extraction vessel to retain coffee grounds for single-pass, non-immersion extraction of the coffee grounds with water to prepare cold brew coffee, the extraction vessel comprising a fluid-permeable support to support coffee grounds in an extraction bed volume in the extraction vessel during the extraction operation;

a tower unit, comprising a plurality of receiving locations, the plurality of receiving locations comprising:

a first receiving location configured to selectively receive the extraction vessel in a brewing orientation in an elevated position for the extraction operation, wherein in the brewing orientation the extraction vessel is fluidly open at a fluid exit end adjacent a bottom of the extraction vessel for flow of cold brew coffee out of the fluid exit end for single-pass, non-immersion extraction of coffee grounds to prepare the cold brew coffee; and a second receiving location, at a lower elevation than the first receiving location, configured to selectively receive a collection container in a collection orientation to receive and collect the cold brew coffee from the extraction vessel during the extraction operation for preparation of a cold brew coffee product comprising the collected cold brew coffee in the collection container;

a water dispensing system configured to dispense the brew water into the extraction vessel above the coffee grounds in the extraction vessel in the brewing orientation at the first receiving location during the extraction operation; and a brew control system to control operation of the water dispensing system during a cold brewing process cycle for preparation of the cold brew coffee product, wherein the brew control system comprises:

a controller unit having stored product preparation parameters for the cold brew coffee product and configured to execute a brew control operation for performance of the cold brewing process cycle to prepare a cold brew coffee product corresponding to the product preparation parameters for the cold brew coffee product; and a user interface in communication with the controller unit, the user interface configured to display information to a user and to receive input of instructions from the user for preparation of the cold brew coffee product;

and wherein:

the brew control operation comprises dispensing a total quantity of the brew water to the first receiving location during the extraction operation at a brew water dispensation profile;

the brew water dispensation profile comprises first brew water profile periods of brew water dispensation with a second brew water profile period between occurrences of the first brew water profile periods;

the second brew water profile period comprises no brew water dispensation or brew water dispensation at a reduced dispensation rate no larger than 25% of a brew water dispensation rate of the first brew water profile periods; and the brew control operation comprises dispensing a total quantity of the pre-infusion water to a said receiving location for pre-infusion during the pre-infusion operation at a pre-infusion water dispensation profile that is different than the brew water dispensation profile, wherein the said receiving location for pre-infusion is selected from the group consisting of the first receiving location and the second receiving location.

9. The cold brew coffee brewing system of 8, wherein an average rate of pre-infusion water dispensation to dispense the total quantity of the pre-infusion water during the pre-infusion operation is at least 4 times as large as an average rate of brew water dispensation to dispense the total quantity of the brew water during the extraction operation.

10. The cold brew coffee brewing system of claim 8, wherein:

the pre-infusion water dispensation profile comprises first pre-infusion water profile periods of active pre-infusion water dispensation with a second pre-infusion water profile period between occurrences of the first pre-infusion water profile periods; and the second pre-infusion water profile period comprises no pre-infusion water dispensation or pre-infusion water dispensation at a reduced dispensation rate relative to the first pre-infusion water profile periods of no larger than 25% of a pre-infusion water dispensation rate of the first pre-infusion water profile periods.

11. The cold brew coffee brewing system of claim 8, wherein the brew control operation comprises, after the total quantity of the brew water has been dispensed to the first receiving location, directing the user interface to display an indication that preparation of the cold brew coffee product is complete; and the product preparation parameters comprise total yield of cold brew coffee and the brew control operation comprises discontinuing dispensation of the brew water when the total quantity of brew water has been dispensed based on a determination by the controller unit that the total yield of cold brew coffee has been achieved, taking into account a volume of residual water retained with the coffee grounds following the extraction operation.

12. The cold brew coffee brewing system of claim 8, wherein:

the brew control operation comprises directing the user interface to display at least one control verification prompt prompting the user to input a corresponding control instruction indicating satisfaction of a corresponding process condition to have the controller unit continue with the cold brewing process cycle and to direct performance of a corresponding next stage of the cold brewing process cycle;

a said control verification prompt is for satisfaction of a said process condition comprising disposition of the coffee grounds in a said receiving location for pre-infusion to receive water from the water dispensing system for the cold brewing process cycle;

for the said control verification prompt, a corresponding said next stage of the cold brewing process cycle directed by the controller unit includes commencement of dispensing pre-infusion water from the water dispensing system to the said receiving location for pre-infusion to mix with the coffee grounds to form a pre-infusion mixture; and the said process condition comprises disposition of the coffee grounds in the extraction vessel at the said receiving location for pre-infusion to receive the pre-infusion water from the water dispensing system.

13. The cold brew coffee brewing system of claim 8, wherein the product preparation parameters comprise a total quantity of the pre-infusion water to combine with the coffee grounds during the pre-infusion operation, and the brew control operation comprises;

after the commencement of dispensing the pre-infusion water from the water dispensing system, and at the direction of the controller unit, discontinuing dispensing the pre-infusion water from the water dispensing system when the controller unit identifies that the total quantity of the pre-infusion water has been dispensed; and after the discontinuing dispensing the pre-infusion water and a saturation rest period following the discontinuing dispensing of the pre-infusion water, automatically commencing, at the direction of the controller unit, dispensing the brew water for the extraction operation, without further input of instructions from the user to proceed to performance of the extraction operation.

14. The cold brew coffee brewing system of claim 8 wherein:
   the brew control operation comprises directing the user interface to display at least one control verification prompt prompting the user to input a corresponding control instruction indicating satisfaction of a corresponding process condition to have the controller unit continue with the cold brewing process cycle and to direct performance of a corresponding next stage of the cold brewing process cycle;
   a said control verification prompt is for satisfaction of a said process condition comprising disposition of the coffee grounds in a said receiving location for pre-infusion to receive water from the water dispensing system for the cold brewing process cycle;
   for the said control verification prompt, a corresponding said next stage of the cold brewing process cycle directed by the controller unit includes commencement of dispensing pre-infusion water from the water dispensing system to the said receiving location for pre-infusion to mix with the coffee grounds to form a pre-infusion mixture;
   the product preparation parameters comprise a feed coffee source; and
   the brew control operation comprises displaying identification of the feed coffee source at the user interface prior to permitting acceptance by the controller unit of the corresponding said control instruction to direct commencement of the dispensing.

15. The cold brew coffee brewing system of claim 8, wherein:
   the brew control operation comprises directing the user interface to display at least one control verification prompt prompting the user to input a corresponding control instruction indicating satisfaction of a corresponding process condition to have the controller unit continue with the cold brewing process cycle and to direct performance of a corresponding next stage of the cold brewing process cycle;
   a said control verification prompt is for satisfaction of a said process condition comprising disposition of the coffee grounds in a said receiving location for pre-infusion to receive water from the water dispensing system for the cold brewing process cycle;
   the product preparation parameters comprise a feed coffee source; and
   the brew control operation comprises displaying an indication of the feed coffee source at the user interface prior to permitting acceptance by the controller unit of a said control instruction to direct commencement of the dispensing the pre-infusion water from the water dispensing system.

16. The cold brew coffee brewing system of claim 15, wherein the product preparation parameters comprise a feed coffee grind requirement and a feed coffee quantity;
   the brew control operation comprises displaying an indication of the feed coffee grind requirement at the user interface prior to permitting acceptance by the controller unit of the corresponding first said control instruction to direct commencement of the dispensing the pre-infusion water from the water dispensing system; and
   the brew control operation comprises displaying the feed coffee quantity at the user interface prior to permitting acceptance by the controller unit of the said control instruction to direct commencement of dispensing the pre-infusion water from the water dispensing system.

17. The cold brew coffee brewing system of claim 8, wherein the brew control operation further comprises:
   after the extraction operation, dispensation of dilution water, at the direction of the controller unit pursuant to instructions from a user, from the water dispensing system to not contact the coffee grounds and for dilution of the collected cold brew coffee to prepare a diluted cold brew product;
   displaying at the user interface a product dilution notification; and
   dispensation of the dilution water from the water dispensing system in response to receipt by the controller unit of a dilution control command from a user following the product dilution notification.

18. The cold brew coffee brewing system of claim 17, wherein the dilution control command comprises specification by the user of product criteria for preparation of the diluted cold brew product, and the brew control operation comprises dispensation from the water dispensing system of a total volume of the dilution water determined by the controller unit based at least in part on the product criteria to dilute the collected cold brew coffee to prepare the diluted cold brew coffee product.

19. A cold brew coffee brewing system to prepare cold brew coffee by extraction of coffee grounds with brew water in a single-pass, non-immersion extraction operation following a pre-infusion operation to pre-infuse the coffee grounds with pre-infusion water, the system comprising:
   a flow-through extraction vessel to retain coffee grounds for single-pass, non-immersion extraction of the coffee grounds with water to prepare cold brew coffee, the extraction vessel comprising a fluid-permeable support to support coffee grounds in an extraction bed volume in the extraction vessel during the extraction operation;
   a tower unit, comprising a plurality of receiving locations, the plurality of receiving locations comprising:
      a first receiving location configured to selectively receive the extraction vessel in a brewing orientation in an elevated position for the extraction operation, wherein in the brewing orientation the extraction vessel is fluidly open at a fluid exit end adjacent a bottom of the extraction vessel for flow of cold brew coffee out of the fluid exit end for single-pass, non-immersion extraction of coffee grounds to prepare the cold brew coffee; and
      a second receiving location, at a lower elevation than the first receiving location, configured to selectively receive a collection container in a collection orientation to receive and collect the cold brew coffee from the extraction vessel during the extraction operation for preparation of a cold brew coffee product comprising the collected cold brew coffee in the collection container;
   a water dispensing system configured to dispense the brew water into the extraction vessel above the coffee grounds in the extraction vessel in the brewing orientation at the first receiving location during the extraction operation; and a brew control system to control operation of the water dispensing system during a cold brewing process cycle for preparation of the cold brew coffee product, wherein the brew control system comprises:
  a controller unit having stored product preparation parameters for the cold brew coffee product and configured to execute a brew control operation for performance of the cold brewing process cycle to prepare a cold brew coffee product corresponding to the product preparation parameters for the cold brew coffee product; and
  a user interface in communication with the controller unit, the user interface configured to display information to a user and to receive input of instructions from the user for preparation of the cold brew coffee product;

and wherein:
the controller unit has stored therein a plurality of different sets of product preparation parameters corresponding to a plurality of different said cold brew coffee products for alternative preparation during the brewing process cycle;
the brew control operation comprises directing the user interface to prompt a user to make a product selection of a said cold brew coffee product from among the plurality of different said cold brew coffee products for preparation during the cold brewing process cycle and waiting for a control instruction making the product selection;
the brew control operation comprises directing the user interface to display one or more said product preparation parameters for a selected said cold brew coffee product; and
the cold brew coffee brewing system further comprising hierarchical access to the controller unit, the hierarchical access comprising:
  a first hierarchical level of access permitting operation of the controller unit to execute a said brew control operation to perform a said cold brewing process cycle to prepare the cold brew product according to the product preparation parameters already stored in the controller unit;
  a second hierarchical level of access, different than the first hierarchical level of access, the second hierarchical level of access permitting storing in the controller unit a product modification wherein the product modification comprises a member selected from the group consisting of modifying product preparation parameters for a said cold brew coffee product already stored in the controller unit, storing a set of product preparation parameters for a new said cold brew coffee product and combinations thereof, and the first hierarchical level of access does not permit storing in the controller unit a said product modification; and
  a third hierarchical level of access, different than the first hierarchical level of access and the second hierarchical level of access, the third hierarchical level of access permitting an operation selected from the group consisting of:
    (i) storing in the controller unit a product menu change to a menu of coffee products for preparation by the cold brew coffee brewing system;
    (ii) accessing stored system utilization information comprising production quantity of a said cold brew coffee product produced by the cold brew coffee system over a period of time; and
    (iii) combinations of (i) and (ii).

20. A cold brew coffee brewing network, comprising:
a plurality of said cold brew coffee brewing systems according to claim 19;
a remote central server to receive information from and provide information to each said cold brew coffee brewing system of the network through a remote access communication connection.

21. A method for making a cold brew coffee product, comprising:
(i) providing a cold brew coffee brewing system, the cold brew coffee brewing system comprising:
  a flow-through extraction vessel to retain coffee grounds for single-pass, non-immersion extraction of the coffee grounds with water to prepare cold brew coffee, the extraction vessel comprising a fluid-permeable support to support coffee grounds in an extraction bed volume in the extraction vessel during the extraction operation;
  a tower unit, comprising a plurality of receiving locations, the plurality of receiving locations comprising:
    a first receiving location configured to selectively receive the extraction vessel in a brewing orientation in an elevated position for the extraction operation, wherein in the brewing orientation the extraction vessel is fluidly open at a fluid exit end adjacent a bottom of the extraction vessel for flow of cold brew coffee out of the fluid exit end for single-pass, non-immersion extraction of coffee grounds to prepare the cold brew coffee; and
    a second receiving location, at a lower elevation than the first receiving location, configured to selectively receive a collection container in a collection orientation to receive and collect the cold brew coffee from the extraction vessel during the extraction operation for preparation of a cold brew coffee product comprising the collected cold brew coffee in the collection container;
  a water dispensing system configured to dispense the brew water into the extraction vessel above the coffee grounds in the extraction vessel in the brewing orientation at the first receiving location during the extraction operation; and
  a brew control system to control operation of the water dispensing system during a cold brewing process cycle for preparation of the cold brew coffee product, wherein the brew control system comprises:
    a controller unit having stored product preparation parameters for the cold brew coffee product and configured to execute a brew control operation for performance of the cold brewing process cycle to prepare a cold brew coffee product corresponding to the product preparation parameters for the cold brew coffee product; and
    a user interface in communication with the controller unit, the user interface configured to display information to a user and to receive input of instructions from the user for preparation of the cold brew coffee product;
  and wherein:
  the brew control operation comprises directing the user interface to display at least one control verification prompt prompting the user to input a corresponding control instruction indicating satisfaction of a corresponding process condition to have the controller unit continue with the cold brewing process cycle and to direct performance of a corresponding next stage of the cold brewing process cycle; and a said control verification prompt is for satisfaction of a said process condition comprising disposition of the coffee grounds in a said receiving location for pre-infusion to receive water from the water dispensing system for the cold brewing process cycle;

(ii) disposing the extraction vessel containing coffee grounds in the brewing orientation at the first receiving location;

(iii) at the direction of the controller unit executing the brew control operation, dispensing from the water dispensing system at the first receiving location into the extraction vessel above the coffee grounds a total quantity of the brew water at a brew water dispensation profile according to the product preparation parameters and the brew control operation for preparation of the cold brew coffee product; and (iv) collecting cold brew coffee exiting the extraction vessel in the collection container disposed in the collection orientation in the second receiving location;

and wherein:

the brew water dispensation profile comprises first brew water profile periods of brew water dispensation with a second brew water profile period between occurrences of the first brew water profile periods; and the second brew water profile period comprises no brew water dispensation or brew water dispensation at a reduced dispensation rate no larger than 25% of a brew water dispensation rate of the first brew water profile periods.

22. The method of claim 21, wherein the brew water dispensation profile includes a number of occurrences of the first brew water profile period of at least 4.

23. The method of claim 22, wherein the brew water dispensation profile comprises a sequence including a said first brew water profile period lasting a first time duration, followed by a said second brew water profile period lasting a second time duration, followed by a different said first brew water profile period lasting a third time duration, and followed by a different said second brew water profile period lasting a fourth time duration, wherein the second time duration is longer than the first time duration and the third time duration is longer than the fourth time duration, and wherein the third time duration is longer than the first time duration and the second time duration is longer than the fourth time duration.

24. The method of claim 21, comprising, prior to the dispensing the total quantity of the brew water:

at the direction of the controller unit, dispensing a total quantity of pre-infusion water to a said receiving location for pre-infusion of the coffee grounds at a pre-infusion water dispensation profile that is different than the brew water dispensation profile.

25. The method of claim 24, wherein the disposing the extraction vessel containing coffee grounds in the brewing orientation at the first receiving location comprises disposing the extraction vessel in the brewing orientation at the first receiving location with the extraction vessel containing a pre-infusion mixture comprising the coffee grounds and the total quantity of the pre-infusion water; and the method comprises preparing the pre-infusion mixture, the preparing the pre-infusion mixture comprising:

at the direction of the controller unit, displaying at the user interface a said control verification prompt for a user to input a corresponding said control instruction indicating satisfaction of a process condition comprising disposition of the coffee grounds in a said receiving location for pre-infusion;

receiving from the user interface the said control instruction indicating satisfaction of a process condition comprising disposition of the coffee grounds in a said receiving location for pre-infusion; and after receiving the said control instruction indicating satisfaction of the process condition comprising disposition of the coffee grounds in a said receiving location for pre-infusion, at the direction of the controller unit dispensing the total quantity of pre-infusion water from the water dispensing system to mix with the coffee grounds.

26. The method of claim 25, wherein:

the preparing the pre-infusion mixture comprises disposing a pre-infusion container, different than the extraction vessel, in the said receiving location for pre-infusion in a pre-infusion orientation containing the coffee grounds for pre-infusion;

the dispensing the total quantity of the pre-infusion water comprises dispensing the total quantity of the pre-infusion water into the pre-infusion vessel to mix with the coffee grounds in the pre-infusion vessel; and the method further comprises transferring the pre-infusion mixture from the pre-infusion vessel to the extraction vessel.

27. The method of claim 25, comprising after the dispensing the total quantity of the pre-infusion water:

at the direction of the controller unit displaying at the user interface a said control verification prompt to input a corresponding said control instruction indicating satisfaction of a process condition comprising receipt of the extraction vessel in the first receiving location in the brewing orientation containing in the extraction bed the pre-infusion mixture;

receiving the said control instruction indicating satisfaction of the said process condition comprising receipt of the extraction vessel in the first receiving location in the brewing orientation containing in the extraction bed the pre-infusion mixture; and after receipt of the said control instruction indicating satisfaction of the process condition comprising receipt of the extraction vessel in the first receiving location in the brewing orientation containing in the extraction bed the pre-infusion mixture, performing the dispensing the total quantity of the brew water.

28. The method of claim 24, wherein:

the water dispensing system comprises a first water dispenser from which the pre-infusion water is dispensed during the dispensing the total quantity of the pre-infusion water; and the water dispensing system comprises a second water dispenser from which the brew water is dispensed during the dispensing the total quantity of the brew water.

29. The method of claim 24, wherein an average rate of pre-infusion water dispensation during the dispensing the total quantity of the pre-infusion water is at least 4 times as large as an average rate of brew water dispensation to dispense the total quantity of the brew water during the dispensing the total quantity of the brew water.

30. The method of claim 21, comprising, after the dispensing of the total quantity of the brew water:

at the direction of the controller unit pursuant to dilution instructions to the controller unit from a user, dispensing a quantity of dilution water from the water dispensing system to not contact the coffee grounds and for dilution of a quantity of the collected cold brew coffee to prepare diluted cold brew coffees; and wherein the quantity of dilution water is determined by the controller unit at least in part by product criteria specified by the user as part of the dilution instructions.

* * * * *